US012665430B2

(12) United States Patent　(10) Patent No.:　US 12,665,430 B2
D Costa et al.　(45) Date of Patent:　Jun. 23, 2026

(54) SYSTEM AND METHOD FOR AUTOMATED CLEAN ENERGY BLACKSTART FOR BACKUP AUXILIARY POWER, MICROGRID CUSTOMER LOADS, AND UTILITY GRID

(71) Applicant: AES Clean Energy Services, LLC, Salt Lake City, UT (US)

(72) Inventors: Alston D Costa, Lakewood, CO (US); Ankit Sharma, Longmont, CO (US); Christopher Boyer, Grand Prairie, TX (US); Samuel Ley, Boulder, CO (US); Felipe Cantero, Arvada, CO (US)

(73) Assignee: AES Clean Energy Services, LLC, Salt Lake City, UT (US)

( * ) Notice: Subject to any disclaimer, the term of this patent is extended or adjusted under 35 U.S.C. 154(b) by 0 days.

(21) Appl. No.: 18/731,648

(22) Filed: Jun. 3, 2024

(65) Prior Publication Data

US 2024/0405566 A1　Dec. 5, 2024

Related U.S. Application Data

(60) Provisional application No. 63/470,743, filed on Jun. 2, 2023.

(51) Int. Cl.
*H02J 3/388*　(2026.01)
*H02J 3/38*　(2006.01)
(Continued)

(52) U.S. Cl.
CPC .............. *H02J 3/381* (2013.01); *H02J 3/388* (2020.01); *H02J 11/00* (2013.01); *H02J 2103/35* (2026.01); *H02J 2105/16* (2026.01)

(58) Field of Classification Search
CPC ............. H02J 3/04–08; H02J 3/14–144; H02J 3/38–50; H02J 2203/10; H02J 2310/18; H02J 11/00; H02B 1/20–24
See application file for complete search history.

(56) References Cited

U.S. PATENT DOCUMENTS 11,824,356　B1 *　11/2023　Yang ....................... H02J 3/381
2009/0112374　A1 *　4/2009　Kirchhof ................... H02J 3/46
700/287
(Continued)

FOREIGN PATENT DOCUMENTS

CN　114094635　A　*　2/2022　................ H02J 3/32
EP　3829017　A1　6/2021
(Continued)

OTHER PUBLICATIONS

English machine translation of CN114094635A published Feb. 25, 2022 (Year: 2022).*

(Continued)

*Primary Examiner* — David A Shiao

(74) *Attorney, Agent, or Firm* — Lempia Summerfield Katz LLC

(57)　ABSTRACT

A method and system for performing blackstart functionality from renewable generation and battery energy storage systems are disclosed. A plant may include a microgrid that includes one or more customer loads and that may provide power to a utility grid. Blackstart may be performed to restore operations to part or all of the plant or to external loads such as microgrid customer loads or part of the utility grid. In practice, blackstart may be performed in order to restore operation to the one or more feeders in the plant, such as to the generation sources within the plant, to restore power to the plant auxiliary loads, customer loads in the microgrid, and to provide power to different sections of the grid when transitioning from shutdown mode of operation. In this way, the method and system may automatically transition from a shutdown mode of operation to an islanded mode of operation.

19 Claims, 33 Drawing Sheets

(51) Int. Cl.
H02J 11/00 (2006.01)
H02J 103/35 (2026.01)
H02J 105/16 (2026.01)

(56) References Cited

U.S. PATENT DOCUMENTS

| | | | |
|---|---|---|---|
| 2014/0247629 A1* | 9/2014 | Crane | H02M 7/521 |
| | | | 363/35 |
| 2016/0079752 A1 | 3/2016 | Matan | |
| 2016/0204606 A1 | 7/2016 | Matan | |
| 2018/0109111 A1 | 4/2018 | Somani | |
| 2018/0248378 A1* | 8/2018 | Ren | H02J 3/381 |
| 2018/0248379 A1* | 8/2018 | Schulz | H02J 11/00 |
| 2018/0366978 A1 | 12/2018 | Matan | |
| 2019/0181645 A1 | 6/2019 | Majumder | |
| 2019/0258212 A1* | 8/2019 | Morton | H02J 3/46 |
| 2020/0153274 A1 | 5/2020 | Münz | |
| 2020/0259332 A1* | 8/2020 | Bishop | H02J 3/0073 |
| 2021/0047997 A1* | 2/2021 | Abeyasekera | F03D 7/026 |
| 2021/0156358 A1 | 5/2021 | Brombach | |
| 2021/0234398 A1* | 7/2021 | Morton | H02J 9/068 |
| 2021/0359525 A1 | 11/2021 | Nayebi | |
| 2022/0231622 A1 | 7/2022 | Rothenhagen | |
| 2022/0271563 A1* | 8/2022 | Hug | H02J 9/06 |
| 2022/0329076 A1* | 10/2022 | Rodick | H02J 3/32 |
| 2023/0361572 A1 | 11/2023 | Matan | |
| 2024/0183262 A1 | 6/2024 | Chen | |
| 2024/0388088 A1* | 11/2024 | Itaya | H02J 3/001 |

FOREIGN PATENT DOCUMENTS

| | | | | | |
|---|---|---|---|---|---|
| SE | 1750063 A1 | * | 1/2017 | | H02J 3/08 |
| WO | WO-2024054267 A1 | * | 3/2024 | | H02J 3/44 |
| WO | WO-2024112316 A1 | * | 5/2024 | | H02J 3/01 |

OTHER PUBLICATIONS

Subhakanta Khatua, V. Mukherjee, "Application of PLC based smart microgrid controller for sequential load restoration during station blackout of nuclear power plants", Oct. 9, 2020, Annals of Nuclear Energy, vol. 151, 2021 (Year: 2020).*
J. R. Gracia, P. W. O'Connor, L. C. Markel, R. Shan, D. T. Rizy, A. Tarditi, "Hydropower Plants as Black Start Resources", May 2019, Hydrowires, US Department of Energy (Year: 2019).*
Wemag: "Successful Black start" https://www.stadt-und-werk.de/k21-meldungen/erfolgreicher-schwarzstart/ Schwerin May 17, 2019.
International Search Report for International Application No. PCT/US2024/032230 mailed on Oct. 7, 2024.
Written Opinion for International Application No. PCT/US2024/032230 mailed on Oct. 7, 2024.
Shahparasti, Mahdi, et al. "Inrush Current Management During Medium Voltage Microgrid Black Start With Battery Energy Storage System." IEEE Access 10 (2022): 42287-42296.

* cited by examiner

330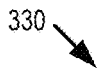

| Initiate customer load microgrid blackstart | 332 |

| Check whether the blackstart power currently available meets or exceeds the microgrid customer load needs | 334 |

| Check whether there is sufficient hardware in grid-forming for customer load blackstart | 336 |

| Check voltages on both sides of the isolation breaker(s) | 338 |

| Using grid-forming PCSs to energize the plant medium-voltage loop | 340 |

| Close plant medium-voltage loop to power microgrid customer loads | 342 |

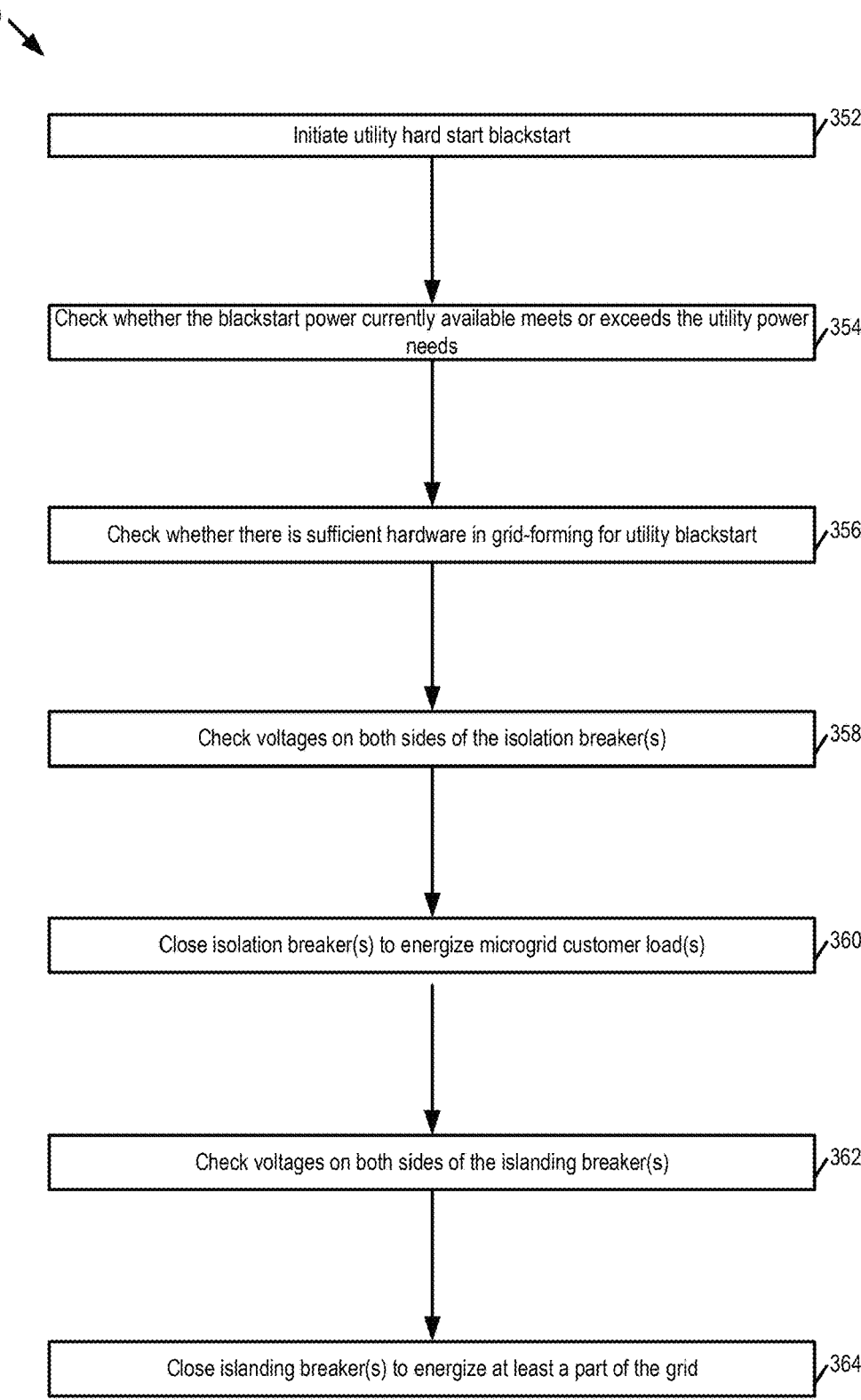

Initiate utility hard start blackstart ⟋352

Check whether the blackstart power currently available meets or exceeds the utility power needs ⟋354

Check whether there is sufficient hardware in grid-forming for utility blackstart ⟋356

Check voltages on both sides of the isolation breaker(s) ⟋358

Close isolation breaker(s) to energize microgrid customer load(s) ⟋360

Check voltages on both sides of the islanding breaker(s) ⟋362

Close islanding breaker(s) to energize at least a part of the grid ⟋364

FIG. 3C

370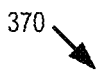

| Initiate utility soft start blackstart | 372 |
|---|---|

↓

| Determining the blackstart power currently available | 374 |
|---|---|

↓

| Grid-forming PCSs ramp up voltage; GSU energized | 376 |
|---|---|

↓

| After energizing the GSU, check whether the blackstart power currently available meets or exceeds the utility power needs | 378 |
|---|---|

↓

| Check whether there is sufficient hardware in grid-forming for utility blackstart | 380 |
|---|---|

↓

| Close soft start GSU disconnection breaker to energize the T&D circuit | 382 |
|---|---|

FIG. 3D

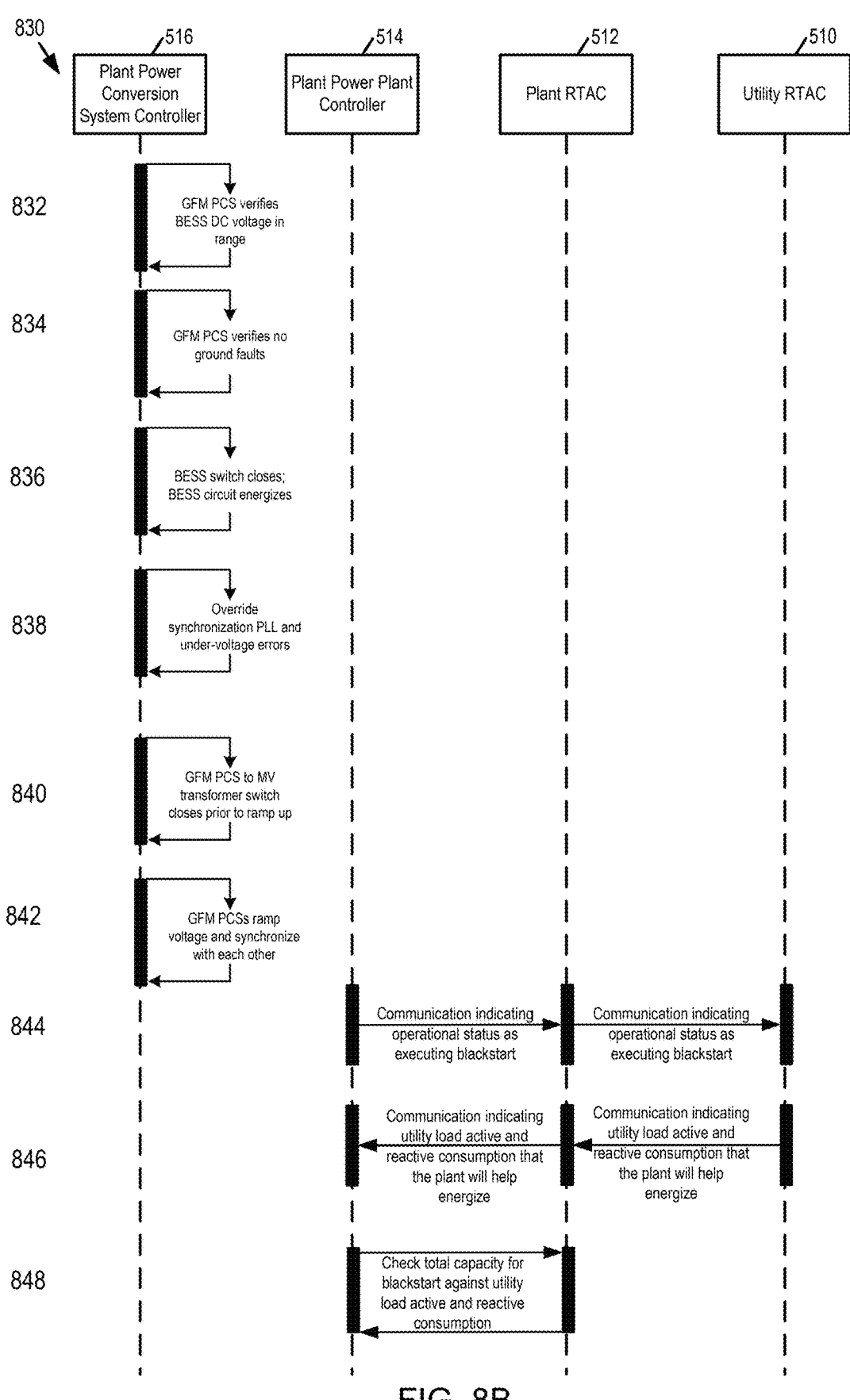

830

516
Plant Power Conversion System Controller

514
Plant Power Plant Controller

512
Plant RTAC

510
Utility RTAC

832 — GFM PCS verifies BESS DC voltage in range

834 — GFM PCS verifies no ground faults

836 — BESS switch closes; BESS circuit energizes

838 — Override synchronization PLL and under-voltage errors

840 — GFM PCS to MV transformer switch closes prior to ramp up

842 — GFM PCSs ramp voltage and synchronize with each other

844 — Communication indicating operational status as executing blackstart / Communication indicating operational status as executing blackstart 846 — Communication indicating utility load active and reactive consumption that the plant will help energize / Communication indicating utility load active and reactive consumption that the plant will help energize 848 — Check total capacity for blackstart against utility load active and reactive consumption

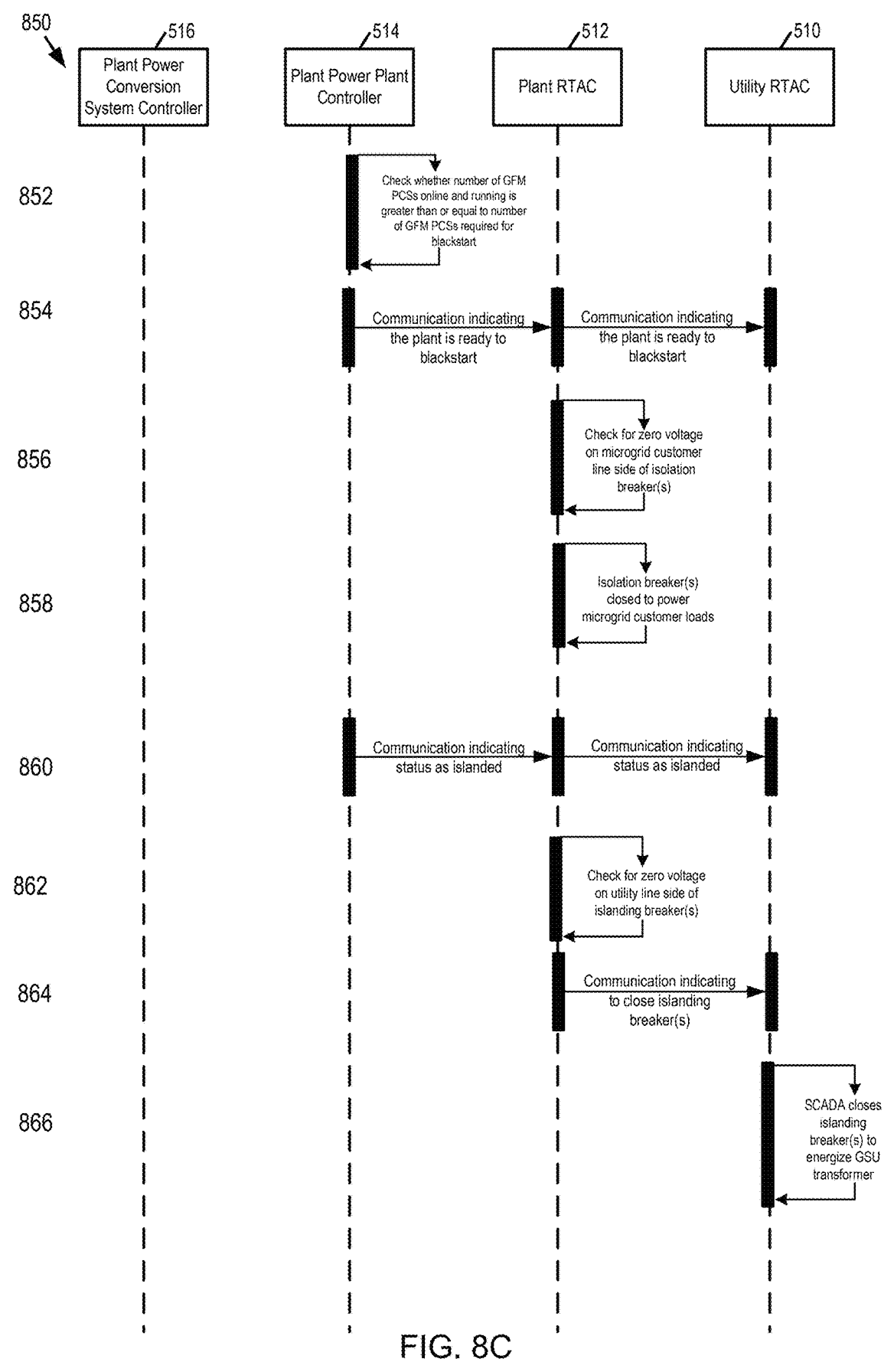

| 516 | 514 | 512 | 510 |
|---|---|---|---|
| Plant Power Conversion System Controller | Plant Power Plant Controller | Plant RTAC | Utility RTAC |

852 — Check whether number of GFM PCSs online and running is greater than or equal to number of GFM PCSs required for blackstart 854 — Communication indicating the plant is ready to blackstart → Communication indicating the plant is ready to blackstart 856 — Check for zero voltage on microgrid customer line side of isolation breaker(s)

858 — Isolation breaker(s) closed to power microgrid customer loads

860 — Communication indicating status as islanded → Communication indicating status as islanded 862 — Check for zero voltage on utility line side of islanding breaker(s)

864 — Communication indicating to close islanding breaker(s)

866 — SCADA closes islanding breaker(s) to energize GSU transformer

FIG. 8C

SYSTEM AND METHOD FOR AUTOMATED CLEAN ENERGY BLACKSTART FOR BACKUP AUXILIARY POWER, MICROGRID CUSTOMER LOADS, AND UTILITY GRID

REFERENCE TO RELATED APPLICATIONS

The present application claims priority to U.S. Provisional Application Ser. No. 63/470,743 (filed on Jun. 2, 2023), which is incorporated by reference herein in its entirety. This application is related to U.S. application Ser. No. 18/731,686 entitled System and Method for Clean Energy Planned Microgrid Seamless Transitions, incorporated by reference herein in its entirety.

FIELD OF THE INVENTION

The present application relates generally to automated blackstart sequences for backup auxiliary power for renewable energy powerplants.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A power grid (interchangeably termed a grid or a macrogrid) is an interconnected network for electricity delivery from producers to consumers. Power grids typically include: power stations (interchangeably a power plant, generating station, or generating plant) that generate power; electrical substations (interchangeably termed substations) that step the voltage up or down; and electrical power distribution where the voltage is stepped down again to the required service voltage(s) for the end customers.

In certain instances, the power grid may work in combination with a plant (interchangeable termed a powerplant or a power station) that comprises a microgrid, which may comprise a local electrical grid with defined electrical boundaries that acts as a single and controlled entity. A specific type of microgrid is a stand-alone microgrid, which has its own source of electricity or power (e.g., generation sources and/or energy storage, such as batteries). The microgrid may operate in different modes, such as grid-tied (interchangeably termed grid-connected) or islanded (interchangeably termed in island mode). A grid-tied microgrid may operate connected to and synchronous with the power grid (e.g., the macrogrid). The islanded microgrid may be electrically disconnected from the power grid and may function autonomously from the power grid.

The microgrid may also be in a state of shutdown, whereby the microgrid has no power. Blackstart (interchangeably termed black start) is the process of restoring operation to part or all of the plant (typically without relying on grid auxiliary power). Instead, in one implementation, power to restore operation to the plant may come from an on-site standby diesel generator. Once the generation units of the plant are running, powering either the plant auxiliary loads or microgrid customer loads, the plant may transition to grid-tied in order to reconnect with the power grid.

SUMMARY

In one or some embodiments, a method for performing blackstart of a plant from a shutdown mode is disclosed. The plant includes at least one microgrid for powering one or more customer loads or wherein the plant, when grid-tied, provides or receives power to at least part of a grid that is operated by a utility. The plant, when islanded, is disconnected from providing or receiving power to the at least part of the grid. The method includes: responsive to receiving an indication to perform a blackstart: checking status of one or both of at least one islanding breaker that islands the plant from the grid or at least one isolation breaker that isolates the plant from the one or more customer loads; checking capacity to at least meet load that is energized in performing the blackstart; preparing one or more devices within the plant for grid-forming in preparation for the blackstart; and performing the blackstart of at least one of the at least one microgrid or the at least part of the grid.

In one or some embodiments, a plant configured to perform blackstart from a shutdown mode is disclosed. The plant includes: at least one microgrid configured to supply power to one or more customer loads; communication functionality configured to communicate with a utility; and at least one controller configured to: responsive to receiving an indication to perform the blackstart: check status of one or both of at least one islanding breaker that islands the plant from at least part of a grid that is operated by the utility or at least one isolation breaker that isolates the plant from the one or more customer loads, wherein the plant, when grid-tied, is configured to provide power to or receive the power from the at least part of the grid, wherein the plant when islanded is disconnected from providing or receiving power to the at least part of the grid; check capacity to at least meet load that is energized in performing the blackstart; prepare one or more devices within the plant for grid-forming in preparation for the blackstart; and perform blackstart of at least one of the at least one microgrid or the at least part of the grid.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIG. 3B is a flow diagram for an example microgrid customer load blackstart.

FIG. 3C is a flow diagram for an example utility blackstart (hard start method).

FIG. 3D is a flow diagram for an example utility blackstart (soft start method).

FIGS. 8A-C is a sequence diagram illustrating a utility blackstart (hard start).

DETAILED DESCRIPTION OF THE INVENTION

Figure 1:
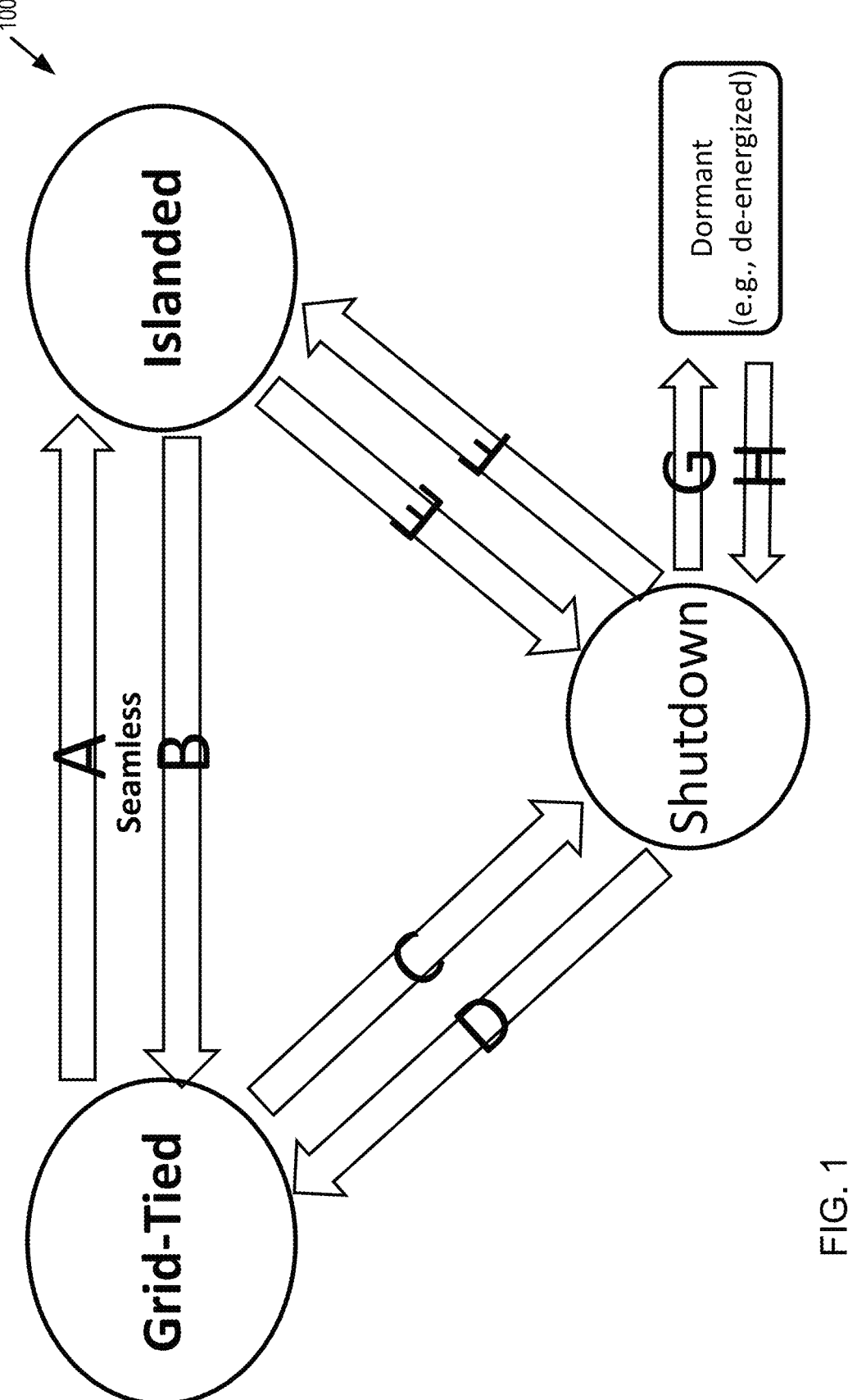
FIG. 1 is an illustration of transitions between modes of operation.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, a blackstart typically requires a standby generator, such as a diesel generator, in order to resume auxiliary power to the plant components and other critical loads connected in circuit. As such, the typical blackstart solution requires a greater carbon footprint. Further, blackstart procedures typically require operator intervention and several operational actions to resume power to the plant.

Thus, in one or some embodiments, a system and method are disclosed that are configured to perform a blackstart, transitioning a plant from shutdown to another state, such as islanded. The transition may be triggered by one or both of the plant or the utility, after which some or all of the steps in the blackstart may be automatically performed. For example, the blackstart sequence of events may be pre-programmed into electronics within the plant, such as any one, any combination, or all of power plant controller(s), power conversion systems (PCS) controllers, protection relays, and communication devices to allow for an automated start-up and self-energization with less or minimal operator action. In this way, operator error(s) may be reduced and actions minimized during adverse events.

In one or some embodiments, blackstart may be comprise any one, any combination, or all of: (i) plant auxiliary blackstart (e.g., a blackstart of the microgrid within the plant); (ii) customer load blackstart (e.g., an example of the customer load blackstart comprises a microgrid customer load blackstart, which comprises a blackstart of the plant microgrid that services one or more customer loads, with any discussion regarding the microgrid customer load blackstart being generally applicable to any blackstart to power the customer load(s)); or (iii) utility blackstart (e.g., a blackstart of part or all of the grid for the utility).

As discussed in more detail below, various sequences of performing the different blackstarts are contemplated. In one or some embodiments, each of (i), (ii), and (iii) are performed separately from one another. As one example, the plant auxiliary blackstart may be performed first, after which, one or both of the customer load microgrid blackstart or the utility blackstart is performed (e.g., in one instance, the customer load microgrid blackstart is performed before the utility blackstart; in another instance, the utility blackstart is performed prior to the customer load microgrid blackstart). Thus, in one or some embodiments, the blackstart may be performed in a predetermined sequence of stages, such as by: (1) performing the plant blackstart to power auxiliary loads within the plant (auxiliary load consumption may comprise any one, any combination, or all of control electronics, battery HVAC systems, and the like); and (2) powering loads external to the plant (e.g., whether performing the customer load microgrid blackstart to power the customer loads in the microgrid and/or performing the utility blackstart to power sections of the utility grid). These are examples of a "hard" start in which (i), (ii), and (iii) are separately performed.

Alternatively, (i) and (ii) and/or (i) and (iii) are performed at least partly simultaneously with one another. As one example for (i) and (ii), at least part of the plant auxiliary blackstart (such as powering the auxiliary load of the plant, including the HVAC, control electronics, etc.) is performed at least partly while powering part or all of the electronics for the microgrid (e.g., one or more transformers that are used by the microgrid are ramped up at least partly while performing the plant auxiliary blackstart). After which, a remaining portion of the electronics relating to the microgrid (e.g., activating switches so that customer loads electrically connected to the microgrid) are powered. This is one example of a "soft" start. As another example for (i) and (iii), at least part of the plant auxiliary blackstart is performed at least partly while powering part or all of the electronics for at least a part of the grid (e.g., one or more transformers that are used by the grid are ramped up at least partly while performing the plant auxiliary blackstart). After which, a remaining portion of the part of the grid (e.g., a substation) are powered. This is another example of a "soft" start.

In order to achieve either the "hard" start or the "soft" start, circuitry may be controlled. As one example, one or more islanding breakers may be used to island the plant from one or more parts of the grid. As another example, one or more isolation breakers may isolate a part of the plant from the microgrid customer loads. To perform the "hard" start performing (i), and then (ii) and/or (iii), the one or more islanding breakers and/or the one or more isolation breakers may be controlled to be open in performing (i); after performing (i), the one or more islanding breakers and/or the one or more isolation breakers may be controlled to be closed in performing (ii) or (iii). In particular, when performing (ii), the islanding breaker(s) may still be open whereas the isolation breakers are closed. When performing (iii), the islanding breaker(s) are closed (and the isolation breakers, in one or some embodiments, may be closed as well). In practice, the plant controller may determine the status of the islanding breaker(s) and/or the isolation breaker(s); responsive to determining that the status is closed (and in the event that the breaker(s) need to be open), the plant controller may cause their closing, either directly controlling the breakers or sending a communication to another device for the another device to open the breakers. Conversely, responsive to determining that the status is open (and in the event that the breaker(s) need to be closed), the plant controller may cause their opening, either directly controlling the breakers or sending a communication to another device for the another device to close the breakers.

In one or some embodiments, checks of the power capacity may be performed prior to performing any of the stages (e.g., prior to performing any one, any combination, or all of: (i); (ii); (iii); at least partly simultaneously (i) and (ii); or at least partly simultaneously (i) and (iii). As one example, prior to performing (i), a check may be performed to determine whether there is sufficient power to perform the plant auxiliary blackstart (e.g., whether there is sufficient power to power the plant auxiliary loads connected in circuit). As another example, prior to performing (ii), a check may be performed to determine whether there is sufficient power to perform the customer load blackstart (e.g., whether there is sufficient power to power the one or more customer loads powered by the microgrid). As still another example, prior to performing at least partly simultaneously (i) and (ii), a check may be performed to determine whether there is sufficient power to simultaneously perform the plant auxiliary blackstart and to power electronics in support of the microgrid (e.g., the check may determine whether there is sufficient power available in the plant to perform the plant auxiliary blackstart and also to ramp up the voltage for the transformer). As yet another example, prior to performing at least partly simultaneously (i) and (iii), a check may be performed to determine whether there is sufficient power to simultaneously perform the plant auxiliary blackstart and to power electronics in the grid (e.g., the check may determine whether there is sufficient power available in the plant to perform the plant auxiliary blackstart and also to ramp up the voltage for the transformer in the grid).

In one or some embodiments, checks for sufficiency may to perform actions may take one or more forms. In one form, the check for sufficiency may comprise checking the amount of power available to the plant to perform the desired action, such as the state of charge (SOC) of the batteries accessible by the plant (e.g., checking whether the SOC is greater than a predetermined percentage). Alternatively, or in addition, the check for sufficiency may comprise checking the grid-forming capacity of the plant (e.g., checking the number of PCSs that are in grid forming mode).

Thus, generally speaking, performing the blackstart, whether a "hard" blackstart or a "soft" blackstart, may have one or more similarities including any one or both of: (A) checking the status of the islanding breaker(s) and/or isolation breaker(s) (and potentially changing the status as desired); or (B) checking that the capacity can meet the required power needs to perform a desired action (e.g., checking whether the plant has sufficient power to meet the required load that is being energized). As discussed above, (B) may take one of several forms, including checking SOC percentages and/or the number of PCSs in grid-forming mode.

Further, in one or some embodiments, there may be one or more differences between the "hard" blackstart and a "soft" blackstart. As one example, the status of the isolation breaker(s) and the islanding breaker(s) may be different when performing the "hard" blackstart versus performing the "soft" blackstart. In one particular example, in performing the "hard" blackstart of (i) and then (ii), both the isolation breaker(s) and the islanding breaker(s) are open when performing (i); thereafter, the isolation breaker(s) are closed and the islanding breaker(s) are open when performing (ii). In contrast, the isolation breaker(s) are closed and the islanding breaker(s) are open when performing the "soft" blackstart of at least partly performing (i) and (ii). As another example, checking the power needs may be different prior to performing the "hard" blackstart versus performing the "soft" blackstart. In particular, because the power needs are different when performing the "hard" blackstart versus performing the "soft" blackstart, the checks (e.g., the amount of power available) prior to performing the "hard" blackstart and prior to performing the "soft" blackstart are likewise different.

In this regard, the plant may tailor the sequence of the blackstarts dynamically based on the initial command sent. As one example, responsive to a request from the utility to blackstart part of the grid, the plant may blackstart the part of the grid prior to blackstarting the customer load microgrid. As another example, responsive to a request by the customer for blackstart priority or to a previous customer arrangement of blackstart priority, the plant may blackstart the customer load microgrid prior to blackstarting the part of the grid.

In one or some embodiments, the plant may include one or more uninterruptible power supplies, which may, in the short term, supply power to critical control electronics (e.g., the power control system within the plant) to enable control and communication devices to remain online to allow an automated transition of a blackstart sequence upon initiation. Examples of renewable sources of energy comprise renewable energy generator source (e.g., photovoltaic (PV) devices) and/or a renewable energy storage source (e.g., batteries). Responsive to being powered by one or more renewable sources of energy supply energy, the control electronics (e.g., the PCS) may generate the necessary voltage and frequency of the power plant. In turn, with power resumed, the circuitry in the plant (e.g., the auxiliary power circuit) may connect various sections of the plant, such as tapping off the high-voltage primary winding side of each PCS medium voltage (MV) transformer, thereby powering the plant's auxiliary loads. Thus, in one or some embodiments, a sequence of events (SOE) procedure is disclosed to start up various electronics (e.g., the various PCSs) in the power plant in grid-forming mode, synchronize with each other, and resume power to the auxiliary loads in the plant during a grid outage in an automated manner. In this way, for a "hard" blackstart, the plant auxiliary blackstart may be performed. After which, the customer load microgrid blackstart and/or the utility blackstart may be performed. In another way, for the "soft" blackstart, grid-forming may likewise be performed.

As discussed above, in one or some embodiments, at least a part of the blackstart may be automated (e.g., any one, any combination, or all of the plant auxiliary blackstart, the customer load microgrid blackstart, or the utility blackstart may be automated). As one example, in the event of grid outages during operations, the automated plant auxiliary blackstart sequence may be initiated by a plant operator via a supervisory control and data acquisition (SCADA) system (e.g., the plant operator may enter a command to perform any one, any combination, or all of the plant auxiliary blackstart, the customer load microgrid blackstart, or the utility blackstart in a defined sequence). As another example, the automated plant auxiliary blackstart sequence may be initiated by a utility (or grid) operator (e.g., the utility (or grid) operator may enter a command to perform any one, any combination, or all of the plant auxiliary blackstart, the customer load microgrid blackstart, or the utility blackstart in a defined sequence).

Some or all of the control checks and actions may be pre-programmed into any one, any combination, or all of the power plant controller (PPC), relays, PCSs, and communication devices, thereby enabling an automated sequence once initiated. In one or some embodiments, a single PCS may be used within the plant. Alternatively, multiple PCSs may be used. For example, once a first grid-forming PCS is online, power may be resumed in the plant auxiliary circuit, and critical loads may be re-energized. Additionally, other power conversion systems may start up in grid-forming synchronized to the voltage and frequency formed, reducing the dependence on a single PCS or feeder circuit (with multiple PCSs). The plant auxiliary blackstart may thus resume power to one or more critical components in the power plant, including any one, any combination, or all of: power plant controller(s); batteries support electronics, such as BESS auxiliary loads (e.g., a heating, ventilation, and air conditioning (HVAC) configured to maintain the batteries within operating temperature and/or humidity; fire control panels; interior lights; battery control units; etc.); SCADA routers; data acquisition system (DAS); operator PCs; and other situational awareness systems for the power plant); tracker controller units (if applicable); meteorological stations; or PCS auxiliary systems to maintain temperature and humidity. In this regard, operator action(s) may be reduced or minimized in the event of one or more triggers (e.g., a grid outage) by initiating a pre-programmed automated plant auxiliary blackstart sequence via SCADA. This may thus improve robustness of the facility and may reduce manual operator actions and errors.

Various application of the blackstart are contemplated. A first application comprises commissioning power. Commissioning a power plant may comprise performing a commissioning phase for the plant equipment prior to connection of the power plant to the grid. The commissioning phase may comprise powering various electronic devices within the plant in order to ensure that the various electronic devices operate as designed and interface with other parts of the system within the power plant completely. In this way, the plant may, during the commissioning phase, be operated to ensure safe and stable operation. Using the disclosed blackstart, which may rely on renewables (e.g., PVs and/or batteries) may obviate the need for diesel generators or for grid power.

A second application for blackstart may comprise powering operations, such as powering one or more microgrid customers. At times, the power grid may be subject to blackouts, such as rolling blackouts. Blackstart may be used so that the plant may power one or more microgrid customers. For example, after relying on the UPS for critical plant components, blackstart may form a microgrid (e.g., the customer load microgrid) that is not connected to the utility grid, while supplying the customer loads. For example, a plant may have multiple feeders connected to a switchgear, with blackstart being used to restart operations for each of the multiple feeders. Again, the blackstart may rely on renewables, obviating the need for diesel generators.

A third application comprises power (and potentially protecting) plant operations. As one example, the plant may include a plurality of batteries. The batteries may be housed in closed units called containers that may be temperature and humidity controlled so that the batteries may operate within prescribed parameters in order to maintain peak performance and reduce or minimize degradation. In order to control temperature and/or humidity, the plant may use a temperature control system, such as a heating, ventilation, and air conditioning (HVAC) system. However, when power is lost, the temperature control system fails to operate, potentially causing damage to the batteries. Relying on UPSs to operate the temperature control system is wasteful and potentially ineffective since UPSs are expensive and are typically unable to supply the amount of power necessary to operate the temperature control system for any considerable length of time. As such, the blackstart may restart operations of the renewable sources (e.g., the PVs and the batteries) in order to power the temperature control system. For example, the PVs may, during daylight, convert power generated from the sun, supplying power to the various systems, such as the temperature control system, and recharging the batteries. At night, the batteries may discharge, thereby powering the various systems, including the temperature control system. This cycle of charge/discharging may typically continue (unless weather severely reduces the amount of energy generated by the PVs).

A further application of blackstart may enable restarting of sections of the utility grid. For example, when parts of the utility grid go offline (effectively shutting down the parts of the utility grid), the plant, as part of the blackstart procedure, may be part of the system restoration process in which power is restored to the customers in the parts of the utility grid. In practice, the utility grid may be restored part-by-part or section-by-section, with the utility relying on the plant, operating in blackstart mode (e.g., the utility blackstart), in order to provide a microgrid, thereby providing auxiliary power to other generation facilities to start up and supply power to the grid. Thus, in one or some embodiments, after the plant, in blackstart, has restarted its own renewable sources (e.g., PVs and batteries), the plant may supply power to the other generation facilities to get back online. The plant's supplying of power to the other generation facilities may be performed either before the plant supplies power to its own customer loads, concurrently with the plant supplies power to its own customer loads, or after the plant supplies power to its own customer loads.

As discussed above, blackstart may comprise powering different sections of the plant and/or different sections of the grid. As another example, various parts of the plant, such as control electronics (e.g., control electronics for the plant itself or for the renewable energy sources) or the microgrid (e.g., customer loads), may be powered. As another example, parts external to the plant, such as sections of the grid (e.g., generation facilities supplying power to the grid), may likewise be powered. In one or some embodiments, blackstart may follow a predetermined sequence of powering the different sections of the plant and/or different sections of the grid.

In one or some embodiments, blackstart may first power the control electronics in the plant. For example, one or more UPSs may be used to power certain electronics within the plant. As such, in one or some embodiments, blackstart may first power the certain electronics within the plant, thereby relieving the UPSs from powering the certain electronics over an extended period of time. For example, blackstart may first power the temperature control system for controlling the temperature and/or humidity of the batteries. Prioritizing the powering of these electronics may allow for the battery container UPSs (e.g., the UPSs assigned to the container that houses the batteries) to be smaller since the UPSs only need to power for the time period until blackstart activates and powers these electronics. For example, a feeder blackstart (e.g., as part of a plant auxiliary blackstart) may first be performed in which one or more feeders (such as the feeder for the batteries and/or the feeder for the PVs) into a switchgear may be powered. In this regard, blackstart may prioritize powering the electronics associated with the renewable energy sources (e.g., the batteries and/or PVs).

After which, blackstart may extend to one or more grids, such as the microgrid within the power plant (e.g., customer load microgrid blackstart) and/or the macrogrid (e.g., utility blackstart as part of powering the control electronics within different sections of the grid). In this regard, in one or some embodiments, after powering the feeders, blackstart may extend powering to the microgrid customer load(s). Further, in one or some embodiments, electronics (such as electronics used for generating and/or distributing power on the utility grid) within the utility grid may be powered (e.g., step-up transformers; control electronics for generation assets; etc.). In this way, when sections of the utility grid are shutdown, blackstart, using the renewable energy sources, may assist other generator facilities in extending out and powering different sections of the grid that may have lost power (e.g., part or the entire grid suffers a grid outage). Thus, blackstart may be performed in any one, any combination, or all of: (1) at the feeder level (e.g., as part of the plant auxiliary blackstart); (2) at the microgrid customer level (e.g., as part of the customer load microgrid blackstart); (3) at the utility grid level (e.g., as part of the utility blackstart of building out the grid section by section). As discussed above, blackstart may be performed in the following sequence: first (1) and then (2) or (3) (e.g., (2) first and then (3); (3) first and then (2); (2) and (3) at least partly simultaneously).

Further, as discussed above, one or more control checks and/or one or more actions may be performed during the blackstart sequence (e.g., transitioning from a shutdown state to an islanded microgrid state). Generally speaking, a grid may become increasing unstable when increasing reliant on renewables, leading to less inertia. Thus, instead of losing parts of the grid to rolling blackouts, grid operators may disconnect a section of the grid and the plant may blackstart to form a microgrid.

The disclosed blackstart system and method may have one or more advantages. As one example, the disclosed blackstart may comprise an alternative way of generating auxiliary power required during longer grid outages using clean renewable power from within the facility, rather than using diesel generators for backup power. As another example, the disclosed blackstart may comprise an alternative way of generating auxiliary power required for commissioning activities on-site in the event a grid interconnection is unavailable (e.g., no grid auxiliary power available), rather than using diesel generators. As yet another example, the disclosed blackstart may comprise may include one or more automated control checks and actions through preprogrammed logic embedded in various controllers and communication devices, which may reduce or limit manual actions from operator(s) and may reduce operator error. As still another example, the disclosed blackstart may include a self-sustaining and sustainable auxiliary power supply to power plant components from solar PV and BESS. In this way, the BESS may continue to be charged by the solar PV arrays during daytime, enabling a continuous auxiliary power source during the night. In still another example, the disclosed blackstart may comprise avoid reliance on diesel generators for backup power (e.g., during commissioning in the event grid auxiliary power is unavailable). Rather, in one or some embodiments, This invention provides a method to self-energize and provide clean, reliable power from local PV and/or BESS systems for commissioning power thereby reducing cost, logistics, and decreases carbon footprint of the site.

Further, because the blackstart transition is quickly performed (e.g., responsive to the plant being shutdown), the size of the UPSs (used for critical power plant communication equipment) may be reduced over typically sized UPSs that may be required to power auxiliary loads for a longer duration.

Referring to the figures, FIG. 1 is an illustration 100 of transitions between modes of operation. FIG. 1 illustrates four modes of operation including grid-tied, islanded, shutdown, and dormant. In one or some embodiments, any one, any combination, or all four of the modes of operation listed may be used in managing the plant. Alternatively, fewer or greater numbers of modes may be used in managing the plant.

In one or some embodiments, grid-tied comprises the plant being electrically connected to the grid, and thus having the capability to provide power to and/or receive power from the grid. In one or some embodiments, islanded comprises the plant being operational (e.g., being configured to provide power, either via generation and/or by dispensing previously stored power, to a microgrid) but being electrically disconnected from the grid, and thus being incapable of providing power to and/or receiving power from the grid. In one or some embodiments, shutdown comprises the plant not being operational (e.g., being unable to provide power), with UPS power powering critical controls and communication systems in the plant. In one or some embodiments, dormant comprises that the plant is de-energized, where UPS systems are disconnected. As shown in FIG. 1, there are eight potential transitions in modes including: (A) grid-tied to islanded; (B) islanded to grid-tied; (C) grid-tied to shutdown; (D) shutdown to grid-tied; (E) islanded to shutdown; (F) shutdown to islanded; (G) shutdown to dormant; and (H) dormant to shutdown.

Transition (F) explained in more detail below with a description of the initial status of the hardware (e.g., the circuit breakers and/or disconnect switches) followed by the steps to successfully transition to the desired mode of operation. Transition (F) may involve a series of control checks and subsequent control actions taken, as discussed with regard to FIGS. 3A-D, 4A-E, 5A-B, 6A-C, 7A-B, and 8A-C.

In one or some embodiments, a "step" may include one or more verifications and decisions that may lead to one or more actions. A "control check" may comprise logic that holds or confirms a condition before executing an action. A "control action" may comprise a command from a controller (or other computational functionality) to equipment(s). Example control actions comprise any one, any combination, or all of: closing a switch; opening a breaker; adjusting set point; etc.

As discussed further below, various electronic devices, such as controllers and hardware, may communicate with one another, such as via wired and/or wireless communication. Various communication protocols are contemplated. As one example, Modbus may be used to communicate amongst the various electronic devices. Alternatively, IEC 61850, GOOSE, or other communication protocols are contemplated.

Various types of transitions are contemplated. In one embodiment, the transition is "planned", which may mean that the transition is initiated by an operator (either an operator of the utility that manages the grid or an operator of the plant that manages the plant). Unplanned transitions are events that may occur without foresight (e.g., protection equipment tripping on an electrical fault or equipment failure).

Figure 2:
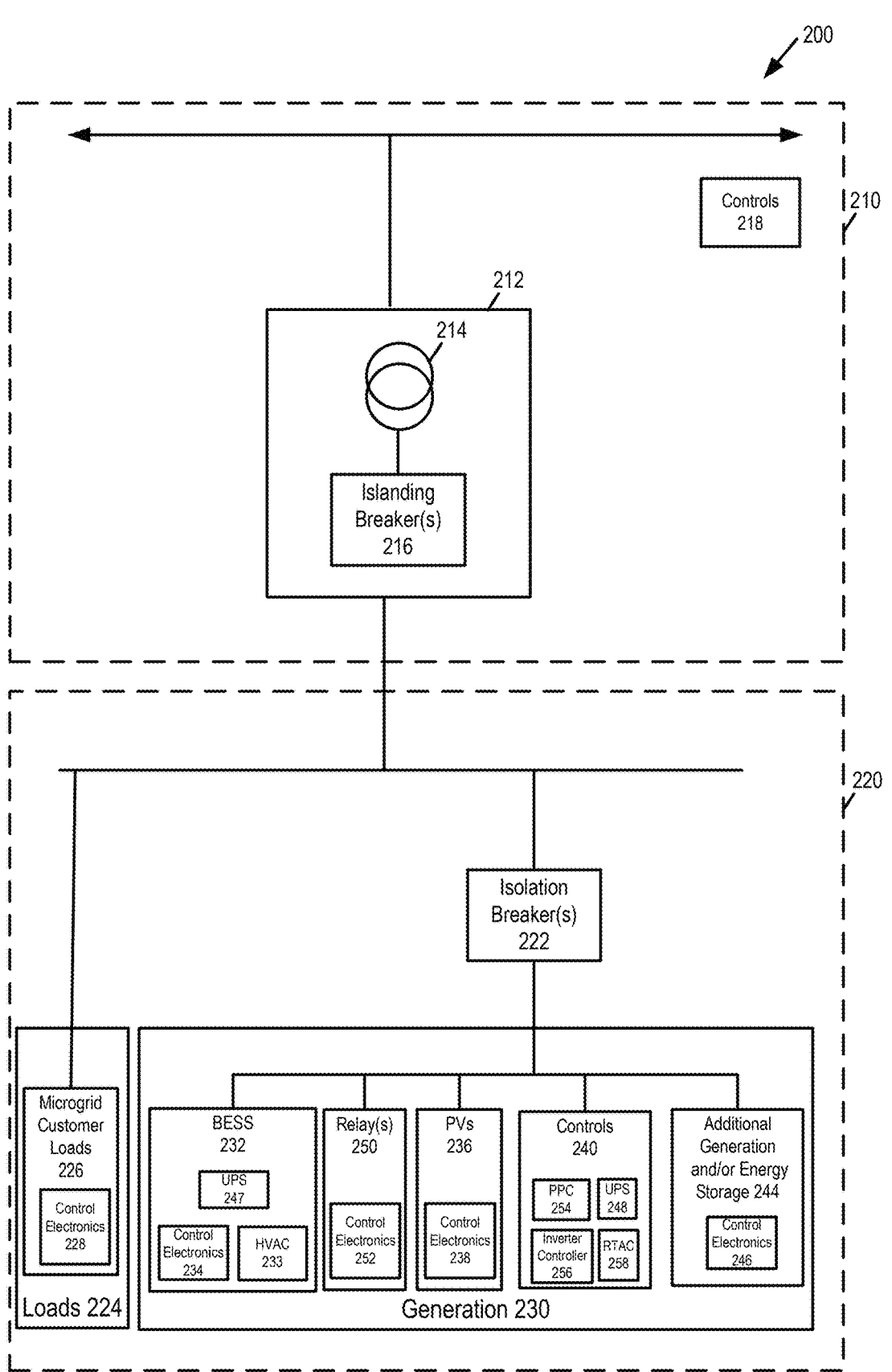
FIG. 2 is a schematic of a plant and a section of the grid.

FIG. 2 is a schematic 200 of a plant 220 and a section of the grid 210 in which the generation is co-located with the microgrid customer load(s), thereby enabling a single disconnection point (e.g., at islanding breaker(s) 216). Grid 210 may comprise a traditional wide area synchronous grid (alternatively termed a macrogrid). In one or some embodiments, the grid may comprise any one, any combination, or all of: generation (e.g., electricity produced by using fossil fuels, nuclear material, or renewable energy resources); transmission (e.g., long-distance power lines carrying electricity at high voltages); and distribution (e.g., substations that convert electricity to lower voltages; thereafter, distribution lines carry the lower voltages to homes and businesses). For example, grid 210 may comprise a three-phase electric power grid that has regional scale or greater and that operates at a synchronized utility frequency and voltage, and is electrically tied together during normal system conditions. Electricity may be transmitted across long distances using high-voltage transmission lines, with local facilities, such as substation(s) 212, converting the high-voltage power to a lower voltage (e.g., stepping down the voltage) in order to distribute the power to nearby homes or businesses. Merely by way of example, the transformer may step down from 57 kV to 12.5 kV. Substation(s) 212 may include transformers to change voltage levels between high transmission voltages and lower distribution voltages, or at the interconnection of two different transmission voltages. FIG. 2 further illustrates islanding breaker(s) 216, which may be electrically connected via various electronics, such as transformer 214, to substation(s) 212. FIG. 2 also illustrates controls 218, which may comprise computing functionality configured to control one or more parts of the grid 210. An example of controls 218 comprises utility real-time automation controller (RTAC) 510, discussed further below.

Various controls are contemplated for plant 220. As one example, higher level control may be manifested in controls 240, which may include any one, any combination, or all of a power plant controller (PPC) 254, inverter controller 256 or RTAC 258. Lower level control may be manifested in power conversion system (PCS) controller(s) and/or relay(s) 250. SCADA may further be included within plant 220. In one or some embodiments, the PCS may be configured to perform any one, any combination, or all of: (i) connection to at least one grid (e.g., a microgrid); or (ii) convert input (such as AC input with a first frequency or DC input) to an output, such as AC output (such as at a second frequency different from the first frequency) or a DC output. One example PCS may be formed by any one, any combination, or all of: AC/DC bidirectional converters; control elements; switching components; and cooling, In particular, the PCS may include a three-phase voltage source inverter (e.g., a two-level inverter, Neutral Point Clamped three-level inverter, or modular multi-level inverter). In this regard, the PCS may be electrically connected between a source of power (e.g., a BESS) and a grid (e.g., a microgrid, a utility grid, etc.).

As shown, the plant 220 includes generation 230 and loads 224. Generation 230 generally may be configured to provide power, such as by one or both of generating power or providing power previously stored. Various types of generation are contemplated, including any one, any combination, or all of solar, wind, hydroelectric, or the like. As shown in FIG. 2, photovoltaics (PVs) 236 may be used for generation 230. In one or some embodiments, only one type of generation (e.g., solar) is used. Alternatively, multiple types of generation and/or energy storage may be used, such as illustrated by additional generation and/or energy storage 244. Similarly, various types of storage of power for later use are contemplated. As one example, batteries, such as in form of Lithium Ion Battery Energy Storage Systems (BESS) are contemplated. As another example, pumped-storage hydroelectricity (alternatively termed pumped hydroelectric energy storage) is contemplated. FIG. 2 further illustrates controls 240, which may comprise central controlling functionality configured to control plant 220. Alternatively, the controlling functionality configured for the plant 220 may be decentralized. In this regard, different types of solar and battery systems, power conversion systems, and other variations of balance of plant equipment are contemplated. FIG. 2 further illustrates HVAC 233, which may be configured to control the environment for BESS 232, and UPSs 247, 248.

Plant 220 may further include one or more loads 224. One example of a load is a microgrid customer load 226. In one or some embodiments, a microgrid comprises a localized electrical grid with device boundaries that may act as a single and controllable entity under control of controls 240. In particular, in one or some embodiments, the microgrid may comprise energy production and energy storage, and may power one or more loads. Various loads are contemplated. As one example, the plant 220 may power a defined area, such as a building. In particular, the plant 220 may power electrical machinery, computers, lighting, or other types of electronic devices. As another example, the plant 220 may power a separate system, such as hydrogen electrolyzers, data centers, or the like.

In practice, plant 220 may distribute power to one or both of the grid 210 or the loads 224. When supplying power to the grid 210, the plant is grid-tied. There may be certain instances where the plant is to be islanded. Various instances are contemplated. In one instance, the plant 220 may be islanded based on operations in the grid 210, such as instability of the grid. As one example, the grid 210 may be unstable, leading to sections of the grid may be subject to rolling blackouts. In one or some embodiments, a rolling blackout may comprise an intentionally engineered electrical power shutdown in which electricity delivery is stopped for non-overlapping periods of time over different parts of the grid. A rolling blackout may comprise a planned event as a last resort measure used by a utility company in order to avoid a total blackout of the grid. In another instance, the plant 220 may be islanded based on operations within the plant 220 (e.g., within the load 224). For example, the load 224, such as microgrid customer loads 226, may seek to island from the grid 210 to avoid cyberattacks or the like.

Thus, in one implementation, the microgrid may be electrically connected to the grid 210 (e.g., grid-tied). Alternatively, the microgrid may be electrically disconnected from the grid 210, such as an islanded microgrid or an isolated microgrid. Islanding breaker(s) 216 may achieve the islanding. For example, responsive to a command (which may originate from the grid 210 (e.g., controls 218) or from the plant 220 (e.g., controls 240), the islanding breaker(s) 216 may change its state in order to electrically separate the plant 220 from the grid 210. In this regard, in one or some embodiments, the islanding breaker may comprise electronics, such as circuit breaker(s) that electrically separate the grid from both microgrid loads (e.g., loads 224) and the generating plant (e.g., generation 230).

Separate from islanding plant 220, loads 224 may be electrically separated, such as by isolation breaker(s) 222. For example, responsive to controls 240 commanding isolation breaker(s) 222 to electrically disconnect the electrical connection to loads 224, isolation breaker(s) 222 may electrically open. In one or some embodiments, isolation breakers may comprise electronics, such as circuit breaker(s), that separate generation 230 from the loads 224 (e.g., the microgrid customer loads 226).

As shown in FIG. 2, control electronics may be present in various parts of the grid 210 or the plant 220. For example, grid 210 includes controls 218, which may comprise centralized and/or decentralized controls. Plant 220 includes control electronics 134, 238, 242, 246 within generation 230 and control electronics 228 within loads 224. Further, plant 220 may include controls 240. As discussed in more detail below, plant 220 may include plant RTAC 512, plant power plant controller 514, and plant power conversion system controller 516. These elements may be included in any one of the control electronics as shown in plant 220 in FIG. 2. The devices depicted in FIGS. 4A-E, 5A-B, 6A-C, 7A-B, 8A-C, and 9A-C may reside in various places. For example, the plant RTAC 512 may comprise its own separate controls device (e.g., separate from the plant PPC 514 or the plant power conversion system controller 516). In one or some embodiments, the plant RTAC 512 may include a communication interface in order to communicate with one or more electronic devices for the utility (e.g., a utility RTAC 510). In this regard, the plant RTAC 512 may comprise a utility interface controller and/or a real time automation controller. Further, in one or some embodiments, plant PPC 514 and plant power conversion system controller(s) 516 may be separated into discrete electronic devices. For example, the plant power conversion system controller(s) may be located within the PCSs as it may be seen as the lowest form of control. Still alternatively, any discussion below regarding the actions performed by the plant RTAC 512 may be performed by another device, such as the plant PPC 514. Conversely, any discussion below regarding the actions performed by the plant PPC 514 may be performed by another device, such as the plant RTAC 512.

Therefore, in instances where the plant 220 is islanded from the grid 210, various parts of the plant, such as one or both of part of or all of the generation 230 or part of or all of the loads 224 may be powered. In this way, the microgrid customer loads 226 may still be powered even when the plant 220 is islanded from the grid 210.

Figure 3A:
FIG. 3A is a flow diagram for an example plant auxiliary blackstart.
Figure 3A:
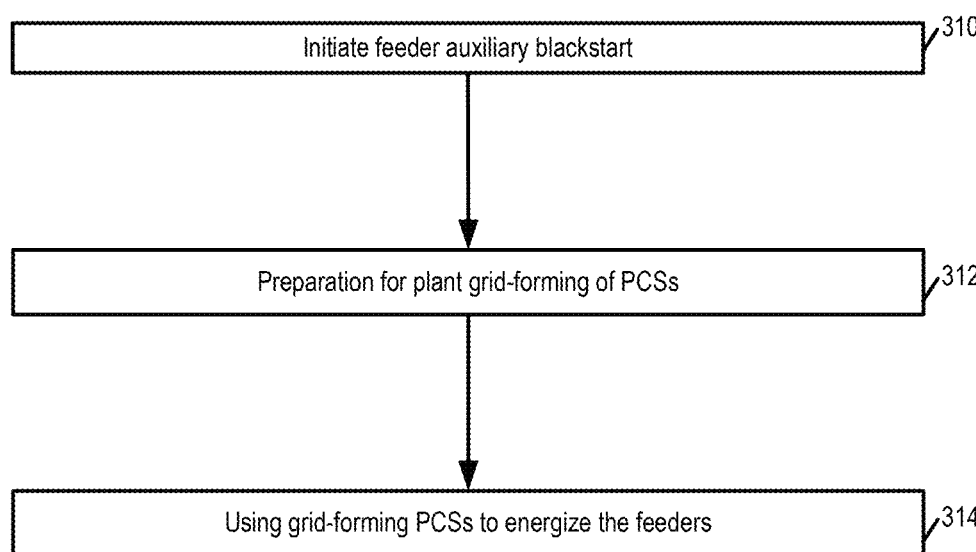

FIG. 3A is a flow diagram 300 for an example plant auxiliary blackstart. At 310, the feeder auxiliary blackstart may be initiated, such as from a part of the utility (e.g., the utility RTAC 510) or from a part of the plant (e.g., the plant RTAC 512). At 312, preparation of grid-forming by plant PCSs occurs. As discussed in more detail below, one or more actions/checks may be performed in preparation of the PCSs prior to energizing the feeders. By way of example, one check may comprise determining power needs and power availability for the plant auxiliary loads. In particular, in the instance of performing a feeder auxiliary blackstart, the blackstart power currently available may be checked to determine whether it meets or exceeds the plant auxiliary loads' needs in the customer load microgrid blackstart. After which, at 3143, the grid-forming PCSs are used to energize the feeders (e.g., loops 472, 478, discussed further below).

FIG. 3B is a flow diagram 330 for an example microgrid customer load blackstart. At 332, the customer load microgrid blackstart may be initiated, such as from a part of the utility (e.g., the utility RTAC 510) or from a part of the plant (e.g., the plant RTAC 512). At 334, checks may be performed, such as whether the blackstart power currently available meets or exceeds the microgrid customer load needs. Also, at 336, checks may be performed from a hardware standpoint whether there is sufficient hardware in grid-forming for performing the microgrid customer load blackstart. At 338, voltages may be checked on both sides of the isolation breaker(s) in preparation for plant grid-forming of PCSs. As such, one or more actions/checks may be performed in preparation of the PCSs prior to energizing the microgrid customer loads. As one example, At 340, the grid-forming PCSs are used to energize the plant medium-voltage loop(s). After which, at 342, the plant medium-voltage loop(s) is closed to power the microgrid customer loads.

As discussed above, various types of utility blackstarts are contemplated. For example, FIG. 3C is a flow diagram 350 of a first type of utility blackstart (e.g., a utility hard start blackstart). At 352, the utility hard start blackstart may be initiated, such as from a part of the utility (e.g., the utility RTAC 510) or from a part of the plant (e.g., the plant RTAC 512). At 354, the blackstart power currently available may be checked to determine whether it meets or exceeds the utility power needs in the utility blackstart (e.g., the amount of power available to perform the blackstart meets or exceeds the power needs on the utility side). Also, at 356, it may be determined whether there is sufficient hardware in grid-forming for the utility blackstart. Further, at 358, prior to closing the isolation breaker(s), the voltages is checked to determine whether there is 0 voltage on the line side (e.g., towards the microgrid customer loads and the utility grid)). Also, if the power and the hardware are sufficient for the utility blackstart, at 360, the isolation breaker(s) may be closed in order to perform the utility blackstart. After which, at 362, the voltages on both sides of the islanding breaker(s) may be checked to determine whether they are within tolerance. If so, at 364, the islanding breaker(s) are closed to energize at least a part of the grid.

As another example, FIG. 3D is a flow diagram 370 for a second type of utility blackstart (e.g., a utility soft start blackstart). At 372, the utility soft start blackstart is initiated, such as from a part of the utility (e.g., the utility RTAC 510) or from a part of the plant (e.g., the plant RTAC 512). At 374, it is determined how much blackstart power is currently available (e.g., how much power the plant can dispatch to perform the blackstart process). At 376, the grid-forming PCSs ramp up the voltage, resulting in the GSU being energized. After which, one or more checks may be performed. For example, at 378, after energizing the GSU, a check is performed to determine whether the blackstart power currently available meets or exceeds the utility power needs. As another example, at 380, a check is performed to determine whether there is sufficient hardware in grid-forming for the blackstart, such as the utility blackstart. If so, at 382, the soft start GSU disconnection breaker is closed to energize a part of the grid, such as one or more transmission and distribution circuits of the grid. Thus, in one or some embodiments, one or more switches, breakers, or the like may remain closed for the soft start during the PCS ramp to energize the GSU. In contrast, in one or some embodiments, for the hard start, the switches or breakers may remain open initially, and after the plant has ramped up and formed the voltage, the switches or breakers may then be closed to energize the GSU. In this regard, the hard blackstart and the soft blackstart may contrast in one or more ways, such as control of various switches or breakers.

Various actions are depicted in FIGS. 3A-D. Any one, any combination, or all of the actions depicted in FIGS. 3A-D may be automated and automatically performed. As one example, all of the actions depicted in FIGS. 3A-D may be automated and automatically performed. Alternatively, less than all of the actions may be automated and automatically performed. For example, the initiation action (e.g., 310, 332, 352, 372) may be at least partly manual. For example, an operator within the plant or within the grid may enter, via a SCADA HMI, a command to initiate the respective action. After which, all subsequent steps may be automatically performed.

Figure 4A:
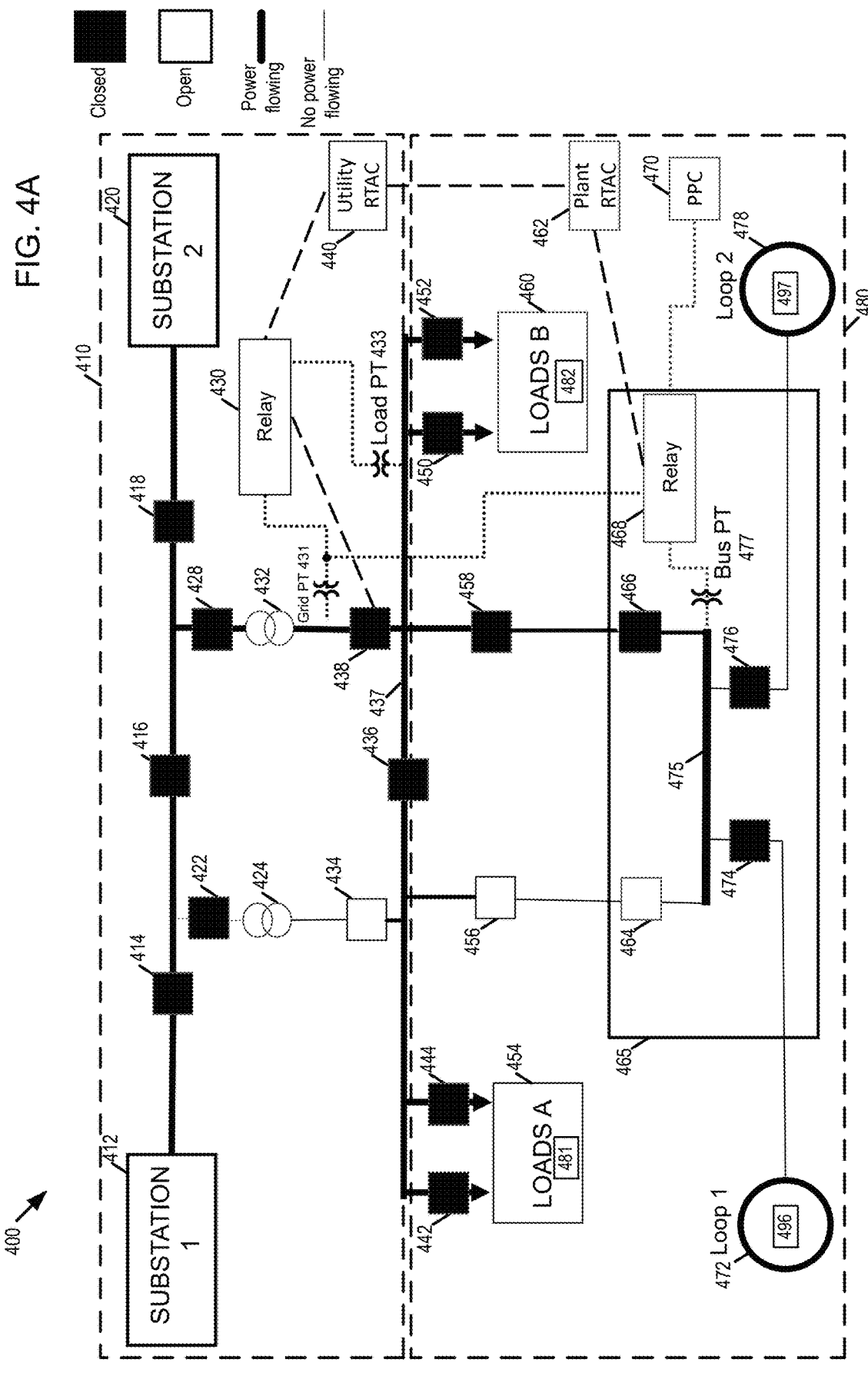
FIG. 4A is a schematic layout of the grid and the plant, in which the plant is grid tied, with the grid powering the microgrid customer loads and with the plant shutdown.

As discussed above, various blackstart sequences are contemplated, including plant auxiliary blackstart, customer load blackstart, and utility blackstart. In this regard, FIGS. 4A-H illustrates examples of the various blackstart sequences. In particular, FIG. 4A is a schematic layout 400 of the grid 410 and the plant 480, in which the plant 480 is shutdown, with the grid 410 powering the microgrid customer loads (loads A (454) and loads B (460)) and with the plant shutdown (e.g., the configuration of the breakers indicates that the plant has a direct connection to the grid while the plant is shutdown). FIG. 4A shows breakers/switches 414, 416, 418, 422, 428, 436, 438, 442, 444, 450, 452, 458, 474, 476 closed and with breakers/switches 434, 456, 464, open showing where power is flowing and where no power is flowing (see key in FIGS. 4A-E). Grid may include one or more substations, such as substation 1 (412) and substation 2 (420), and various control electronics, such as transformers (e.g., medium voltage transformers) (see transformer 424, transformer 432, grid PT 431, load PT 433, and bus PT 477), relay 430 and utility RTAC 440. In one or some embodiments, relay 430 may comprise a protection relay. In the context of the utility soft blackstart, relay 430 may check for voltage on the microgrid side before closing to energize the GSU.

Plant 480 includes one or more loops (alternatively termed feeders), such as loop 1 (472) and loop 2 (478), which may comprise energy sources (e.g., generation and storage), such as PVs, BESS or the like. Loop 1 (472) and loop 2 (478) may include one or more transformers, such as MV transformers 496, 497, respectively, and be connected to switchgear 475. In one or some embodiments, MV transformers 496, 497 may comprise step-up transformers. As shown in FIG. 4A, plant 480 is shutdown with loop 1 (472) and loop 2 (478) not powered. Plant 480 further includes one or more microgrid customer loads, such as loads A (454) and loads B (460), and various control electronics, such as relay 468, plant RTAC 462, and plant power plant controller (PPC) 470.

As shown, islanding breaker 438 may be electrically connected to substation bus 437. Further, as shown islanding breaker 438 is closed, meaning that the plant 480 is shutdown (though potentially with electrical connections closed into the grid. Therefore, power flows from substation 1 (412) and substation 2 (420) to loads A (454) and loads B (460). In one or some embodiments, islanding breakers 434 and/or 438 is under the control of the utility. Alternatively, or in addition, islanding breakers 434 and/or 438 may be under the control of the plant.

Figure 4B:
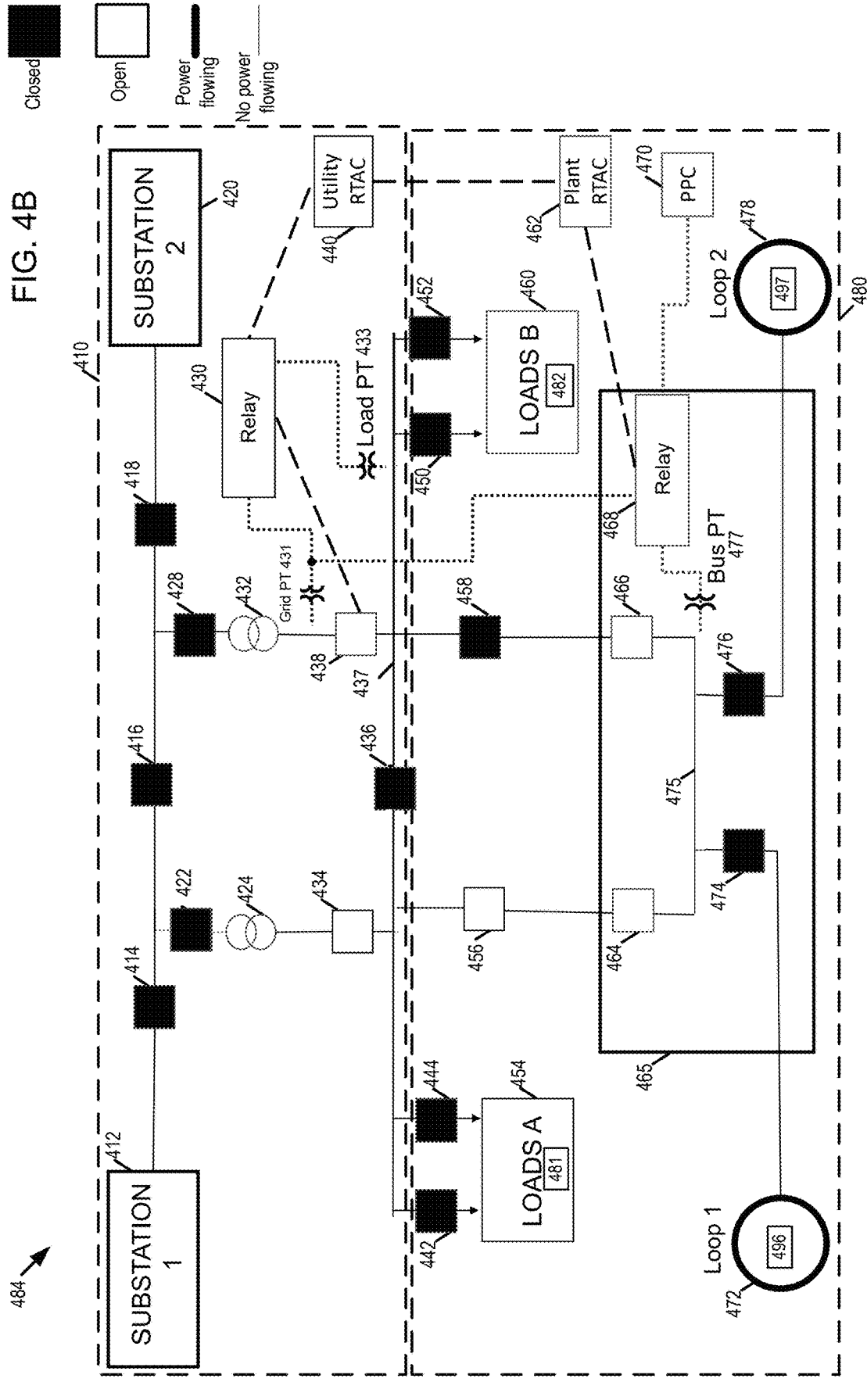
FIG. 4B is a schematic layout of the grid and the plant in which the plant is in shutdown mode and isolated from the grid and microgrid customer loads.

FIG. 4B is a schematic layout 484 of the grid 410 and the plant 480 in which the plant 480 is in shutdown mode and isolated from the grid and microgrid customer loads. Specifically, FIG. 4B illustrates the plant 480 and microgrid customer loads (loads A (454) and loads B (460)) as being islanded, with the breaker positions within the islanded mode of operation (see islanding breaker 438 is open, thereby islanding plant 480 from grid 410). Thus, loads A (454) and loads B (460) have lost power.

Figure 4C:
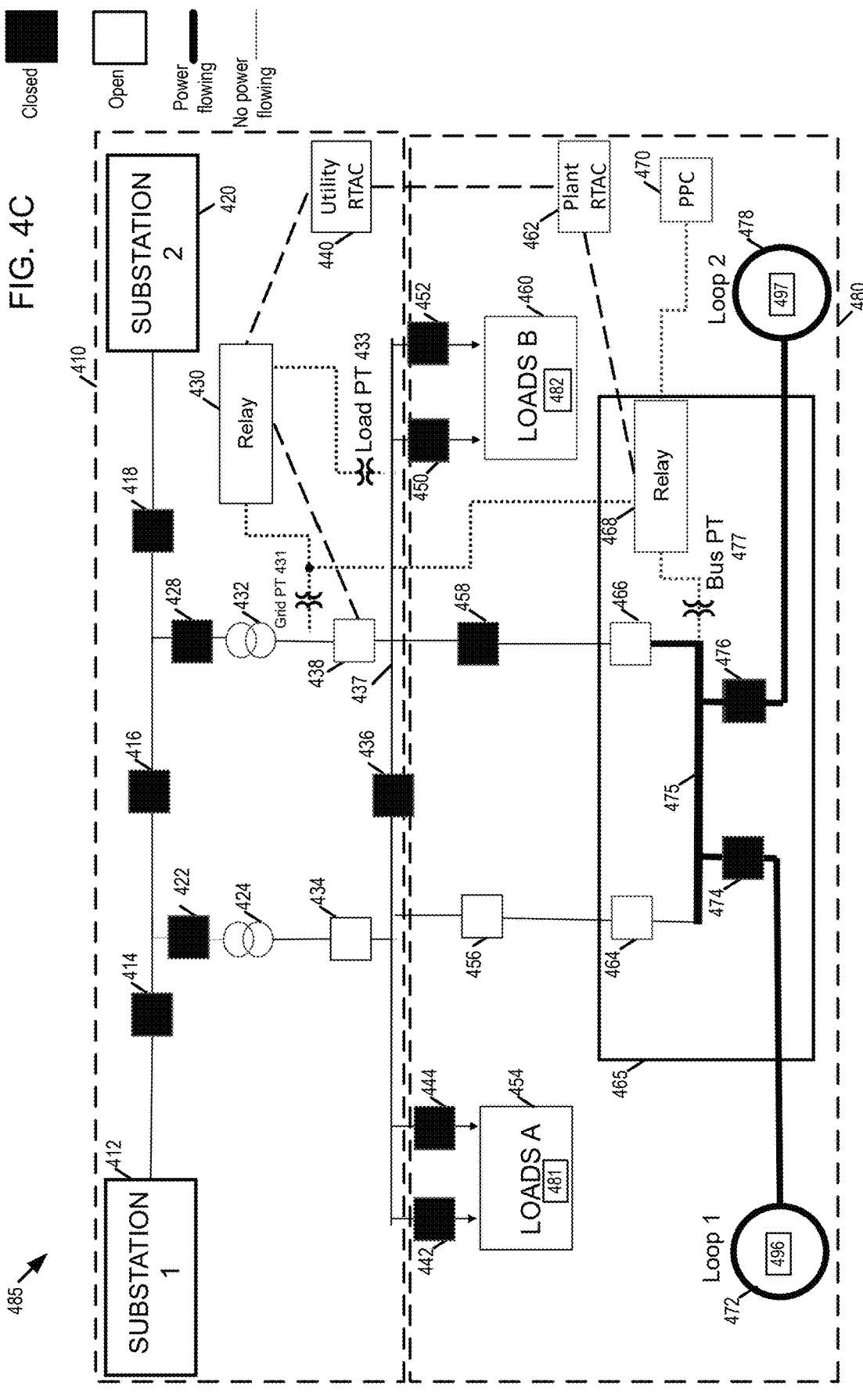
FIG. 4C is a schematic layout of the grid and the plant in which the grid is offline and the feeder loops in the plant are energized (e.g., the plant auxiliary blackstart).

In one or some embodiments, blackstart may be initiated in which the loop(s) and/or the feeder(s) may be energized. For example, in one or some embodiments, the feeders may be energized, such as illustrated in the schematic layout 485 in FIG. 4C. See loop 1 (472) and loop 2 (478) energized (including MV transformers 496, 497). Once the feeders are energized, auxiliary power is resumed to the plant auxiliary circuit. In this regard, FIG. 4C illustrates an example of a plant auxiliary blackstart, in which one or more electronic circuits or devices are powered within the plant. In particular, any one, any combination, or all of loop 1 (472), loop 2 (478), switchgear 475, relay 468, buses (e.g., bus PT 477), feeders within the plant, or any other device associated with the plant (including within section 465) may be powered in order to power one or more operations within the plant. After which, one or more checks may be performed prior to performing either a hard start blackstart or a soft start blackstart may be performed. As one example, prior to performing the microgrid customer load blackstart (hard start) (see FIG. 4D), the plant may determine whether there is sufficient power in order to power loads A (454) and loads B (460). As another example, prior to performing the utility blackstart (hard start) (see FIG. 4E), the plant may determine whether there is sufficient power in order to power a section of the grid (e.g., the branch leading to substation 2 (420)).

Figure 4D:
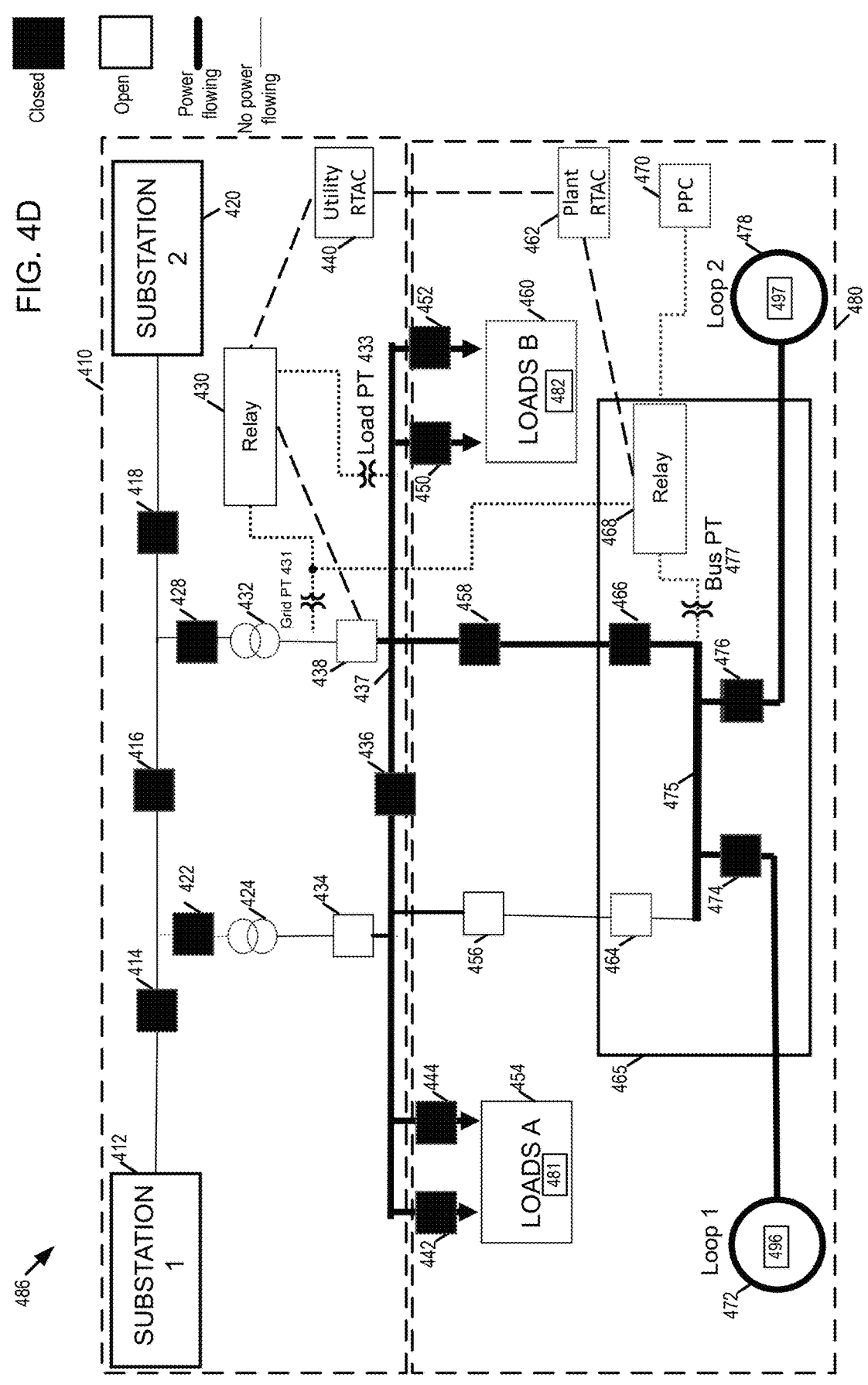
FIG. 4D is a schematic layout of the grid and the plant in which the grid is offline and the feeder loops and the microgrid customer loads are energized (e.g., the microgrid customer load blackstart).
Figure 4E:
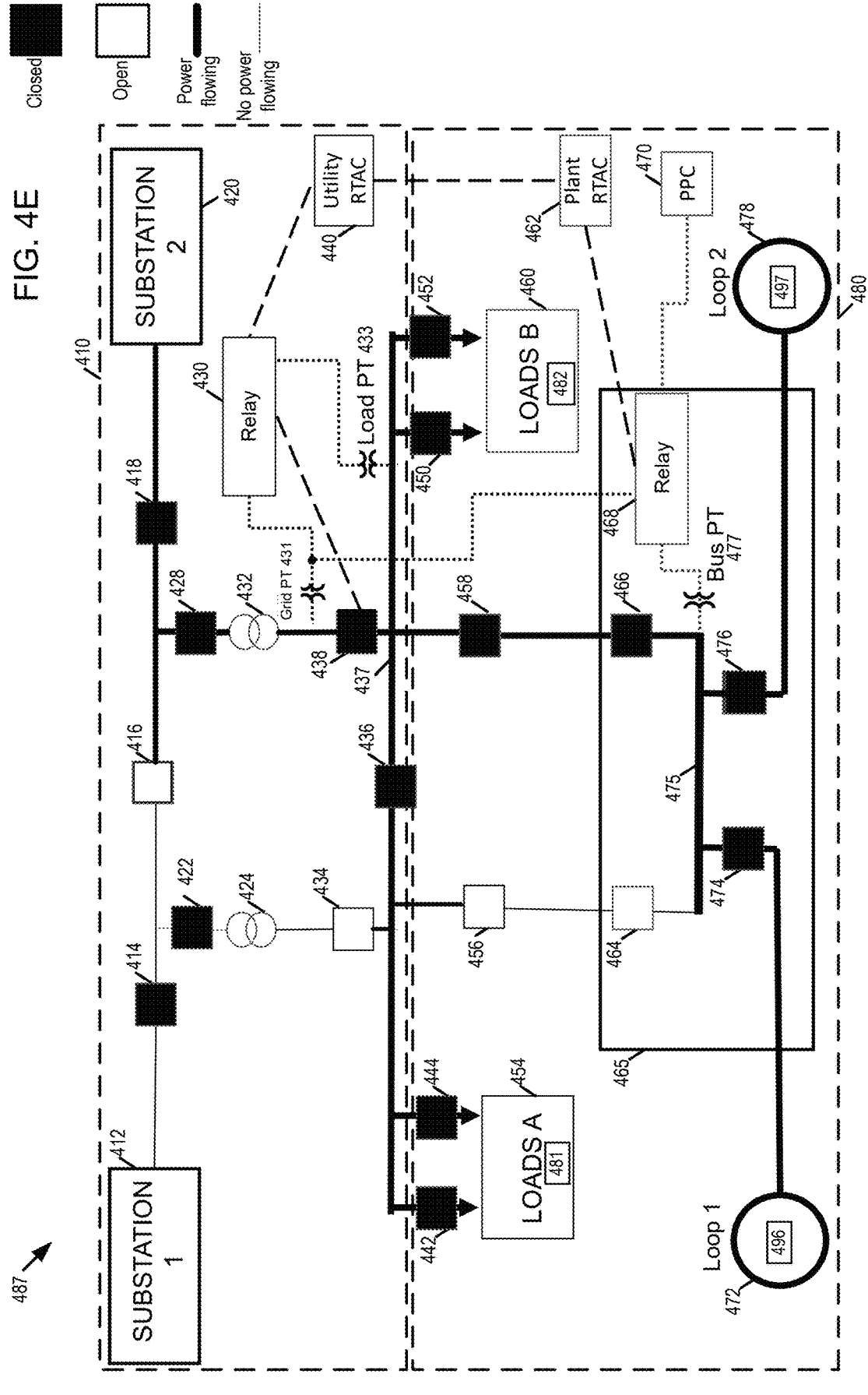
FIG. 4E is a schematic layout of the grid and the plant in which the plant energizes the feeder loops, the microgrid, and a section of the grid (e.g., the utility blackstart).

Thus, FIGS. 4D-E illustrate the hard start blackstart (e.g., after performing the plant auxiliary blackstart (shown in FIG. 4C), performing the microgrid customer load blackstart (hard start) (by closing breaker/switch 466, which acts as an isolation breaker, in FIG. 4D) and then the utility blackstart (hard start) (by closing islanding breaker 438 in FIG. 4E)). As shown in FIG. 4E, upon closing the islanding breaker 438, the branch to substation 2 (420) is powered, including transformer 432. Thus, in one or some embodiments, the utility blackstart (hard start) may power a specific section or specific branch within the utility grid, such as illustrated in FIG. 4E. Alternatively, in the event that breaker/switch 428 is open when islanding breaker 438 is closed, the specific section or specific branch within the utility grid that is powered would only include transformer 432.

Figure 4F:
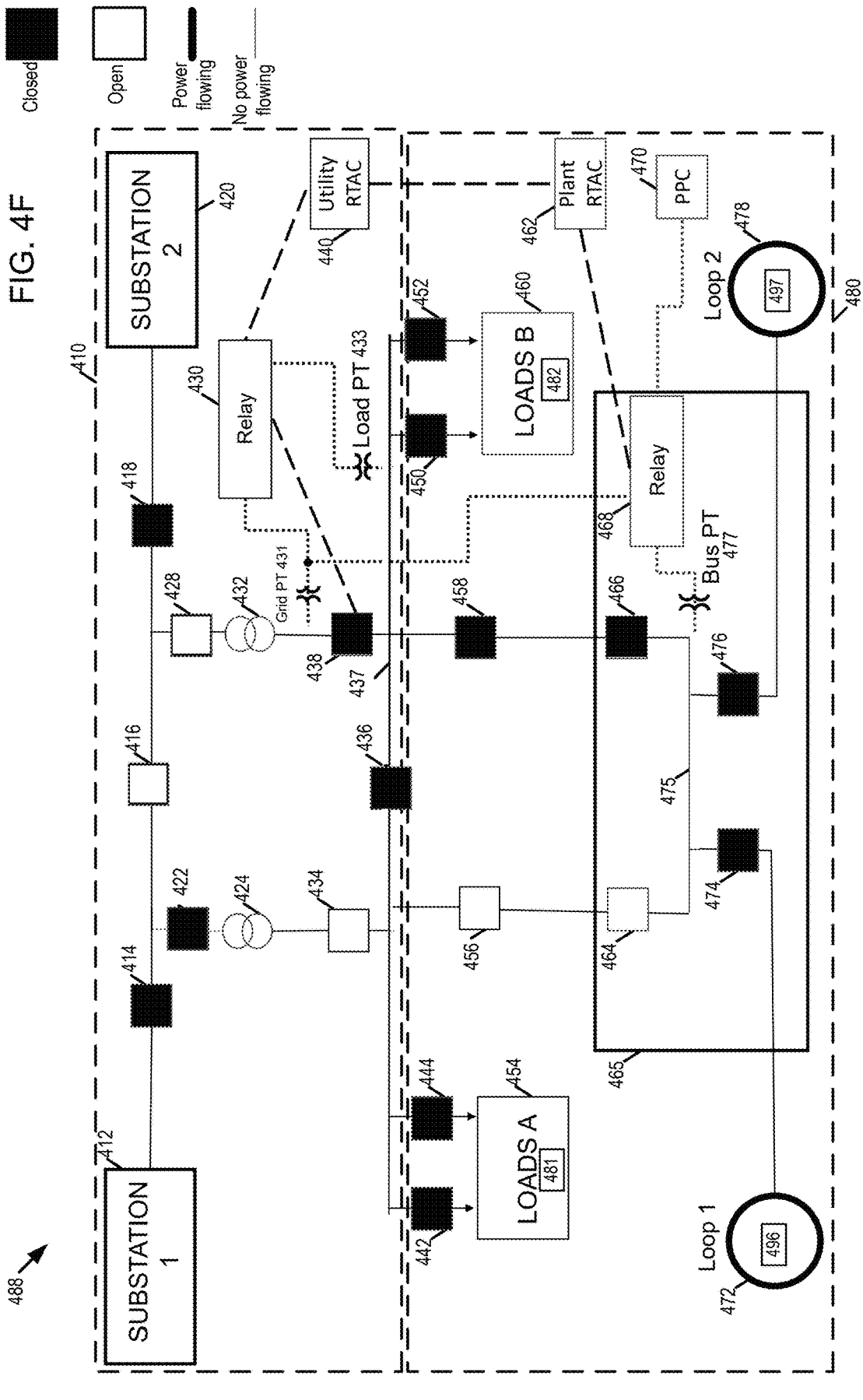
FIG. 4F is a schematic layout of the grid and the plant in which the plant is shut down, the islanding breaker is closed and the soft start GSU disconnection breaker is open.
Figure 4G:
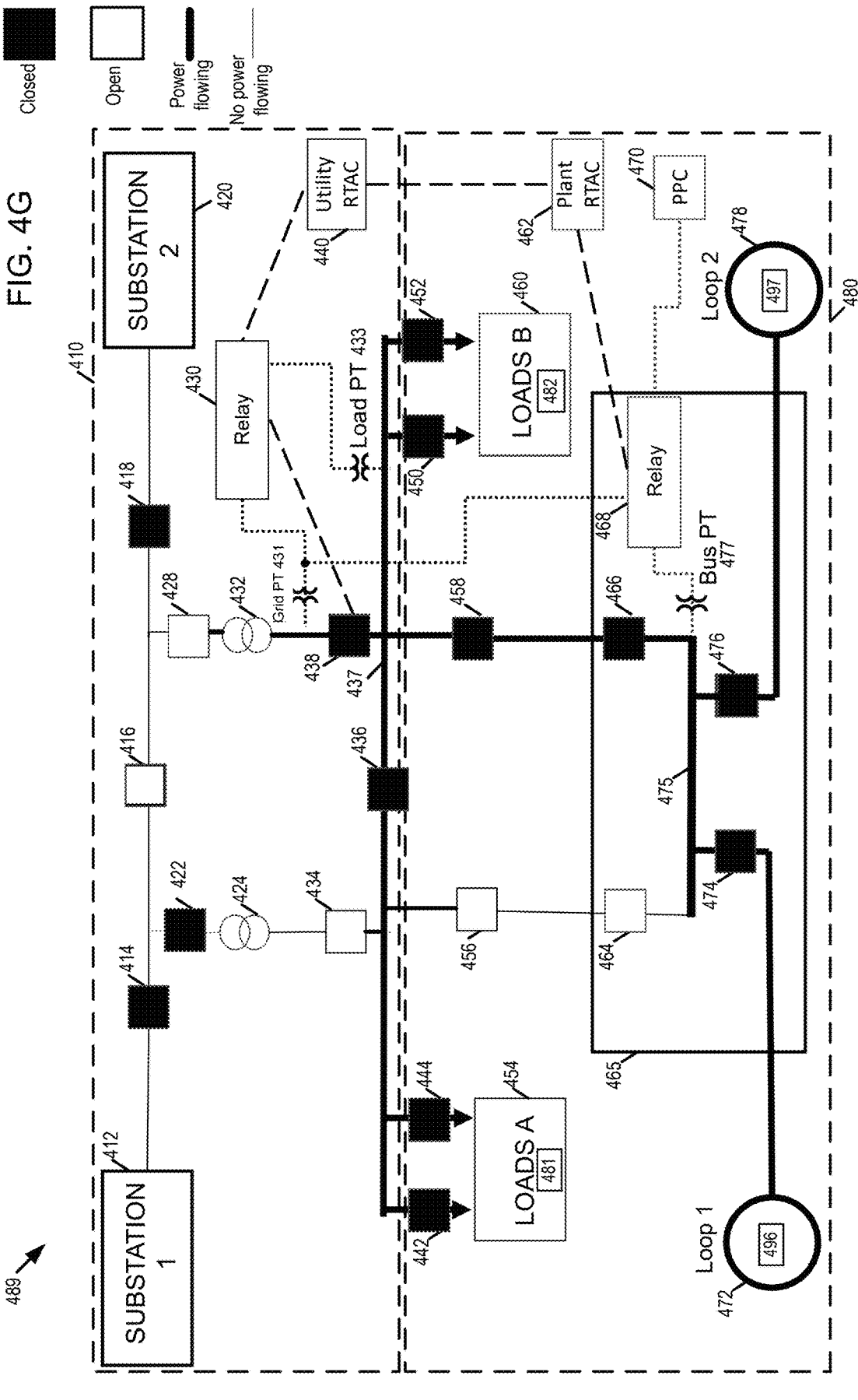
FIG. 4G is a schematic layout of the grid and the plant energizes the feeder loops, powers the microgrid customer loads, the islanding breaker is closed and the soft start GSU disconnection breaker is open in order to prime the generator step-up (GSU) transformer and the isolation breaker is closed in order to prime the transformers to the customer loads.
Figure 4H:
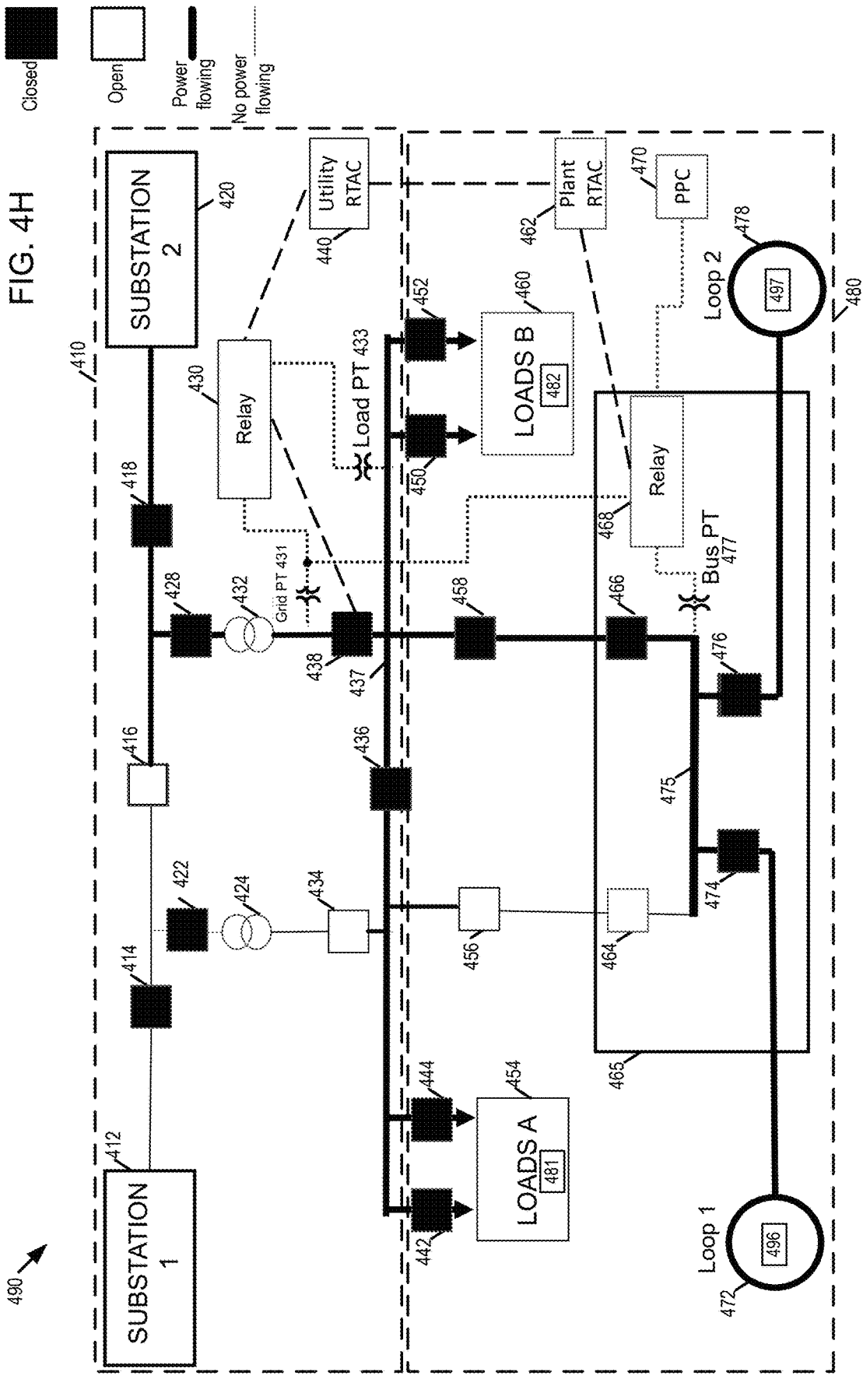
FIG. 4H is a schematic layout of the grid and the plant energizes the feeder loops, powers the microgrid, the islanding breaker is closed and the soft start GSU disconnection breaker is closed in order to supply power to a portion of the grid.
Figure 4I:
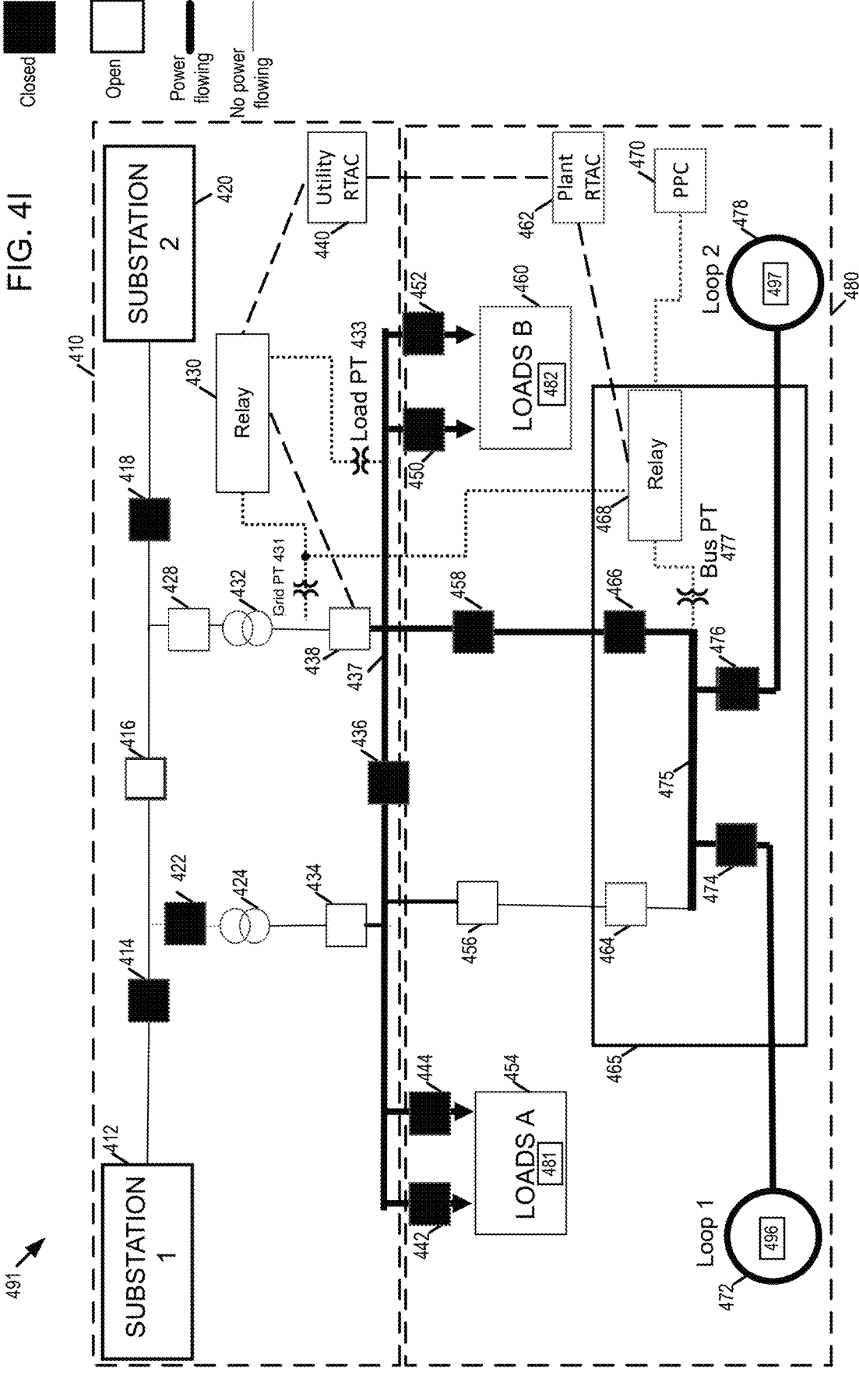
FIGS. 4I-J illustrate the soft start for the microgrid (see FIG. 4I), after which a hard start is performed for the utility (see FIG. 4J).
Figure 4J:
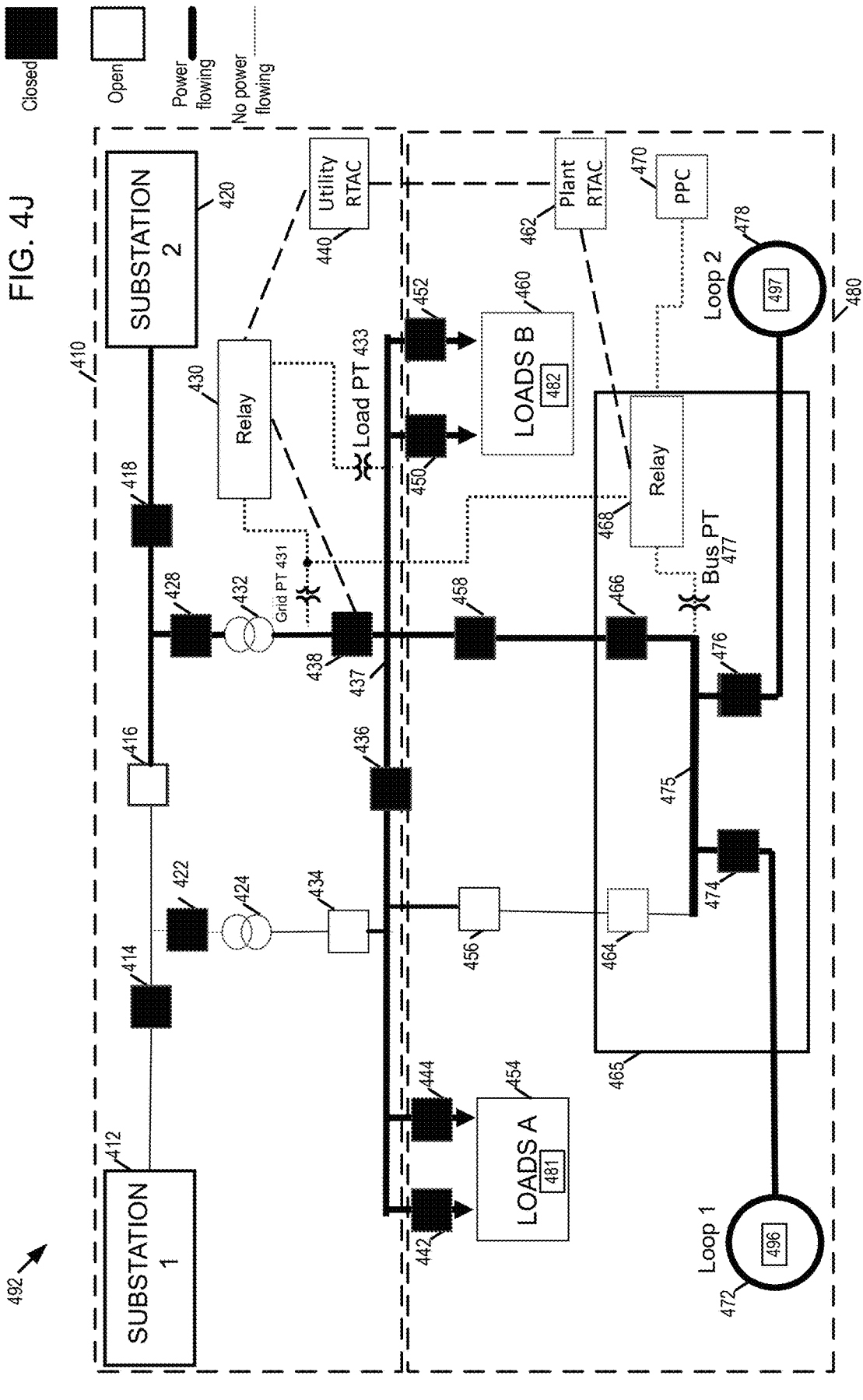
Figure 4K:
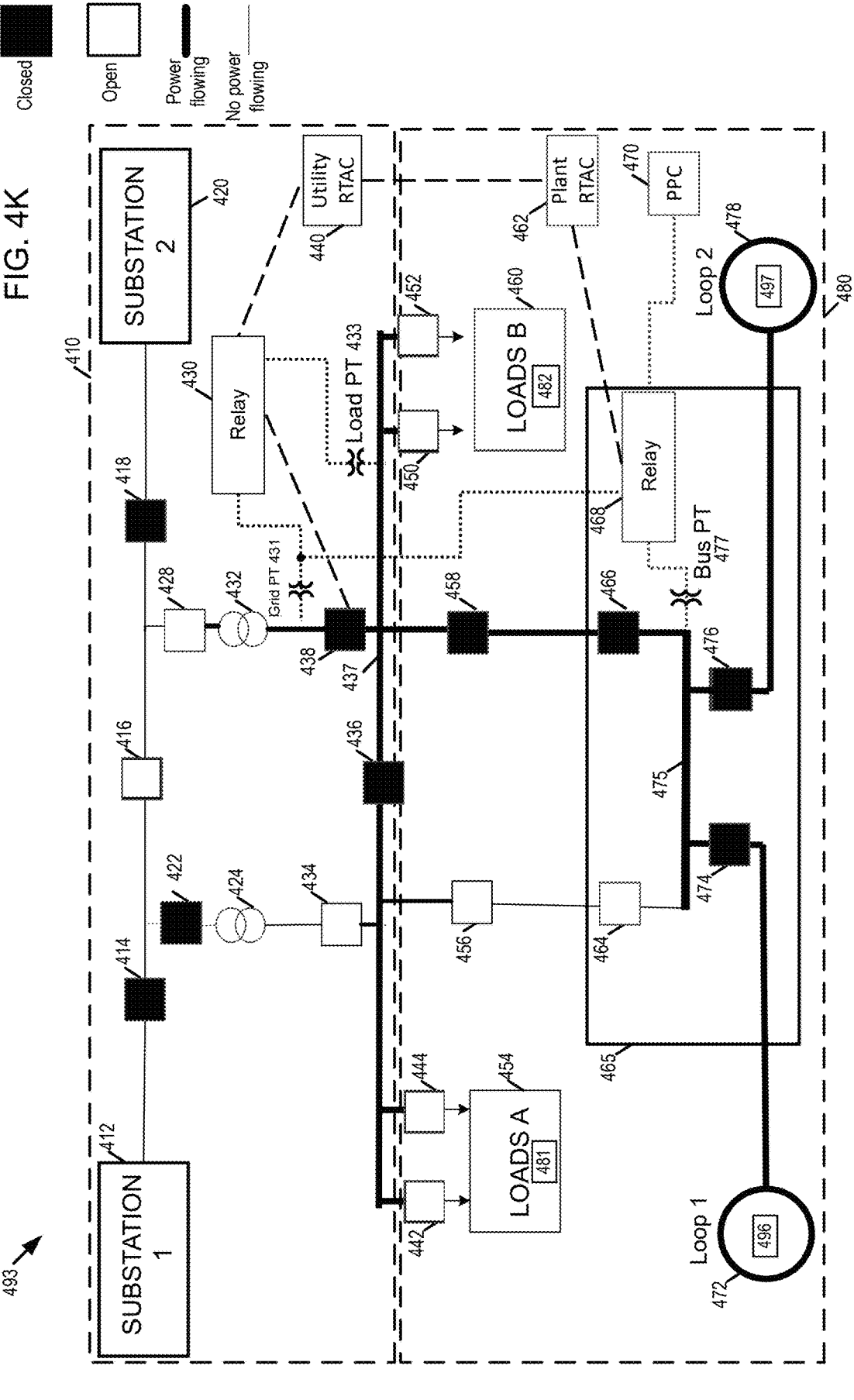
FIGS. 4K-M illustrate the soft start for the grid (FIG. 4K), after which a remainder of the portion of the grid is powered (FIG. 4L), thereafter a hard start is performed for the microgrid (FIG. 4M).
Figure 4L:
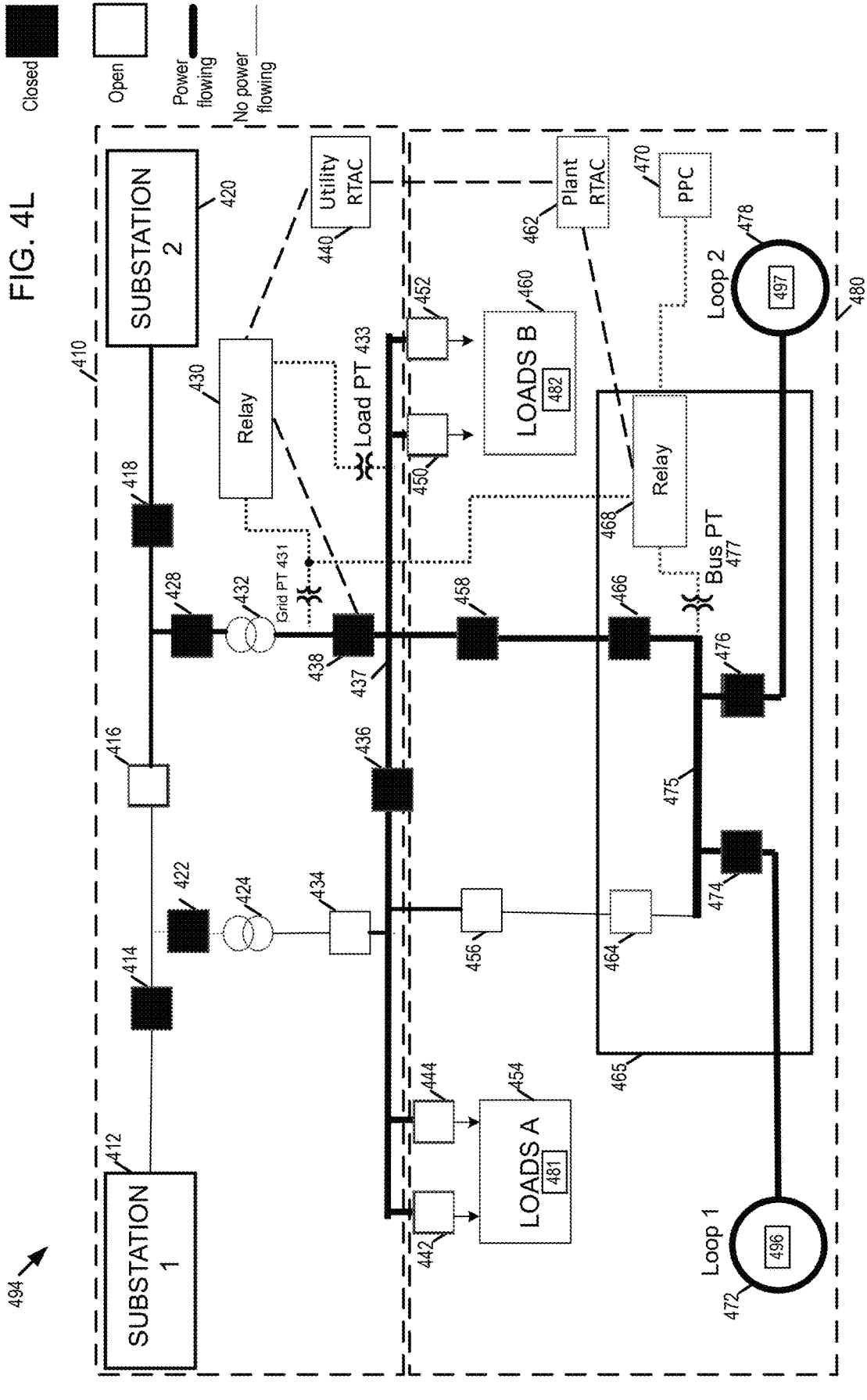

FIGS. 4F-H illustrate the soft start blackstart for both the grid and the microgrid (FIG. 4F illustrates the plant in shutdown mode; FIG. 4G illustrates the microgrid customer load blackstart (soft start) and the utility blackstart (soft start); FIG. 4H illustrates the powering of the remaining sections of the part of the grid). FIGS. 4I-J illustrate the soft start for the microgrid (see FIG. 4I for the microgrid customer load blackstart (soft start)), after which a hard start is performed for the utility (see FIG. 4J for the utility blackstart (hard start)). FIGS. 4K-L illustrate the soft start for the grid (see FIG. 4K for the utility blackstart (soft start)), after which a hard start is performed for the microgrid (see FIG. 4L for the microgrid customer load blackstart (hard start)).

With regard to FIG. 4D, the microgrid customer loads may be powered or energized, such as illustrated in the schematic layout 486 in FIG. 4D. In this way, after powering the feeders, the microgrid may be reconnected (see breaker/switch 466 closed in FIG. 4D) and powered by the energized loop 1 (472) and loop 2 (478). After which, the section of the grid (by closing breaker/switch 428) is powered, as shown in the schematic layout 487 in FIG. 4E. In one or some embodiments, breakers/switches 442, 444, 450, 452 are under the control of the plant. Alternatively, or in addition, breakers/switches 442, 444, 450, 452 may be under the control of the third party (such as the utility and/or the customer, such as customer who controls loads A (454) and loads B (460)). In such an instance, responsive to the plant that any one, some or all of breakers/switches 442, 444, 450, 452 are to be controlled (e.g., opened and/or closed), the plant may send a communication to the third party to perform the requested control.

Either after or before powering the microgrid customer loads, the plant may perform a hard start utility blackstart, in which power may be provided to different sections of the utility grid (e.g., auxiliary power for different generation assets). For example, the utility blackstart may power either

424 or 432, which may comprise generator step-up transformers. In this regard, the utility blackstart may power various devices within the grid 410 in order to transition the grid from a blackout or shutdown. Thus, in one or some embodiments, the section(s) of the grid subject to blackstart may be dynamically determined. For example, in one instance, the utility may control breakers/switches 418 and 428 and transformer 432 in order to blackstart substation 2 (420). After which, the utility may control breakers/switches 414 and 422 and transformer 424 in order to blackstart substation 1 (412). In another instance, the sequence may be reversed. In this regard, the utility may control the sequence in which the sections of the grid are blackstarted.

Further, the powering of various devices with the utility blackstart may be performed in one or several ways. In one way, the utility blackstart may comprise a hard blackstart (alternatively termed a hard start utility blackstart), in which a section of the grid 410 may be powered after powering the microgrid customer loads. For example, after powering the loads A (454) and loads B (460), islanding breaker 438 may be closed. Closing islanding breaker 438 may result in an inrush of current to re-energize step-up transformer 432. The amount of inrush current may depend on the state of the step-up transformer 432. For example, in the event that the step-up transformer 432 has been de-energized for a while, a greater amount of inrush current may be needed to establish the magnetic field in the step-up transformer 432. Further, the amount of inrush current may depend on the impedances in the various parts of the grid 410.

In another way, the utility blackstart may comprise a soft blackstart (alternatively termed a soft start utility blackstart), in which the section of the grid (e.g., the step-up transformer 432) is considered when grid-forming. For example, when initiating blackstart, such as starting the PCSs in grid forming (e.g., ramping up the voltage in the PCSs), the voltage of various parts of the grid (e.g., the step-up transformer 432) may be ramped up or increased as well. Various timings of ramping up the voltage in section(s) of the grid and ramping up the voltage in the section(s) of the plant are contemplated. In one embodiment, ramping up the voltage in section(s) of the grid and ramping up the voltage in the section(s) of the plant may be performed concurrently. This is illustrated in FIGS. 4F-G, in which in schematic 488 in FIG. 4F, the islanding breaker 438 is closed whereas the soft start GSU disconnection breaker/switch 428 is open. After which, schematic 489 in FIG. 4G illustrates that the feeders are powered so that the grid transformer receives current (sec 432). Of note, the soft start GSU disconnection breaker/switch 428 remains open so that there is no current on the other side of the transformer; instead, the transformer is being primed. After waiting a predetermined amount of time, for example, the soft start GSU disconnection breaker/switch 428 may be closed (as shown in schematic 490 in FIG. 4H) in order to blackstart the section of the utility for substation 2 (420).

FIGS. 4I-J illustrate the soft start for the microgrid (see schematic 491 in FIG. 4I), after which a hard start is performed for the utility (see schematic 492 in FIG. 4J). Specifically, with islanding breaker 438 opened and breaker/switch 466 (acting as an isolation breaker) closed, FIG. 4I illustrates the soft start for powering: loop 1 (472) (including MV transformer 496); loop 2 (478) (including MV transformer 497); switchgear 475; substation bus 437; loads A (454) (including transformer 481); and loads B (460) (including transformer 482). In one or some embodiments, transformers 481, 482 may comprise step-down transformers. Thus, in the customer load microgrid blackstart (soft start), at least some electronics within the plant that is powered in the plant auxiliary blackstart (e.g., the MV transformers 496, 497) are powered or ramped up at least partly simultaneously with at least some of the electronics for the customer loads (e.g., transformers 481, 482 for loads A (454) and loads B (460), respectively). In this regard, the microgrid customer load blackstart (soft start) may ramp at least one transformer for the plant (e.g., one or both of MV transformer 496, 497) at least partly with ramping at least one transformer for the customer load(s) (e.g., one or both of transformer 481, 482). More specifically, the at least partly simultaneous ramping of the transformers in different parts (one part in the plant and another part in the customer load) may thereby reduce the inrush of current. In one embodiment, the ramping may comprise ramping up in one part (e.g., the transformer(s) in the plant, such as one or both of MV transformer 496, 497) and ramping down in another part (e.g., the transformer(s) in the customer load(s), such as transformers 481, 482 or a step-down transformer separate from and working in combination with the customer load(s)). After which, islanding breaker 438 may be closed (e.g., under control of the plant or responsive to a communication sent from the plant to the utility), resulting in a utility blackstart (hard start).

Figure 4M:
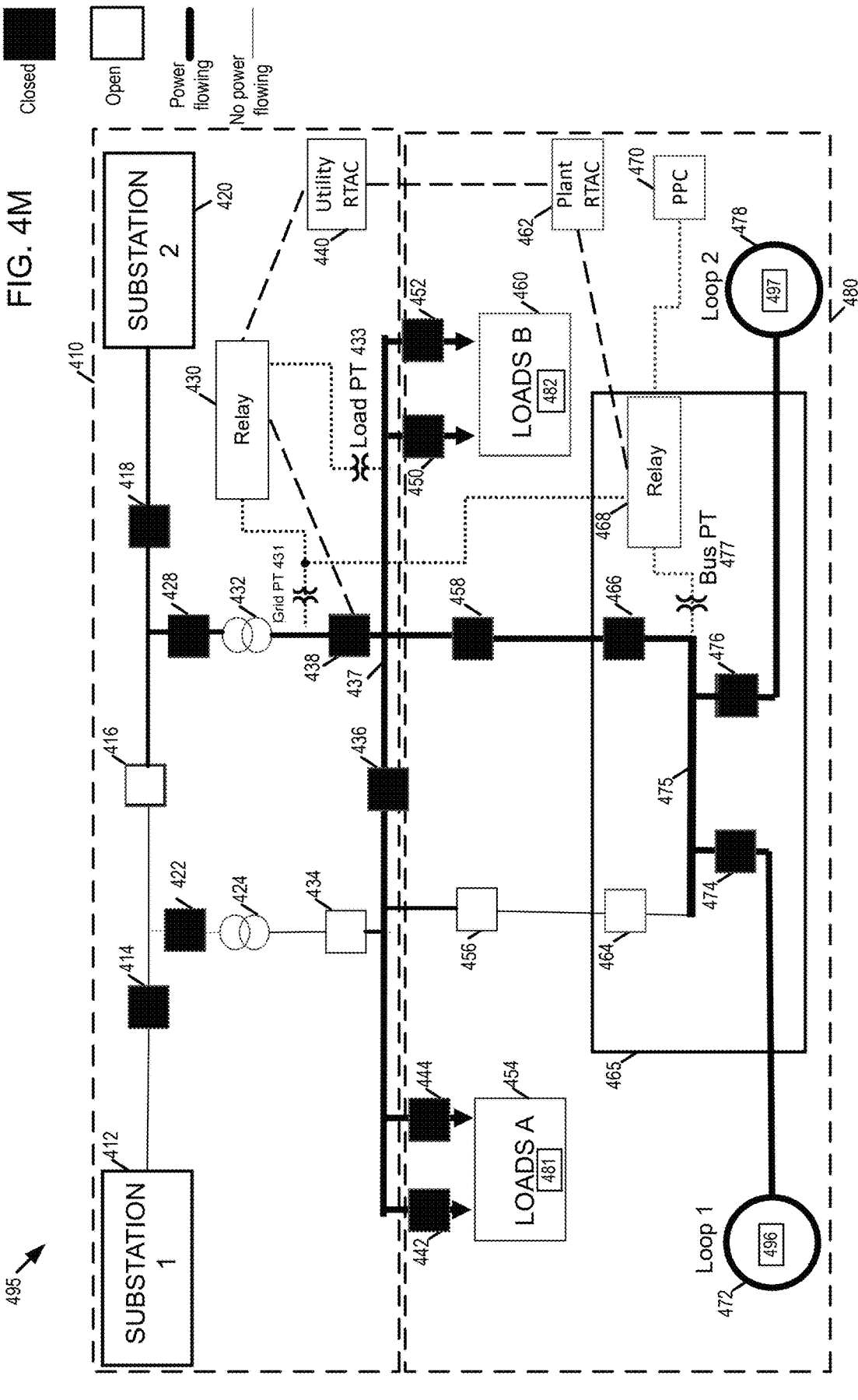

FIGS. 4K-M illustrate the soft start for the grid (see schematic 493 in FIG. 4K), after which a remainder of the portion of the grid is powered (see schematic 494 in FIG. 4L), thereafter a hard start is performed for the microgrid (see schematic 495 in FIG. 4M). Specifically, FIG. 4K illustrates the utility blackstart (soft start), with islanding breaker 438 closed and breakers/switches upstream of step-up transformer 432 (e.g., breaker/switch 428) open, resulting in ramping up step-up transformer 432. Specifically, with islanding breaker 438 closed and breaker/switch 466 (acting as an isolation breaker) closed, FIG. 4K illustrates the soft start for powering: loop 1 (472) (including MV transformer 496); loop 2 (478) (including MV transformer 497); switchgear 475; and step-up transformer 432. Thus, in the utility blackstart (soft start), at least some electronics within the plant that is powered in the plant auxiliary blackstart (e.g., the MV transformers 496, 497) are powered or ramped up at least partly simultaneously with at least some of the electronics for the grid (e.g., step-up transformer 432). In this regard, the utility blackstart (soft start) may ramp up at least one transformer for the plant (e.g., one or both of MV transformer 496, 497) at least partly with at least one transformer for the grid (e.g., step-up transformer 432). More specifically, the at least partly simultaneous ramping of the transformers in different parts (one part in the plant and another part in the grid) may thereby reduce the inrush of current. In one embodiment, the ramping may comprise ramping up in one part (e.g., the transformer(s) in the plant, such as one or both of MV transformer 496, 497) and ramping up in another part (e.g., the transformer(s) in the grid, such as step-up transformer 432). As such, the step-up transformer 432 may be considered a load (similar to a customer load in the microgrid) that is to be ramped in the utility blackstart (soft start).

After at least partly (or entirely) ramping up step-up transformer 432, the portion of the grid may be blackstarted, as shown in FIG. 4L (see breakers/switches 418 and 428 so that substation 2 (420) is powered). After which, the plant may perform a customer load microgrid blackstart (hard start), as illustrated in FIG. 4M, by closing breakers/switches 442, 444, 450, 452.

Thus, in one or some embodiments, when ramping up the voltage of the PCSs in the plant 480, the voltage of the step-up transformer 432 may at least partly concurrently be ramped up. In order to accomplish this without the inrush of current, various other sections of the grid may be controlled. For example, substation A (412) and substation B (420) may be electrically disconnected (such as by opening breakers/switches 414, 416, 418, so that breakers/switches 414, 416, 418 effectively become islanding breakers). Further, breaker 438 may be closed so that the step-up transformer 432 may be charged. Effectively, while energizing the step-up transformer 432, other parts of the grid, such as the substations, are not routed power. In this way, a lower amount of inrush current results due to the step-up transformer 432 being energized (e.g., prior to closing switch/breaker 428). In particular, after the closing switch/breaker 428, such as to power substation 2 (420), there may be an inrush of current; though, the inrush may be lower due to the previous energizing of the step-up transformer.

Various methods are contemplated to ramp-up the voltage in various parts of the grid 410, such as the step-up transformer 432 in the grid 410. In one way, the ramp-up may occur with PCS ramp-up times tuned to effectively decrease the inrush of the GSU. Thus, the re-powering of the grid may be performed in piecemeal fashion.

As discussed above, various parts of the grid 410 and the plant 480 may be controlled as part of the blackstart. In one or some embodiments, the plant 480 may control both the sections within the plant 480 and the sections of the grid 410. For example, the plant 480 (e.g., the plant RTAC 512) may send commands to the grid 410 (e.g., the utility RTAC 510) in order to control the sections of the grid (e.g., the opening and/or closing of switches or breakers within the grid. Alternatively, the plant 480 may control sections within the plant 480 and the utility may control the sections of the grid 410. For example, the plant 480 (e.g., the plant RTAC 512) may send the status of the plant 480 (e.g., the status of different sections of the plant 480) to the utility (e.g., the utility RTAC 510). In turn, the utility (e.g., the utility RTAC 510) may determine and command the sections of the grid 410. Still alternatively, the grid 410 may control both the sections within the plant 480 and the sections of the grid 410. For example, the plant 480 (e.g., the plant RTAC 512) may send the status of the plant 480 (e.g., the status of different sections of the plant 480) to the utility (e.g., the utility RTAC 510).

In turn, the utility (e.g., the utility RTAC 510) may determine and command the sections of the grid 410 and the sections of the plant 480. In one particular example, the utility may access one or more internal aspects of the plant (e.g., how much solar power and battery state of charge are available). In turn, the utility may control one or both of the plant 480 or the grid 410 accordingly (e.g., the utility may determine how much the plant may provide in auxiliary power to the utility generation assets).

In this regard, the utility control may be based on communication with the plant. For example, the utility may receive a communication indicating an amount of power that the plant may generate (e.g., the peak load that the plant may support). In one or some embodiments, the utility may receive the indication of the peak load and act accordingly (e.g., the utility may assume that the peak load is constantly available). Alternatively, the utility may communicate, such as in real-time, with the grid to determine a current amount of power that is available from the plant (e.g., how much solar power and battery power are currently available). In this regard, the utility may plan which sections of the grid to blackstart based on the real-time information about the current amount of power available from the plant.

FIGS. 4A-E illustrate one example implementation. Other hardware implementations are contemplated. As one example, the architecture for power draw from the PV/BESS to the PCS controls and communication systems may have different DC/DC power supply specifications depending on the voltage step down required. As another example, different control checks and control actions may be implemented depending on the power plant system architecture and depending on the use-case. As still another example, separate larger UPSs may be added to the PCS controls and communication systems and BESS in the plant, although the additional of separate and larger UPSs may be expensive. As still another example, different types of solar and battery systems, power conversion systems, and other variations of balance of plant equipment are contemplated. Further, the sequence of actions may be implemented with power plant controllers and communication devices that may allow a low degree of customization. As yet another example, the sequence illustrated in FIGS. 4A-E illustrate that the feeders are first energized, after which the microgrid customer load are energized, yet after which the portion of the grid is energized. Alternatively, the sequence (whether with the hard start or the soft start) may be performed such that the portion of the grid is energized prior to energizing the microgrid customer loads.

Thus, various blackstart operations are contemplated, as discussed above. One example blackstart operation comprises transitioning the plant from shutdown mode to islanded mode. In particular, the transition from shutdown mode to Islanded mode may be used to startup part or all of the plant operations (such as the internal plant microgrid when the utility grid is offline and the plant is in a shutdown mode (e.g., plant controls and communications are powered by UPSs). In one or some embodiments, the shutdown of the plant may be a planned event. Further, this transition from shutdown mode to islanded mode may also be referred to as a blackstart because all surrounding systems are de-energized, or blacked out. The ability to blackstart the plant may depend on the amount of time the plant has been shutdown due to the limited availability of the UPS devices for plant controls and communications. A successful black start may accomplish one or more different functions depending on the loads that are required to be serviced during a black start event. As discussed in more detail below, some or all plant PCSs may be used in grid-forming mode (GFM) during any one, any combination, or all of the blackstart sequences discussed herein.

Again, the transition from shutdown mode to islanded mode may comprise a plant auxiliary blackstart. On a general level, the plant auxiliary blackstart may resume power to devices in preparation for performing other black-starting operations (e.g., the customer load blackstart and/or the utility blackstart). As discussed above, the plant, in shutdown, may have a limited resources, such as critical electronics being powered by UPSs. As explained in more detail below, the plant auxiliary blackstart may: (1) receive a trigger to initiate the plant auxiliary blackstart (e.g., receive the trigger from any one, any combination, or all of: (i) an internal trigger within the plant; (ii) an external trigger from the utility; or (iii) an external trigger from a customer that receives power from the customer load microgrid); (2) configure the plant for energizing loads (e.g., configure the PCSs to start up in grid forming mode); and (3) energize the auxiliary loads (e.g., provide auxiliary power to one or more plant loads).

In particular, the plant auxiliary blackstart may be used to startup some or all electronic devices within the plant, such as PCSs, when the plant is disconnected from the utility grid (e.g., the utility grid may be online or offline). This transition from shutdown mode to islanded mode may be used to resume power to auxiliary loads such as any one, any combination, or all of: BESS HVAC; control electronics (e.g., control of the BESS HVAC, the BESS, the PVs, etc.); or communication devices. In one or some embodiments, the ability to blackstart the AES plant may depend on the amount of time the plant has been shutdown for due to the available UPS power for various plant components.

Figure 5A:
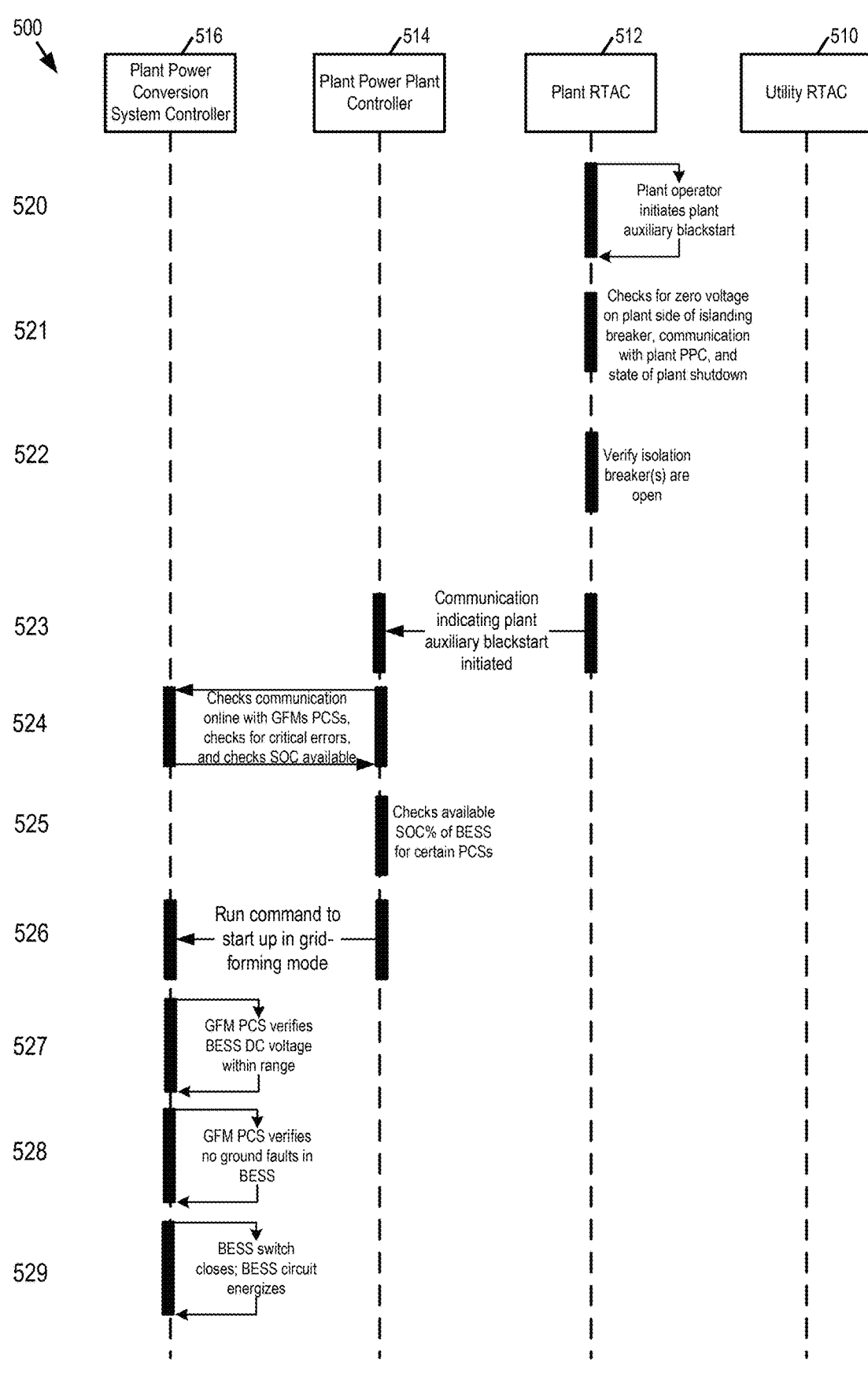
FIGS. 5A-B is a sequence diagram illustrating a feeder auxiliary blackstart.
Figure 5B:
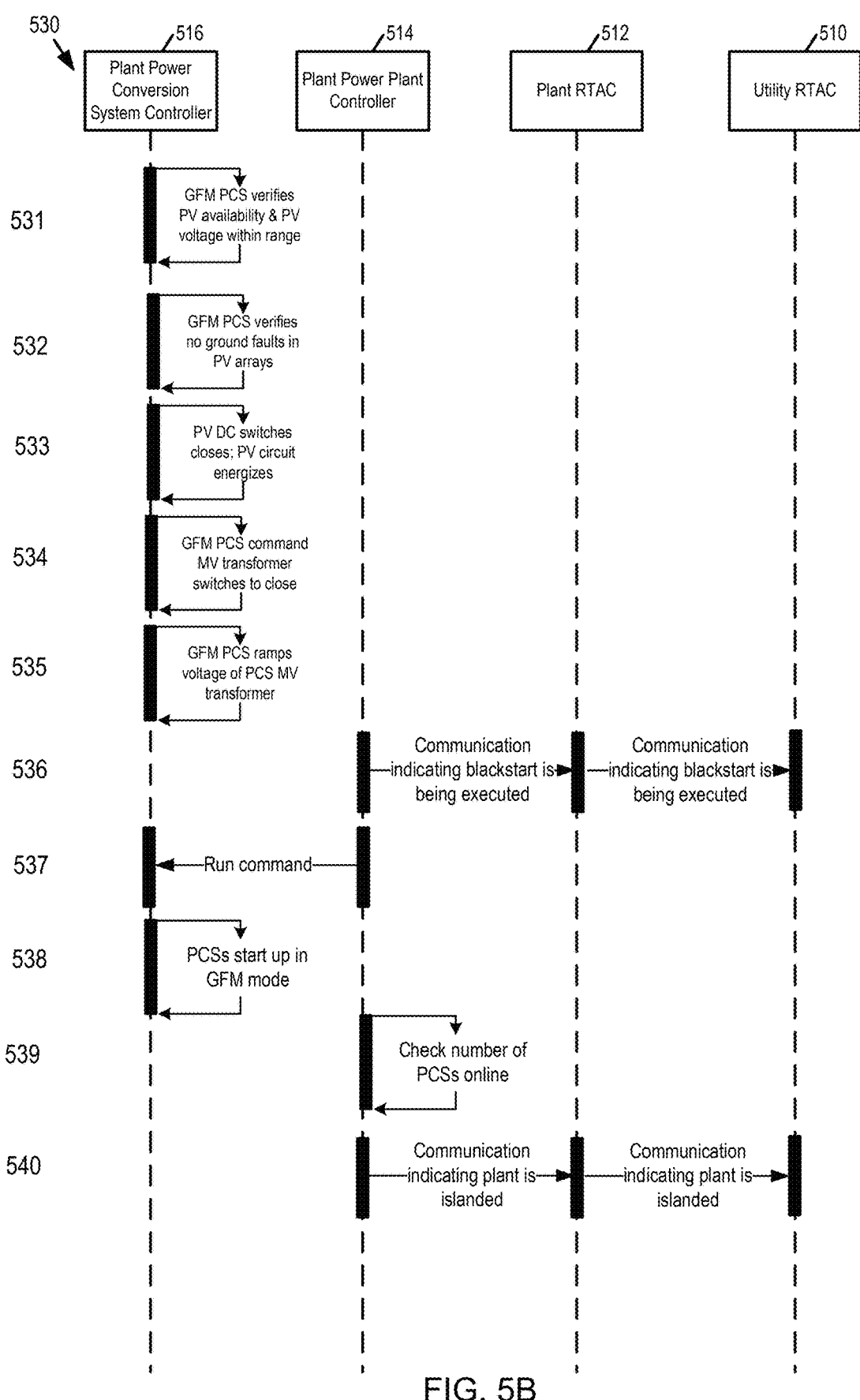

FIGS. 5A-B are example sequence diagrams 500, 530 illustrating part or all of the plant auxiliary blackstart sequence (e.g., a feeder auxiliary blackstart). In one or some embodiments, the plant auxiliary blackstart sequence may be triggered in one of several ways. In one way, the trigger may be initiated by the plant. For example, at 520, the plant operator may initiate the plant auxiliary blackstart. Alternatively, the utility may send a communication to the plant to trigger the plant auxiliary blackstart (e.g., the utility RTAC 510 may send a communication (indicating a request to initiate the plant auxiliary blackstart) to the plant RTAC 512).

After initiation, the plant may perform one or more checks in order to determine the state of the plant, such as checking whether the plant is islanded from the grid and/or electrically disconnected from the plant microgrid. For example, in one or some embodiments, prior to initiating the plant auxiliary blackstart sequence, the plant is in shutdown mode. In such an instance, the islanding breaker may be open (so that the plant is disconnected from the grid) and the isolation breaker may be open (so that the plant microgrid is disconnected as well). The plant may check this in one of several ways. For example, at 521, the plant may check for any one, any combination, or all of: zero voltage on plant side of islanding breaker, communication with plant PPC 514 is available, and the state of the plant is shutdown. In the event that islanding breaker is not open, the plant RTAC 512 may open the islanding breaker.

Further, at 522, the plant RTAC 512 may verify that the isolation breaker is open. If the isolation breaker is closed, the plant RTAC 512 may command (via SCADA) the isolation breaker to be closed. After which, at 523, the plant RTAC 512 may send a communication to the plant PPC 514 indicating that the plant auxiliary blackstart has been initiated.

After the triggering of the plant auxiliary blackstart and performing the initial checks (e.g., the islanding breaker is open and/or the isolation breaker is open), the plant may perform one or more actions in order to form the grid for the plant. For example, any one, any combination, or all of 524-529 and 531-533 may be performed in order to form the grid for the plant. For example, at 524, the plant PPC may check for communication with one or more of the PCSs in the plant. For example, one or more of the PCSs in the plant may have blackstart kits in order to be used as part of the plant auxiliary blackstart sequence, such as having an associated UPS in order to maintain communications online so that the Plant PPC 514 may communicate with a respective PCS. If a respective PCS is online (e.g., the plant PPC 514 may communicate with the respective plant PCS controller), the plant PPC may check for critical errors and/or one or more aspects of the state of charge (SOC) (e.g., the available SOC % of the BESS on the respective PCS). If communication is offline, the plant PPC 514 may indicate that the plant auxiliary blackstart sequence is not ready to be performed.

At 525, the plant PPC 514 may check the available SOC % against one or more metrics, such as whether the available SOC % is greater than a predetermined percentage (e.g., compares available SOC % of BESS to determine whether greater than the required SOC % to energize auxiliary loads). In this way, the plant PPC 514 may determine whether there is sufficient power to proceed with grid forming. Sufficiency of power may be determined in one of several ways. In one way, sufficiency may be determined based on comparing whether the available SOC % is greater than a predetermined amount. Alternatively, sufficiency may be determined by first assessing the amount of electronics that needs to be powered (e.g., the number of HVACs for cooling the BESS, etc.) and then assessing whether the available SOC % can meet the power needs of the assessed electronics. If there is sufficient power, at 526, the plant PPC transmits a command to the grid forming PCSs to start up in grid-forming mode. After which, the grid forming PCSs (shown as plant PCS controller 516) performs one or more checks. For example, the grid forming PCSs check aspect(s) of the battery, such as at 527 verifying the BESS DC voltage is within range and/or at 528 verifying no ground faults in the BESS. If the checks are fine, at 529, the grid forming PCSs close the BESS switch so that the BESS circuit energizes (and may thereafter provide power). Alternatively, or in addition, the grid forming PCSs may check one or more aspects of the PVs, such as at 531, verifying the PVs availability and that the PV voltage is within range and/or at 532 verifying no ground faults in the PVs. If the checks are fine, at 533, the grid forming PCSs close the DC switches so that the PV circuit energizes (and may thereafter provide power).

Thereafter, starting up in grid forming mode, the plant may energize the auxiliary loads (e.g., the HVAC, etc.). In particular, at 534, grid forming PCSs may command the medium voltage transformer switches to close and at 535 to ramp the PCS MV transformer (sec MV transformer 496, 497 in FIGS. 4A-M). Further, because of these actions, the plant receives auxiliary power from GFM PCSs that are energized. After which, at 536, the plant PPC 514 may send a communication to the plant RTAC 512 indicating that blackstart is being executed, with the plant RTAC 512 in turn indicating to the utility RTAC 510 that blackstart is being executed. At 537, the plant PPC 514 sends a run command to the remaining PCSs (that are not already running in grid forming mode), and responsive to receiving the command, at 538, the remaining PCSs start up in grid forming mode. In this way, the plant PPC 514 may perform certain checks prior to instructing some or all of the PCSs to operate in grid forming mode. Responsive to the PCSs receiving the run command, the PCSs may perform: (i) its own internal checks (e.g., checking for critical errors); and/or (ii) begin controlling the one or more generation sources (e.g., control the BESS/PVs in order to begin routing power to one or more electronic devices, such as HVAC, etc.). Thus, a respective grid-forming PCS may form its own AC voltage waveform to provide power independently of the grid to power various electronic devices.

At 539, the plant PPC 514 checks the sufficiency of the PCSs that are online and available. In one or some embodiments, the plant PPC 514 checks the sufficiency by determining whether the number of PCSs that are online and available is greater than or equal to a predetermined number. Alternatively, the plant PPC 514 may determine (such as dynamically determine) the power needs for the plant to provide (e.g., the number of customer loads that need to be powered by the plant microgrid; the amount of power needed to be supplied to the grid, such as for a utility blackstart). In either instance, responsive to the plant PPC 514 determining the sufficiency of the PPCs to operate as expected, at 540, the plant PPC 514 sends a communication to the plant RTAC 512 (and in turn the plant RTAC 512 sends a communication to the utility RTAC 510) that the plant is operating and islanded, with the grid forming PCSs providing auxiliary power to plant loads.

As discussed above, another type of blackstart comprises the customer load blackstart. In particular, the plant may have a microgrid for supplying power to one or more customer loads. After performing the plant auxiliary blackstart, the microgrid customer load blackstart may be performed. In particular, the microgrid customer load blackstart may be used to start up the plant in grid-forming and energize the microgrid customer loads by forming a microgrid. This may occur post a planned or unplanned grid outage when the microgrid customer loads lose access to grid power. After a successful blackstart, power may be resumed to the microgrid customer loads. In one or some embodiments, the microgrid customer load blackstart may comprise a hard start, such as illustrated in FIGS. 6A-C, or may comprise a soft start, such as illustrated in FIGS. 7A-B.

Figure 6A:
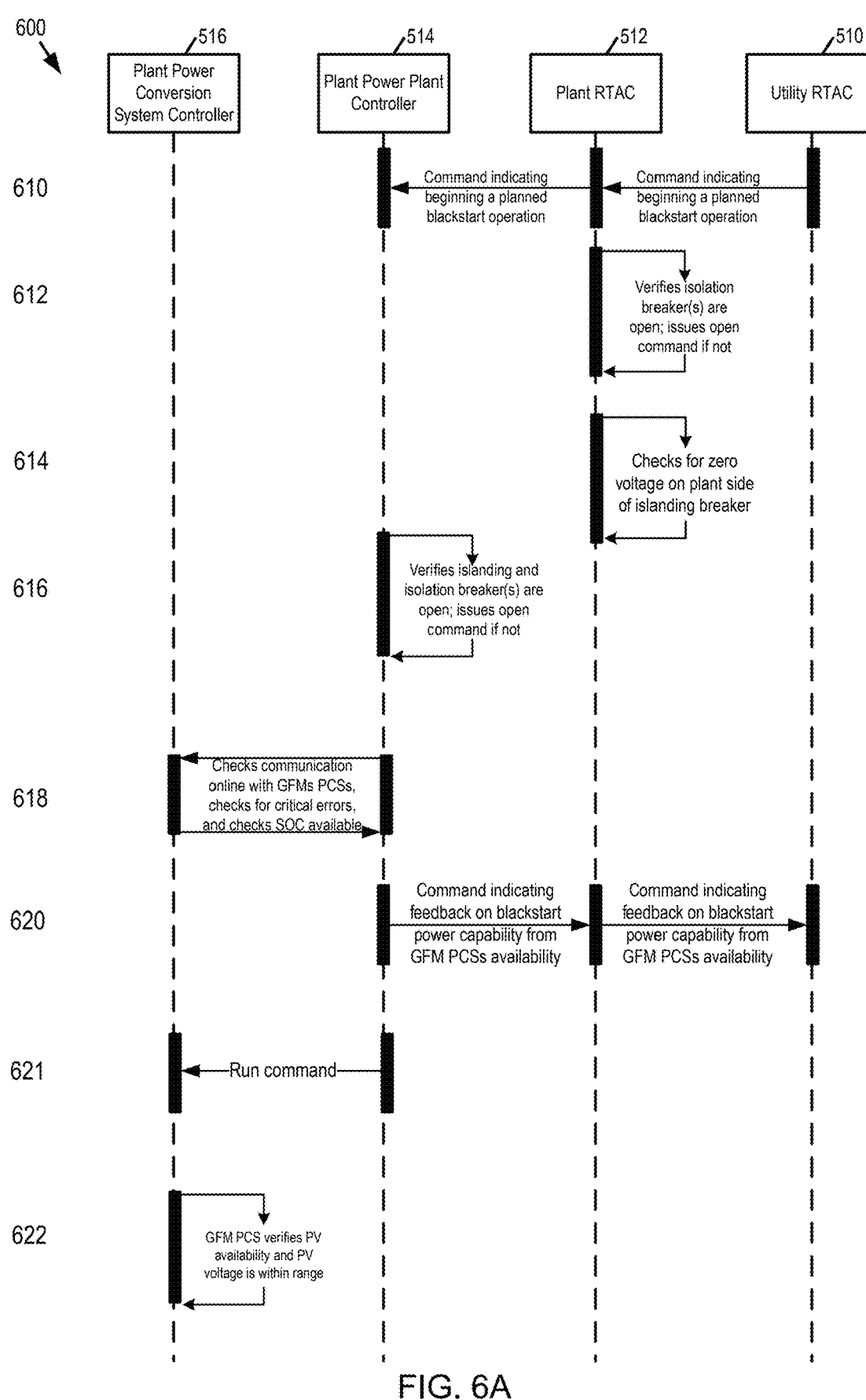
FIGS. 6A-C is a sequence diagram illustrating a microgrid customer load blackstart (hard start).
Figure 6B:
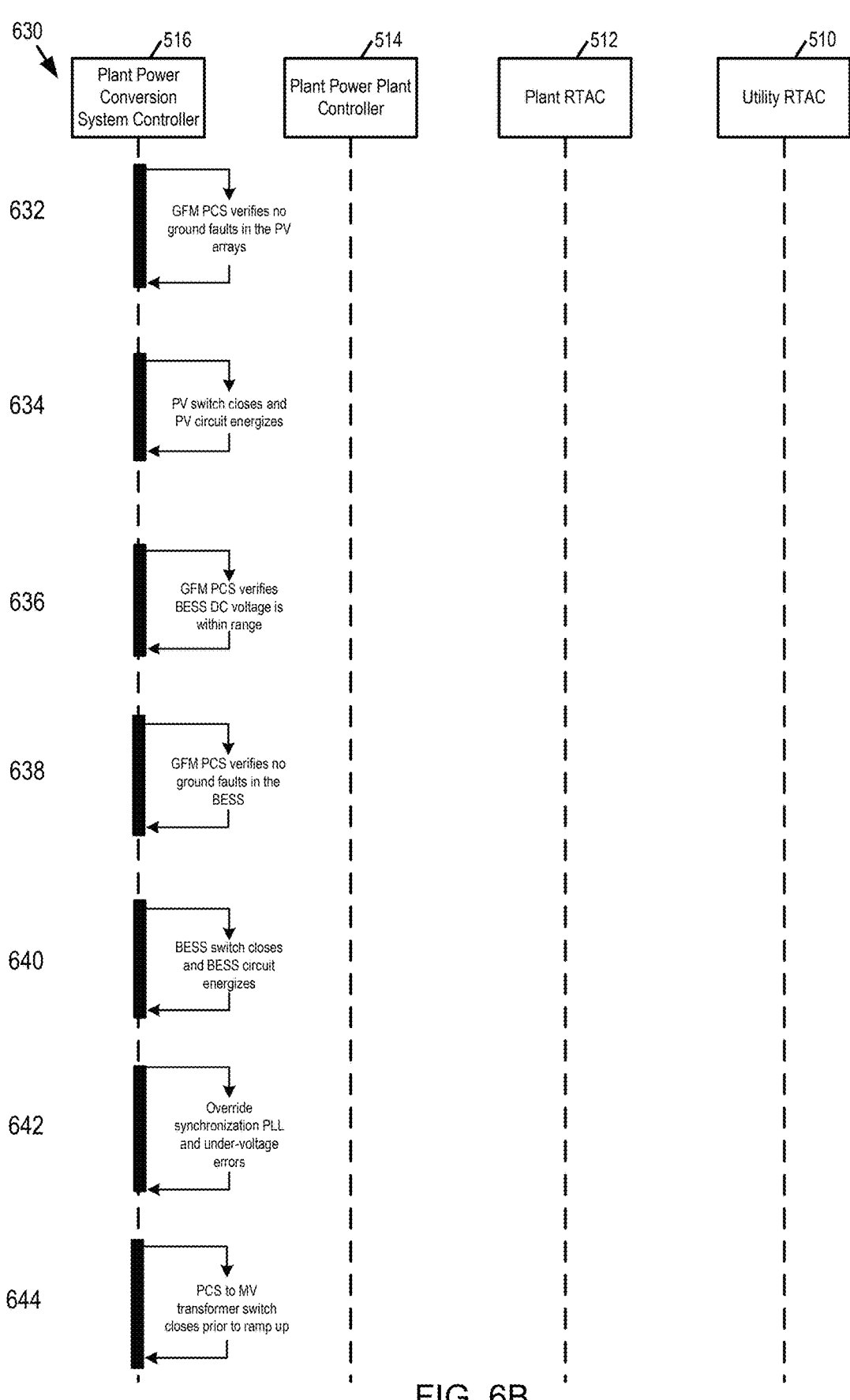
Figure 6C:
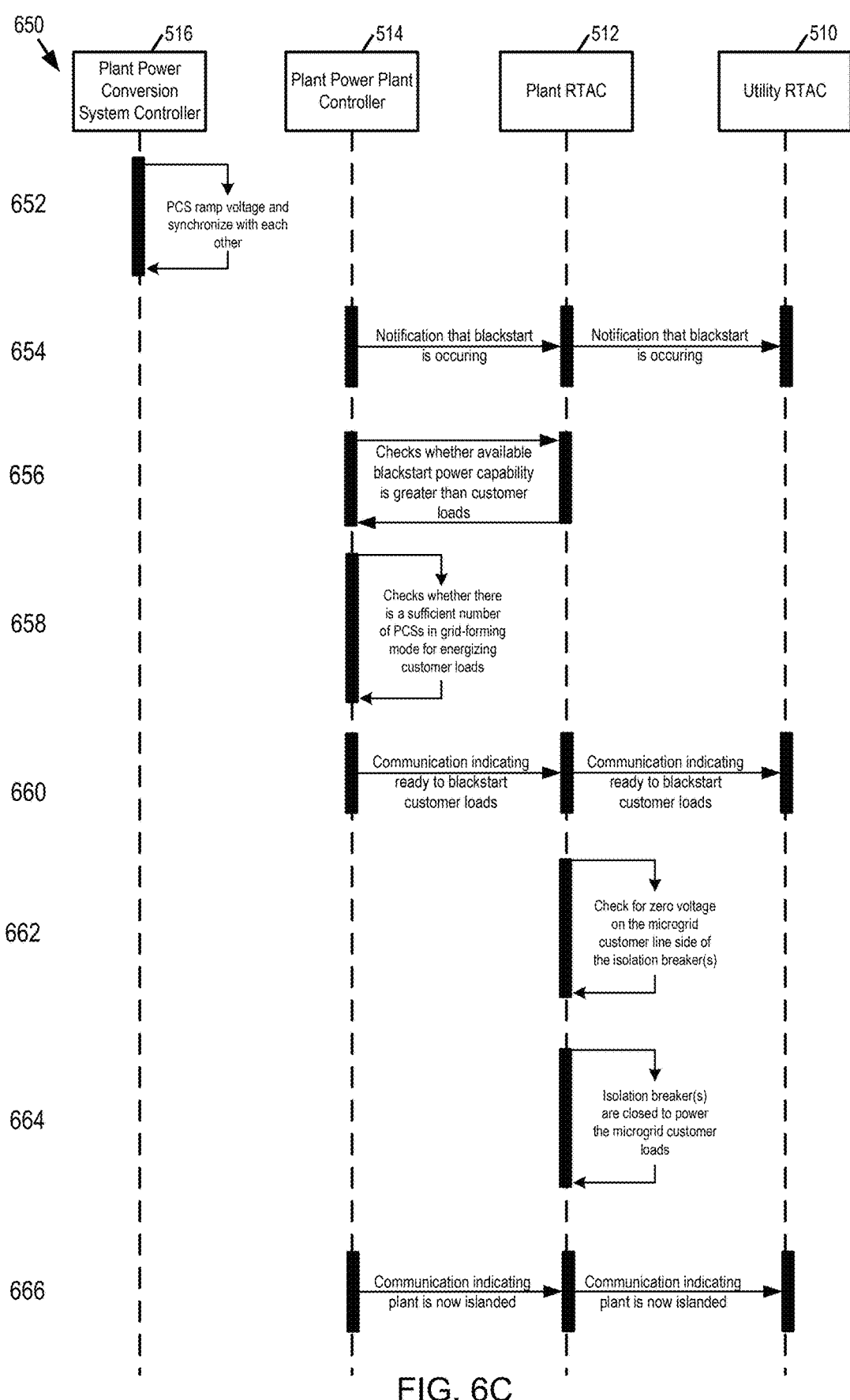
Figure 7A:
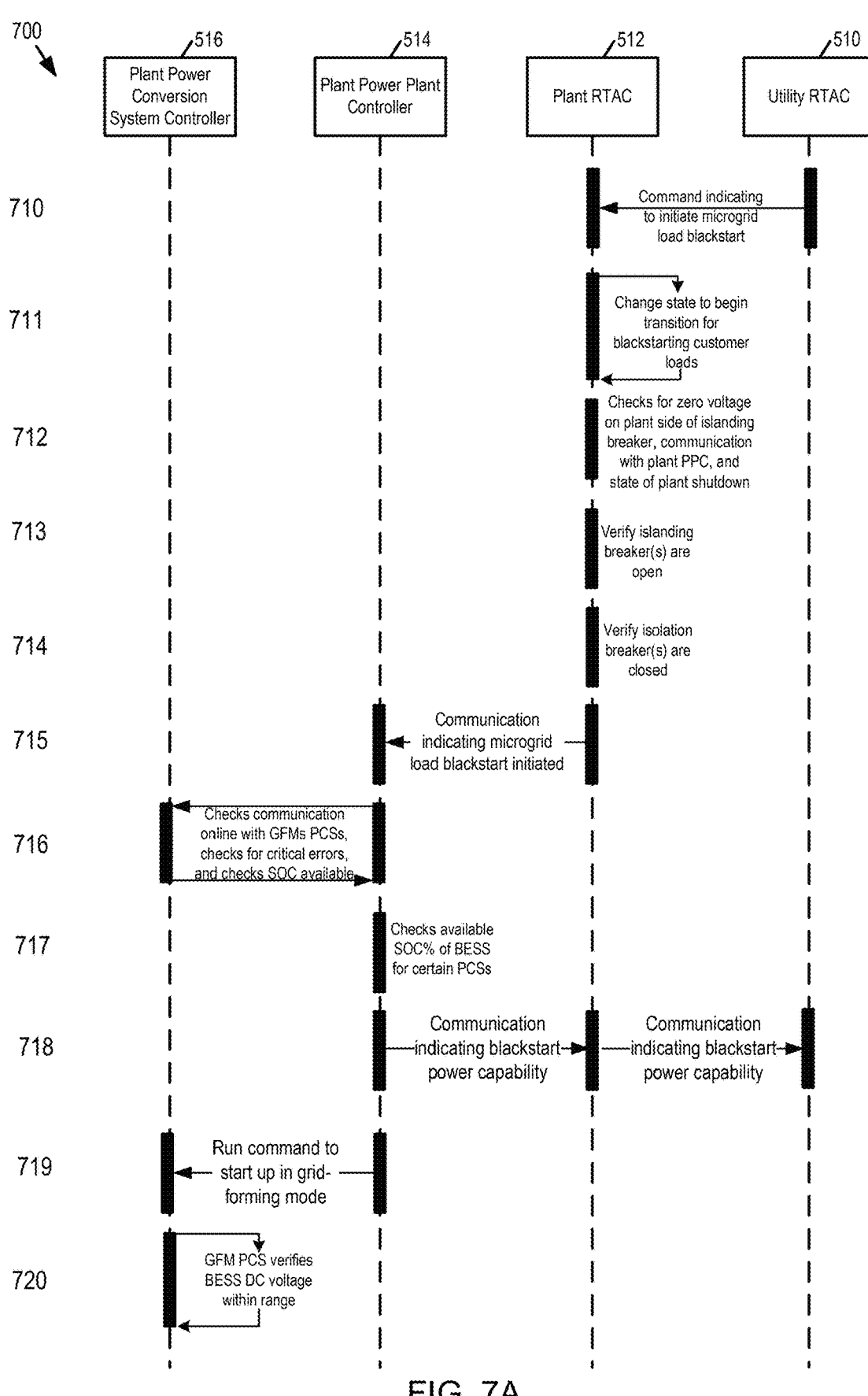
FIGS. 7A-B is a sequence diagram illustrating a microgrid customer load blackstart (soft start).
Figure 7B:
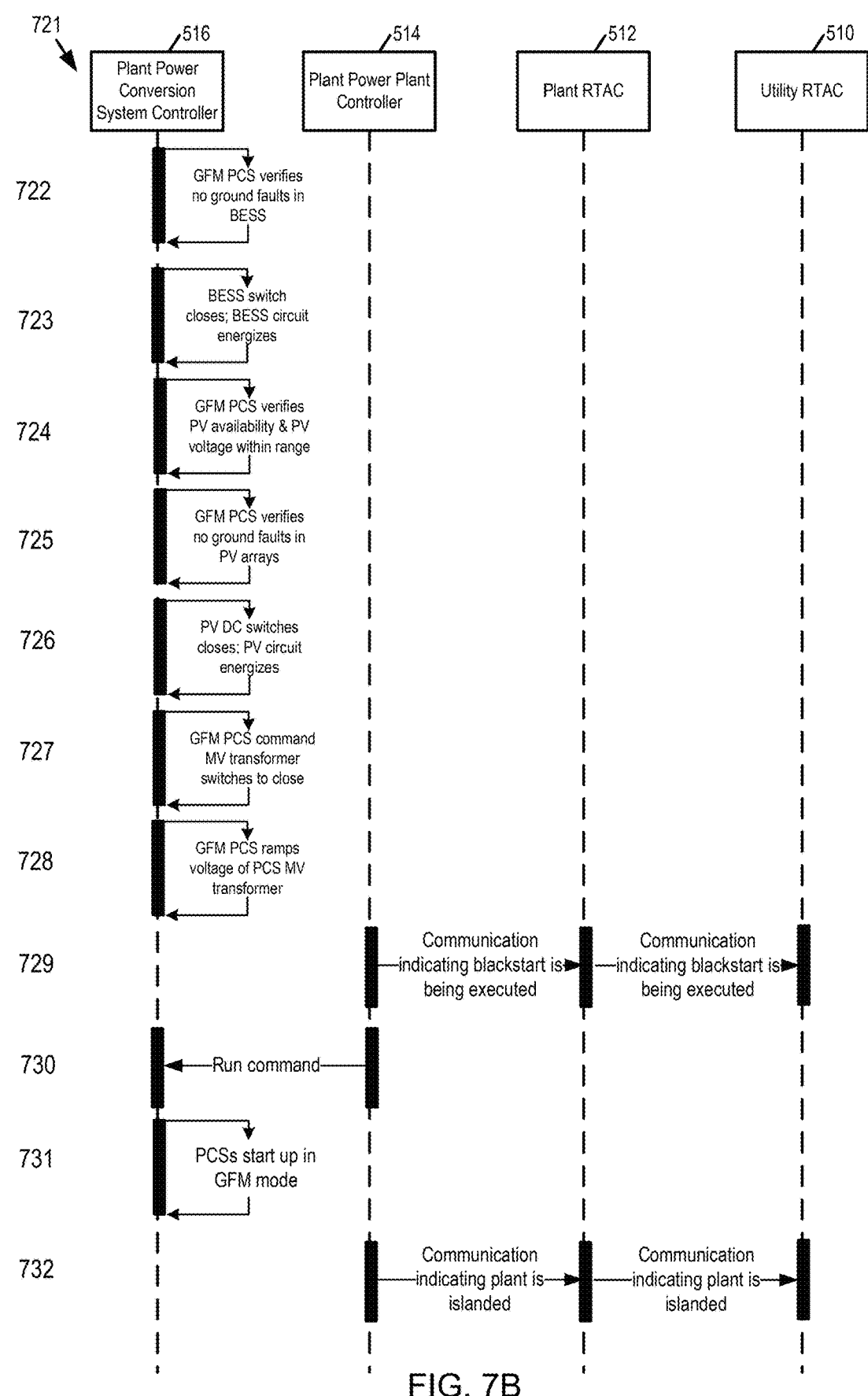

As one example, FIG. 6A-C is a sequence diagram 600, 630, 650 illustrating a hard start microgrid load blackstart. At 610, a command may be sent from the utility RTAC 510 to the plant RTAC 512 (and in turn from the plant RTAC 512 to the plant PPC 514) indicating a beginning to transition for planned blackstart event. As shown, the command may originate within the utility, such as at the utility RTAC 510. Alternatively, the command may originate within the plant, such as at the plant RTAC 512.

Responsive to the command, at 612, the plant RTAC 512 may perform one or more checks as to the current status, such as verifying whether the isolation breaker(s) are open and/or whether the islanding breaker(s) are open. If not, the plant RTAC 512 may issue a command to open the isolation breaker(s) and/or to open the islanding breaker(s). At 614, the plant RTAC 512 further checks for zero voltage on the plant side of islanding breaker.

Similarly, at 616, the plant PPC 514 checks the current status, such as verifying whether the isolation breaker(s) and/or the islanding breaker(s) are open. If not, the plant PPC 514 may issue a command to open the isolation breaker(s) and/or the islanding breaker(s). In this regard, multiple checks may be performed so that the microgrid loads are not directly energized.

After the checks of the isolation breaker(s) and/or the islanding breaker(s), one or more checks are performed in preparation for grid-forming. For example, at 618, the plant PPC may check for communication with one or more of the PCSs in the plant. In particular, one or more of the PCSs in the plant may have blackstart kits in order to be used as part of the plant auxiliary blackstart sequence, such as having an associated UPS in order to maintain communications online so that the Plant PPC 514 may communicate with a respective PCS. If a respective PCS is online (e.g., the plant PPC 514 may communicate with the respective plant PCS controller), the plant PPC may check for critical errors and/or one or more aspects of the state of charge (SOC) (e.g., the available SOC % of the BESS on the respective PCS). If communication is offline, the plant PPC 514 may indicate that the plant auxiliary blackstart sequence is not ready to be performed.

At 620, one or more communications (indicating the feedback on blackstart power capability from GFM PCSs availability) to the utility (the utility RTAC 510) and the plant (the plant RTAC 512) the total MW AC capacity of the grid-forming PCSs available for blackstart after performing necessary control checks (sec 618). At 621, a run command may be sent from the plant PPC 514 to the plant PCS 516 (e.g., the grid forming PCS(s)). After which, the grid-forming PCSs may start up and form an internal voltage. After which, one or more checks may be performed after forming the internal voltage. For example, at 622, the grid-forming PCS(s) (e.g., the plant PCS controller 516) may verify one or more aspects regarding the generation, such as PV availability and whether the PV voltage is within a predetermined range. Also, at 632, the grid-forming PCS(s) (e.g., the plant PCS controller 516) may verify that there are no ground faults in the PV arrays. If the series of checks indicate that grid-forming may proceed, the PV may begin generating power. For example, at 634, the grid-forming PCS may close the PV switch so that PV circuit energizes.

Similarly, the PCS may check the state of the batteries. For example, at 636, the grid-forming PCS may verify one or more aspects of the BESS, such as whether the BESS DC voltage is within a predetermined range. At 638, the grid-forming PCS may verify that there are no ground faults in the BESS. If not, at 640, the grid-forming PCS may close the BESS switch so that the BESS circuit energizes. At 642, the grid-forming PCSs (e.g., the plant PCS controller 516) may override synchronization PLL and under-voltage errors generated. In this regard, any one, any combination, or all of 616, 618, 620, 622, 632, 634, 636, 638, 640, 642 may be performed in order for start-up of the grid-forming PCSs.

After which, the various loops in the plant (e.g., 472, 478) may be energized. For example, at 644, the PCS to MV transformer switch may close prior to ramp up. After which, at 652, the PCS(s) may ramp the voltage and synchronize with each other. At 654, the plant PPC 514 may indicate that running blackstart is occurring, providing feedback to the utility for the operational status of the plant. In this regard, the plant PPC 514 may send the notification after at least one branch of a grid-forming PCS starts up. Some or all auxiliary loads in the plant may thus receive power. In this regard, any one, any combination, or all of 644, 652, 654 may be performed in order to energize the loops.

After which, the plant MV loop may close into the microgrid customer loads. For example, the plant PPC 514 may check the blackstart power capability, such as the total MW AC capacity of the grid-forming PCSs available for blackstart after performing the necessary control checks, as discussed above. In particular, at 656, the plant PPC 514 may check whether the available blackstart power capability is greater than or equal to one or more loads, such as the customer loads (e.g., the sum of active power load values being read from all the microgrid customer's load feeder meters and/or the sum of reactive power load values being read from all the microgrid customer's load feeder meters). Further, the plant PPC 514 may check one or more aspects regarding the PCSs regarding grid-forming capability, such as the current ability of the PCSs that are running in grid-forming mode. For example, at 658, the plant PPC 514 may check whether there are a sufficient number of PCSs online and operating in grid-forming mode (e.g., determine whether the number of PCSs online and operating in grid-forming mode is greater than the required to be online and running prior to energization of microgrid customer loads based on expected inrush). If so, at 660, communications are sent from the plant PPC 514 to the plant RTAC 512, and from the plant RTAC 512 to the utility RTAC 510 indicating readiness to blackstart the customer load(s). Responsive to which, one or more aspects of the customer load(s) are determined. For example, at 662, the plant RTAC 512 may check for zero voltage on the microgrid customer line side of the isolation breaker(s). After which, in the context of a microgrid load blackstart, at 664, the plant RTAC 512 may close the isolation breakers to energize the microgrid customer loads (with the islanding breakers remaining open). Responsive to the powering of the microgrid customer load(s), at 666, communications may be sent from the plant PPC 514 to the plant RTAC 512, and from the plant RTAC 512 to the utility RTAC 510 indicating that the plant is now islanded.

As another example, FIG. 7A-B is a sequence diagram 700, 721 illustrating a soft start microgrid load blackstart. Generally speaking, the sequence may comprise any one, any combination, or all of: initiating the microgrid load blackstart sequence; plant PCSs starting up in GFM mode; and plant powers the microgrid customer loads. The soft start microgrid load blackstart may be initiated in one of several ways, such as any one, any combination, or all of: the plant itself; the utility; or the customer (whose load is provided power by the plant microgrid. For example, at 710, the plant RTAC 512 may receive a communication from the utility RTAC 510 requesting initiating the microgrid load blackstart. At 711, the plant RTAC 512 changes the state of the plant to begin the transition for blackstarting the customer loads. After which, the plant, such as the plant RTAC 512, may perform one or more checks, such as one or both of whether the plant is islanded or whether the isolation breaker (to the plant microgrid) is open. For example, at 712, the plant RTAC 512 may check for any one, any combination, or all of: whether there is zero voltage on the plant side of the islanding breaker (e.g., the islanding breaker is open); whether there is communication with the plant PPC 514, and what the current state of the plant is (e.g., whether the plant is in a state of shutdown). At 713, the plant PPC 514 verifies that the islanding breaker is open, and at 714, the plant PPC 514 verifies that the isolation breaker is closed. After the preliminary check(s), at 715, the plant RTAC 512 may send a communication to the plant PPC 514 that microgrid load blackstart has been initiated.

Thus, after the triggering of the customer load blackstart (e.g., the microgrid customer load blackstart) and performing the initial checks (e.g., the islanding breaker is open and/or the isolation breaker is open), the plant may perform one or more actions in order to form the customer load microgrid. For example, any one, any combination, or all of 716-720 and 721-726 (which may be similar to steps in FIGS. 5A-B) may be performed in order to form the customer load microgrid. In particular, the plant PPC 514 may perform one or more checks. For example, at 716, the plant PPC 514 may perform any one, any combination, or all of: checking the ability to communicate with the grid forming PCSs (e.g., those with blackstart kits that have UPSs); checking for critical errors (e.g., that may indicate the PCSs being unable to operate during blackstart); or checking for the SOC (e.g., the amount of SOC available). At 717, the plant PPC 514 may check the available SOC % against one or more metrics (such as whether the available SOC % is greater than a predetermined percentage). In this way, the plant PPC 514 may determine whether there is sufficient power to proceed with grid forming of the customer load microgrid. Sufficiency of power may be determined in one of several ways. In one way, sufficiency may be determined based on comparing whether the available SOC % is greater than a predetermined amount. Alternatively, sufficiency may be determined by first assessing the amount of electronics that needs to be powered (e.g., the number of customer loads that will be powered by the customer load microgrid) and then assessing whether the available SOC % can meet the power needs of the assessed electronics. At 718, the plant PPC 514 may send a communication to the plant RTAC 512 (in turn communicating with the utility RTAC 510) indicating the blackstart power capability. If there is sufficient power, at 719, the plant PPC transmits a command to the grid forming PCSs to start up in grid-forming mode. After which, the grid forming PCSs (shown as plant PCS controller 516) performs one or more checks. For example, the grid forming PCSs check aspect(s) of the battery, such as at 720 verifying the BESS DC voltage is within range and/or at 722 verifying no ground faults in the BESS. If the checks are fine, at 723, the grid forming PCSs close the BESS switch so that the BESS circuit energizes (and may thereafter provide power). Alternatively, or in addition, the grid forming PCSs may check one or more aspects of the PVs, such as at 724, verifying the PVs availability and that the PV voltage is within range and/or at 725 verifying no ground faults in the PVs. If the checks are fine, at 726, the grid forming PCSs close the DC switches so that the PV circuit energizes (and may thereafter provide power).

Thereafter, starting up in grid forming mode, the plant may energize the auxiliary loads (e.g., the HVAC, etc.). In particular, at 727, grid forming PCSs may command the medium voltage transformer switches to close and at 728 to ramp PCS MV transformers. Further, because of these actions, the customer load microgrid receives auxiliary power from GFM PCSs that are energized. After which, at 729, the plant PPC 514 may send a communication to the plant RTAC 512 indicating that blackstart is being executed, with the plant RTAC 512 in turn indicating to the utility RTAC 510 that blackstart is being executed. At 730, the plant PPC 514 sends a run command to the remaining PCSs (that are not already running in grid forming mode), and responsive to receiving the command, at 731, the remaining PCSs start up in grid forming mode. In this way, the plant PPC 514 may perform certain checks prior to instructing some or all of the PCSs to operate in grid forming mode. Responsive to the PCSs receiving the run command, the PCSs may perform: (i) its own internal checks (e.g., checking for critical errors); and/or (ii) begin controlling the one or more generation sources (e.g., control the BESS/PVs in order to begin routing power to one or more electronic devices). Thus, a respective grid-forming PCS may form its own AC voltage waveform to provide power independently of the grid to power various electronic devices.

At 732, the plant PPC 514 may send a communication to the plant RTAC 512 (which in turn sends the communication to the utility RTAC 510) indicating that the plant is islanded.

From shutdown, one or more other transitions may occur, such as one or both of a microgrid load blackstart or a utility blackstart. In one or some embodiments, the microgrid load blackstart occurs after the feeder auxiliary blackstart, after which the utility blackstart may occur. Alternatively, the utility blackstart occurs after the feeder auxiliary blackstart, after which the microgrid load blackstart may occur.

As discussed above, various types of blackstart are contemplated, such as a utility blackstart. For example, the transition from shutdown to islanded mode may be used to start up the plant when the utility network is offline, and the plant may be in a temporary shutdown mode (plant controls and communications being powered by UPSs), as discussed above. This may be a planned event. This transition may also be referred to as a utility blackstart. The plant may be configured to perform the utility blackstart after a planned grid outage or an unplanned grid outage. After a successful blackstart of the plant (in the event that the plant has shutdown), auxiliary power may be resumed to the plant and power may be dispatched to the utility loads for the utility blackstart. Generally speaking, the utility blackstart may comprise any one, any combination, or all of the following steps: (1) initiation of the utility blackstart sequence; (2) plant starts up in grid forming mode; and (3) the plant microgrid energizes at least a part of the utility (e.g., the utility transmission line).

Figure 8A:
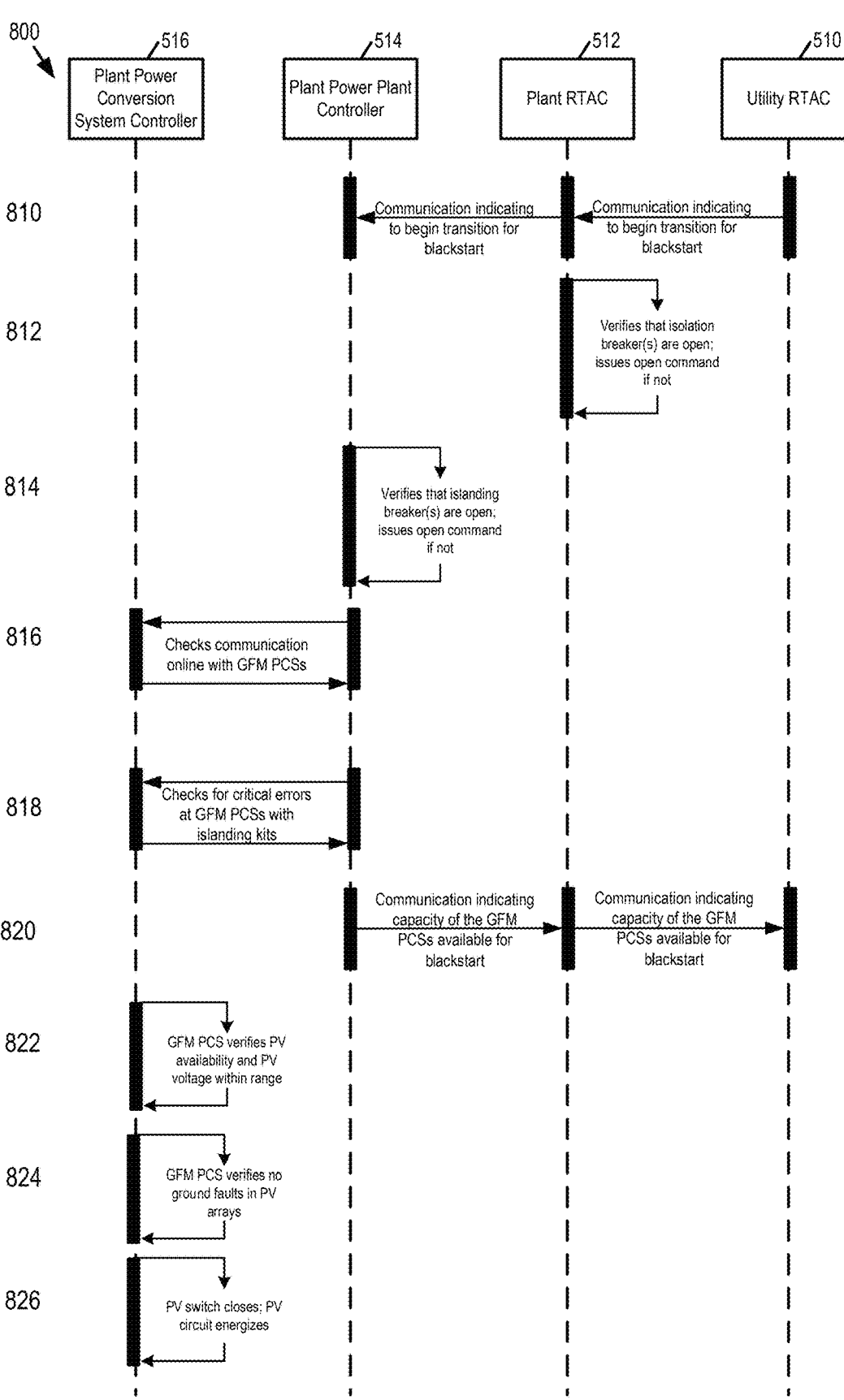
Figure 9A:
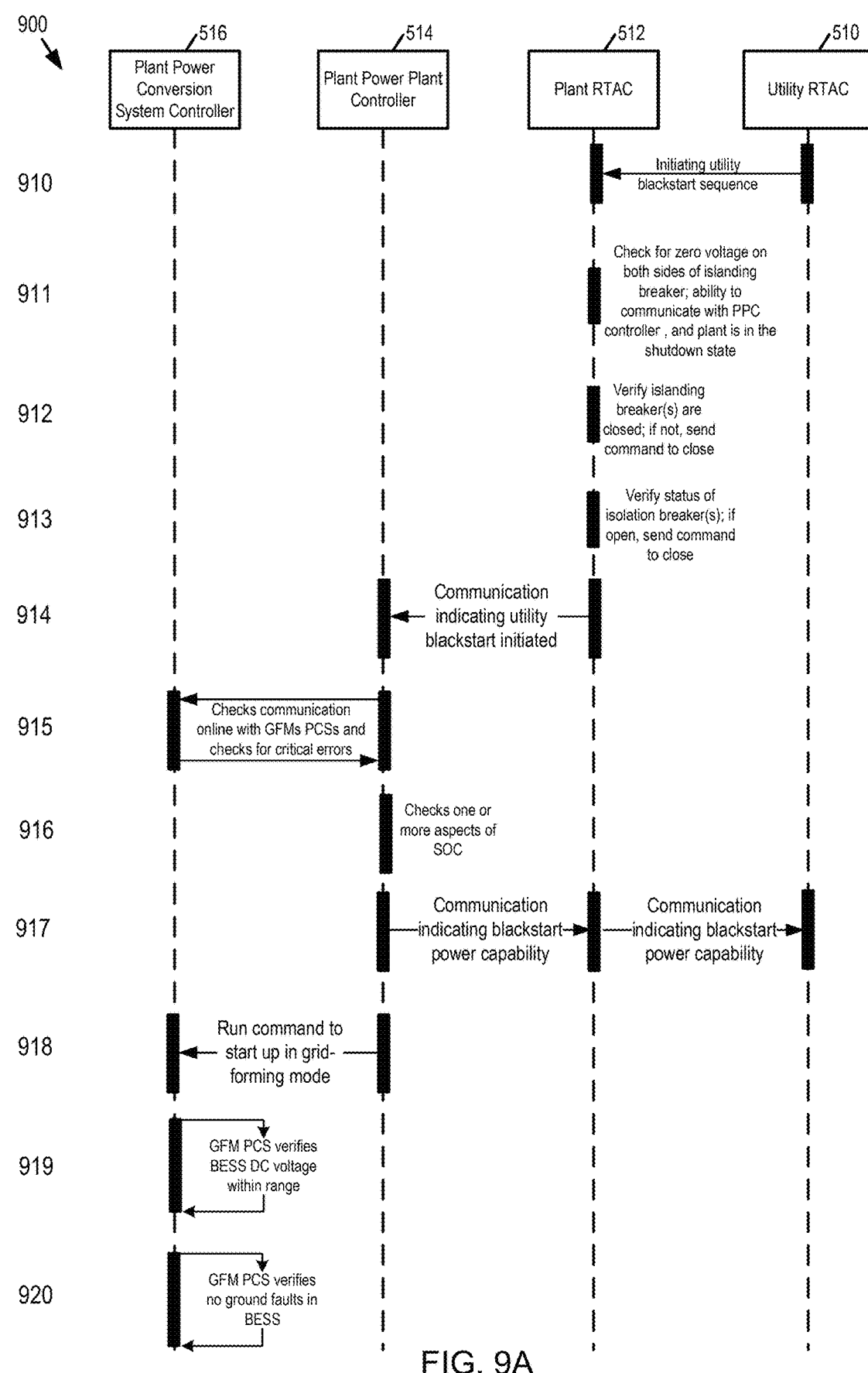
FIGS. 9A-C is a sequence diagram illustrating a utility blackstart (soft start).
Figure 9B:
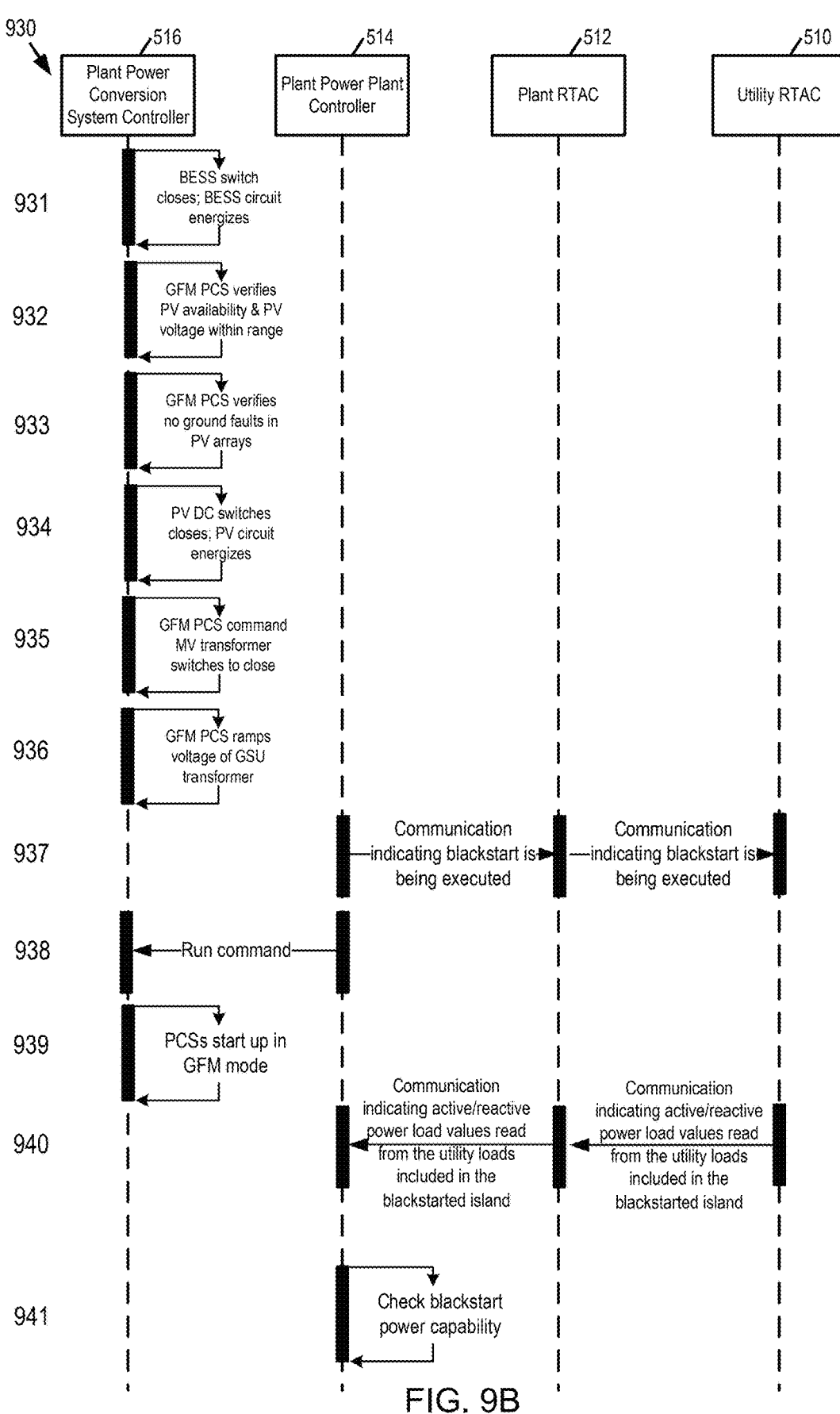
Figure 9C:
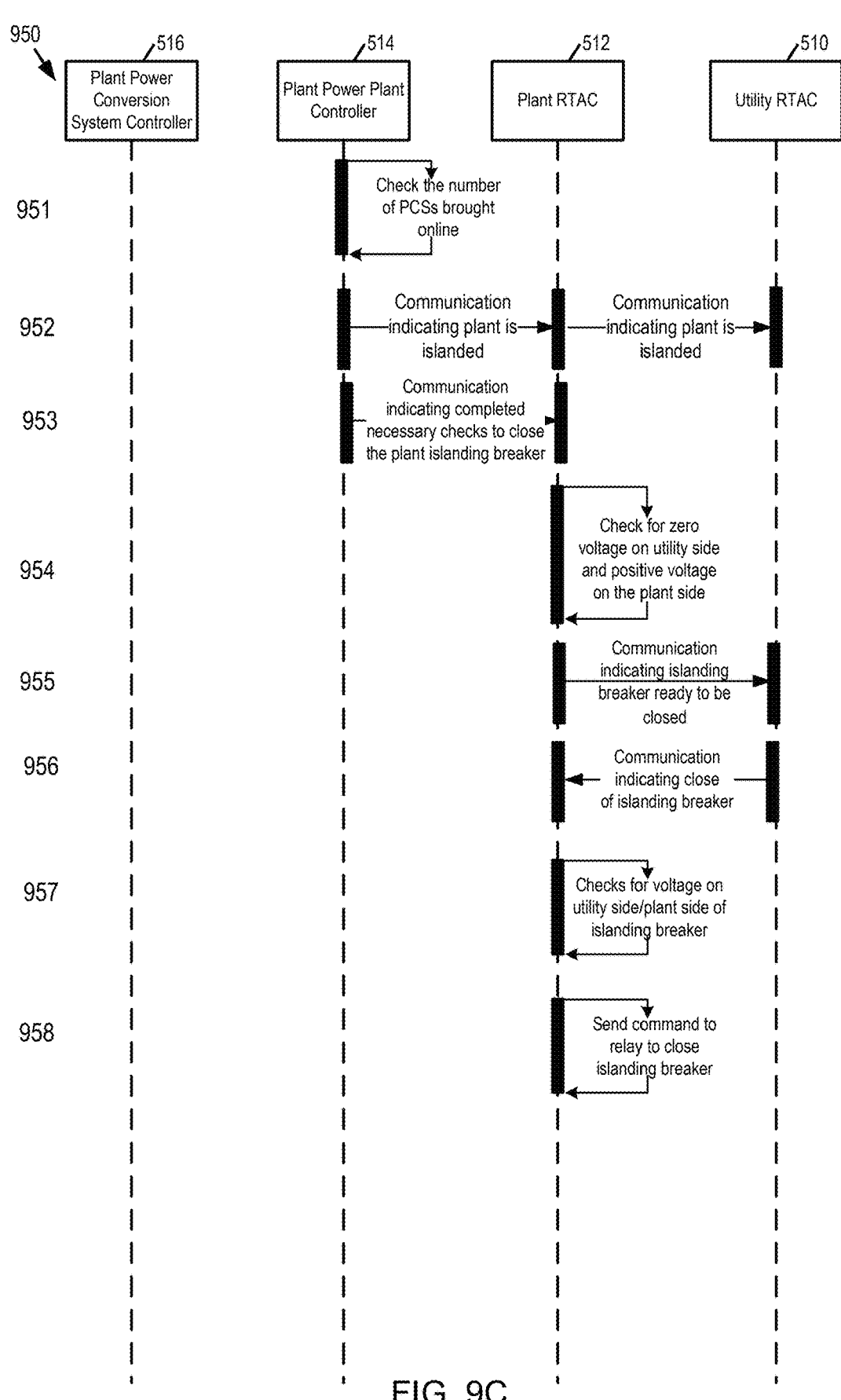

Moreover, various types of utility blackstart are contemplated, including hard start utility blackstart (see FIGS. 8A-C) and soft start utility blackstart (see FIGS. 9A-C). FIGS. 8A-C illustrate a sequence diagram 800, 830, 850 illustrating an example of a utility blackstart (e.g., a hard blackstart). In preparation, at 810, communications may be sent from the utility RTAC 510 to the plant RTAC 512, and from the plant RTAC 512 to the plant PPC 514 indicating what the utility seeks to blackstart.

At 812, the plant RTAC 512 may verify that the isolation breaker(s) are open and/or the islanding breaker(s) are open. If not, the plant RTAC 512 may issue a command to open the isolation breaker(s) and/or the islanding breaker(s). At 814, the plant PPC 514 may verify that the islanding breaker(s) are open. If not, the plant PPC 514 may issue a command to open the isolation breaker(s) and/or to open the islanding breaker(s). At 816, the plant PPC 514 may communicate with the plant PCS controller 516 to check communication online with the GFM PCSs. Thereafter, at 818, the plant PPC 514 may check the status of the GFM PCSs, such as whether there are any critical errors with the islanding kits.

Barring no critical errors, at 820, communications from the plant PPC 514 and from the plant RTAC 512 indicate one or more blackstart capabilities, such as the capacity of the GFM PCSs available for blackstart. In turn, the plant PCS controller 516 may verify one or more aspects of the generation sources, such as the PVs. For example, at 822, the plant PCS controller 516 verifies the generation capacity, such as verifying PV availability and whether the PV voltage is within range. At 824, the plant PCS controller 516 may further verify whether there are any ground faults in the PV arrays. If not, at 826, the plant PCS controller 516 closes the PV switch so that the PV circuit energizes and begins producing power.

Similarly, the plant PCS controller 516 may verify one or more aspects of the storage sources, such as the batteries. For example, at 832, the plant PCS controller 516 verifies whether the BESS DC voltage is within range, and at 834, whether there are no ground faults. If not, at 836, the plant PCS controller 516 closes the BESS switch so that the BESS circuit energizes and begins providing power.

At 838, the grid-forming PCSs (e.g., the plant PCS controller 516) may override synchronization PLL and any under-voltage errors generated. In this regard, the PCS may override any under-voltage errors during this sequence. At 840, the grid-forming PCS may control the medium voltage (MV) transformer switch to close prior to ramp up. After which, auxiliary power in the feeder may be resumed after at least one branch of a grid-forming PCS starts up in the feeder. Specifically, at 842, the GFM PCSs may ramp (such as ramp up) the voltage and synchronize with each other. After which, at 844, the plant PPC 514 and the plant RTAC 512 may send communications indicating that the operational status of the system is executing blackstart.

After which, the power needs that will be served by the blackstart may be communicated. For example, at 846, the utility RTAC 510 and the plant RTAC 512 may send communications indicating utility load active and reactive consumption that the plant will help energize. In particular, the communication may indicate: the sum of active auxiliary power to the generation assets that the plant will help energize in the blackstart (e.g., transmit a variable based on utility load active power consumption serviced by plant, such as the auxiliary power consumption of utility generation assets); or the sum of reactive power that the plant will help energize in the blackstart (e.g., transmit a variable based on utility load reactive power consumption services by the blackstart).

At 848, the plant RTAC 512 and the plant PPC 514 may communicate regarding the needs (e.g., the utility load active and reactive consumption) for the blackstart and the capabilities for the blackstart. For example, the total capacity (e.g., power capacity) that the blackstart can generate is checked against the power needs (e.g., the active auxiliary power or the utility load reactive power). In particular, the power capacity of the grid-forming PCSs (e.g., capacity of the GFM PCSs available for blackstart after performing necessary control checks) may be compared to the sum of active auxiliary power to the generation assets or to the sum of the reactive power that the plant will help energize.

In one or some embodiments, additional checks may be performed prior to initiating blackstart. For example, At 852, the plant PPC 514 may check whether the number of grid-forming PCSs online and running is greater than or equal to the number of grid-forming PCSs needed to perform the blackstart. After which, one or more communication may be sent in order to indicate that the plant is ready to blackstart. For example, at 854, communications from the plant PPC 514 and from the plant RTAC 512 may be sent indicating that the plant is ready to perform the blackstart.

One or more checks may then be performed prior to islanding. For example, at 856, the plant RTAC 512 may check for zero voltage on the microgrid customer line side of the isolation breaker(s). Further, at 858, the isolation breaker(s) are closed in order to power microgrid customer loads. After which, one or more communication may be sent in order to indicate the updated status of islanding. For example, at 860, communications from the plant PPC 514 and from the plant RTAC 512 may be sent indicating that the plant is islanded.

In turn, additional checks may be performed prior to closing the islanding breaker(s) on the grid side. For example, at 862, the plant RTAC 512 may check for zero voltage on the utility line side of the islanding breaker(s). If the check is satisfactory, a communication may be sent to the utility in order for the islanding breaker(s) to close (e.g., see at 864, the plant RTAC 512 communication to the utility RTAC 510 indicating to close the islanding breaker(s). In this way, the plant may cause the closing of the islanding breaker (either directly, but controlling the islanding breaker, or by sending a communication, thereby causing the closing of the islanding breaker). Responsive to receiving the communication, at 866, the utility RTAC 510 closes the islanding breaker(s) (see utility grid controlling SCADA to close the islanding breaker(s) in order to energize the GSU transformer).

FIGS. 9A-C is a sequence diagram 900, 930, 950 illustrating a utility blackstart (soft start). As discussed above, the various blackstart sequences may be triggered in various ways. As one example, the utility blackstart may be triggered by the utility, such as at 910, by the utility RTAC 510 sending a communication to the plant RTAC 512 initiating the utility blackstart sequence. After which, the plant may perform one or more checks. As one example, at 911, the plant may check for any one, any combination, or all of: zero voltage on plant side of islanding breaker, communication with plant PPC 514 is available, and the state of the plant is shutdown. As another example, at 912, the plant RTAC 512 may verify that the islanding breaker is closed (and if not closed, the plant RTAC 512 may close the islanding breaker). In the event that islanding breaker is not closed, the plant RTAC 512 may thus close the islanding breaker. As yet another example, at 913, the plant RTAC 512 may verify the status of the isolation breaker (and if open, the plant RTAC 512 may close the isolation breaker). At 914, the plant RTAC 512 may send a communication to the plant PPC 514 indicating that the utility blackstart has been initiated.

Thus, in the next stage of the utility blackstart, the PCSs start up in grid-forming mode. Specifically, responsive to the communication, the plant PPC 514 may perform one or more checks, such as at 915, one or both of checking communication with the grid forming PCSs and checking for critical errors. As another example, at 916, the plant PPC 514 may check one or more aspects of the SOC, with the SOC checked against one or more metrics for sufficiency. As one example, the SOC % of the BESS at the grid forming PCSs may be compared against a predetermined percentage; if greater than the predetermined percentage, the SOC % is deemed sufficient; if not, the SOC % is deemed insufficient and the utility blackstart does not proceed. As another example, the amount of power needed for the utility blackstart may be determined and then compared with the available SOC % of the BESS to determine whether the available SOC % is sufficient.

Responsive to passing the various checks, at 917, the plant PPC 514 sends a communication to the plant RTAC 512 (which in turns sends a communication to the utility RTAC 510) indicating the blackstart power capability. At 918, the plant PPC transmits a command to the grid forming PCSs to start up in grid-forming mode. After which, the grid forming PCSs (shown as plant PCS controller 516) performs one or more checks. For example, the grid forming PCSs check aspect(s) of the battery, such as at 919 verifying the BESS DC voltage is within range and/or at 920 verifying no ground faults in the BESS. If the checks are fine, at 931, the grid forming PCSs close the BESS switch so that the BESS circuit energizes (and may thereafter provide power). Alternatively, or in addition, the grid forming PCSs may check one or more aspects of the PVs, such as at 932, verifying the PVs availability and that the PV voltage is within range and/or at 933 verifying no ground faults in the PVs. If the checks are fine, at 934, the grid forming PCSs close the DC switches so that the PV circuit energizes (and may thereafter provide power).

Thereafter, starting up in grid forming mode, the plant may energize the plant MV loop and generation step up (GSU) transformer. In particular, at 935, grid forming PCSs may command the medium voltage transformer switches to close and at 936 to ramp the voltage to the generation step up (GSU) transformers. Further, because of these actions, the plant receives auxiliary power from GFM PCSs that are energized. After which, at 937, the plant PPC 514 may send a communication to the plant RTAC 512 indicating that blackstart is being executed, with the plant RTAC 512 in turn indicating to the utility RTAC 510 that blackstart is being executed. At 938, the plant PPC 514 sends a run command to the remaining PCSs (that are not already running in grid forming mode), and responsive to receiving the command, at 939, the remaining PCSs start up in grid forming mode. In this way, the plant PPC 514 may perform certain checks prior to instructing some or all of the PCSs to operate in grid forming mode. Responsive to the PCSs receiving the run command, the PCSs may perform: (i) its own internal checks (e.g., checking for critical errors); and/or (ii) begin controlling the one or more generation sources (e.g., control the BESS/PVs in order to begin routing power to one or more electronic devices, such as HVAC, etc.). Thus, a respective grid-forming PCS may form its own AC voltage waveform to provide power independently of the grid to power various electronic devices, with the GSU is now being energized post GFM PCSs ramp.

After which, the plant may energize one or more parts of the utility grid (e.g., the plant microgrid energizing the utility transmission line(s)). Further, a determination may be made regarding whether the plant has sufficient power to perform the utility blackstart. In one or some embodiments, the determination may comprise comparing the utility load needs in the blackstart versus the power capability of the plant in performing the blackstart. In particular, at 940, the utility (such as the utility RTAC 510) sends a communication to the plant (such as the plant RTAC 512, which forwards it to the plant PPC 514) indicating the utility power load values (such as active and/or reactive power load values). In turn, at 941, the plant (such as the plant PPC 514) may determine whether the plant blackstart power capability meets or exceeds the utility power load values. If the plant blackstart power capability meets or exceeds the utility power load values, the utility blackstart may proceed. If not, the utility blackstart ends. Alternatively, the plant PPC 514 may analyze the sufficiency of power for the plant to perform the utility blackstart based on comparing the amount of power the plant can generate with a predetermined number (such as a predetermined amount of power and/or a predetermined percentage of the plant capacity (e.g., the plant is operating at greater than 95% indicates a sufficiency to perform the utility blackstart).

After which, the plant PPC 514 may perform one or more checks, such as at 951, checking whether the number of grid forming PCSs online is greater than or equal to a predetermined number. If so, the utility blackstart may proceed. In addition, at 952, the plant PPC 514 may send a communication to the plant RTAC 512 (which in turn sends to the utility RTAC 510) indicating that the plant is islanded. Alternatively, or in addition, at 953, the plant PPC 514 may send a communication to the plant RTAC 512 indicating completion of the necessary checks to close the plant islanding breaker. In preparation for closing the islanding breaker, at 954, the plant RTAC 512 may check for zero voltage on the utility side and positive voltage on the plant side of the islanding breaker. If these checks pass, at 955, the plant RTAC 512 sends a communication to the utility RTAC 510 that the islanding breaker is ready for closing. Responsive to the communication, the plant waits for the utility to confirm the closing of the islanding breaker (see 956). Responsive to the communication, at 957, the plant RTAC 512 checks for zero voltage on the utility line side and positive voltage on the plant side of the islanding breaker. Responsive to the check at 957 indicating the zero voltage on the utility line side and the positive voltage on the plant side of the islanding breaker, at 958, the plant RTAC 512 sends a command to a relay to close the islanding breaker. Responsive to the command, the relay closes the islanding breaker, so that the plant energizes at least a part of the utility grid (e.g., utility transmission circuit(s)). The plant PPC may further maintain the status of the plant as being islanded. In this regard, the plant may now be in an islanded mode of operation with GSU energized. The plant may operate in Voltage-frequency/isochronous control mode, with the plant microgrid power being provided to part of the utility, such as T&D switching sequences.

In this regard, the plant may provide power to one or both of microgrid customer loads or a section of the utility grid, and may completely energize the generation step-up transformer(s). The sequences in FIGS. 5A-B, 6A-C, 7A-B, 8A-C, and 9A-C are for illustration purposes. Other sequences may provide auxiliary power to microgrid loads or utility generation assets (e.g., protection equipment closing sequences).

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as, for example, in block diagrams in FIGS. 1, 2 and 4A-E, in flow diagrams in FIGS. 3A-D, and in sequence diagrams in FIGS. 5A-B, 6A-C, 7A-B, 8A-C, and 9A-C. In this regard, any one, any combination, or all of the steps depicted in the block diagrams in FIGS. 1, 2 and 4A-E, in flow diagrams in FIGS. 3A-D, and in sequence diagrams in FIGS. 5A-B, 6A-C, 7A-B, 8A-C, and 9A-C may be performed automatically. As one example, all steps may be automatically performed. As another example, all of the steps, except for the initiation of the blackstart procedure, may be automatically performed. Further, computing functionality may be manifested in any one, any combination, or all of: controls 218; controls 240; control electronics 228, 234, 238, 242, 246; 252 utility RTAC 510; plant RTAC 512; plant PPC 514; or plant power conversion system controller 516. As such, computing functionality may be resident within any of the electronic devices discussed herein.

Figure 10:
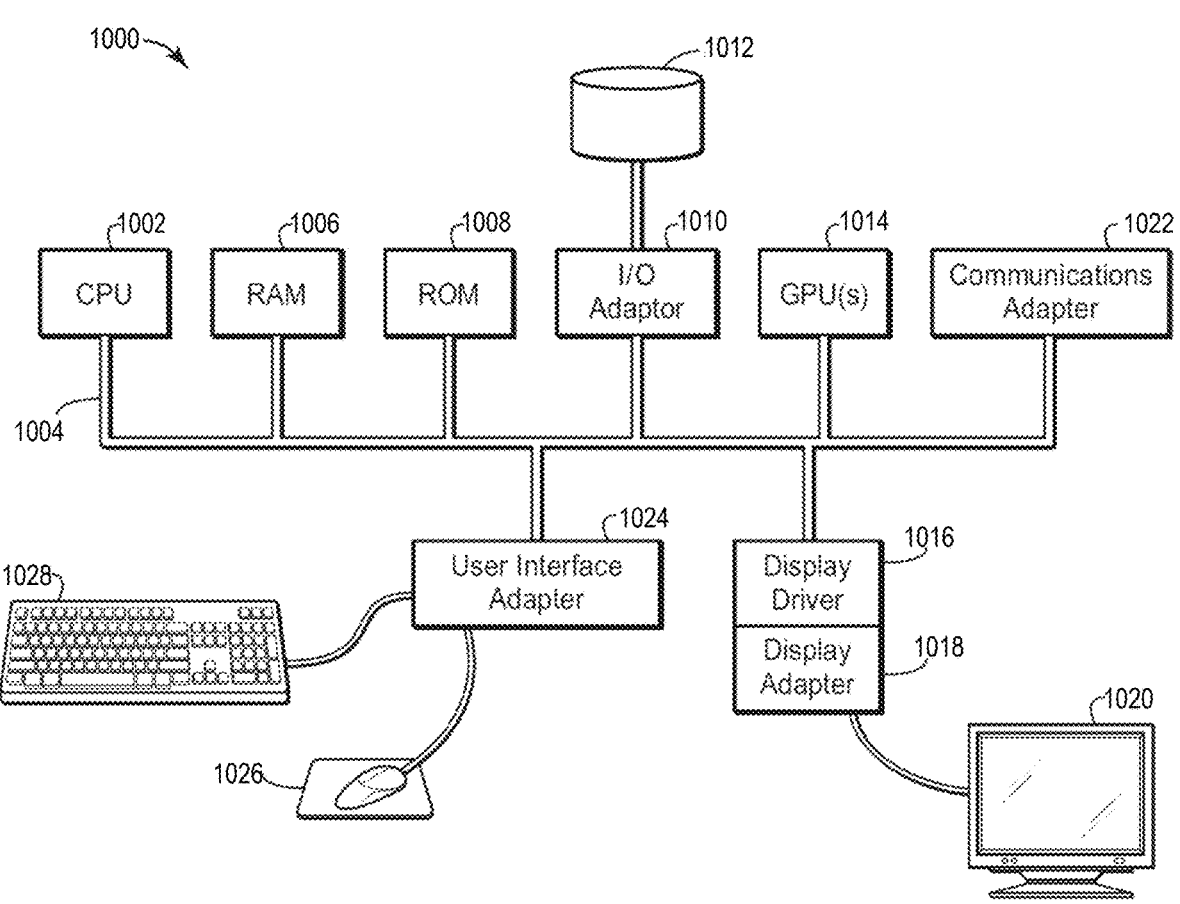
FIG. 10 is a diagram of an exemplary computer system that may be utilized to implement the methods described herein.

FIG. 10 is a diagram of an exemplary computer system 1000 that may be utilized to implement methods, including the flow diagrams, described herein. A central processing unit (CPU) 1002 is coupled to system bus 1004. The CPU 1002 may be any general-purpose CPU, although other types of architectures of CPU 1002 (or other components of exemplary computer system 1000) may be used as long as CPU 1002 (and other components of computer system 1000) supports the operations as described herein. Those of ordinary skill in the art will appreciate that, while only a single CPU 1002 is shown in FIG. 10, additional CPUs may be present. Moreover, the computer system 1000 may comprise a networked, multi-processor computer system that may include a hybrid parallel CPU/GPU system. The CPU 1002 may execute the various logical instructions according to various teachings disclosed herein. For example, the CPU 1002 may execute machine-level instructions for performing processing according to the operational flow described herein.

The computer system 1000 may also include computer components such as non-transitory, computer-readable media. Examples of computer-readable media include computer-readable non-transitory storage media, such as a random-access memory (RAM) 1006, which may be SRAM, DRAM, SDRAM, or the like. The computer system 1000 may also include additional non-transitory, computer-readable storage media such as a read-only memory (ROM) 1008, which may be PROM, EPROM, EEPROM, or the like. RAM 1006 and ROM 1008 hold user and system data and programs, as is known in the art. In this regard, computer-readable media may comprise executable instructions to perform any one, any combination, or all of the blocks in the flow charts in FIG. 3A-B and in the sequence diagrams in FIGS. 5A-B, 6A-C, 7A-C, and 8A-C. The computer system 1000 may also include an input/output (I/O) adapter 1010, a graphics processing unit (GPU) 1014, a communications adapter 1022 (e.g., a communication interface), a user interface adapter 1024, a display driver 1016, and a display adapter 1018.

The I/O adapter 1010 may connect additional non-transitory, computer-readable media such as storage device(s) 1012, including, for example, a hard drive, a compact disc (CD) drive, a floppy disk drive, a tape drive, and the like to computer system 1000. The storage device(s) may be used when RAM 1006 is insufficient for the memory requirements associated with storing data for operations of the present techniques. The data storage of the computer system 1000 may be used for storing information and/or other data used or generated as disclosed herein. For example, storage device(s) 1012 may be used to store configuration information or additional plug-ins in accordance with the present techniques. Further, user interface adapter 1024 couples user input devices, such as a keyboard 1028, a pointing device 1026 and/or output devices to the computer system 1000. The display adapter 1018 is driven by the CPU 1002 to control the display on a display device 1020 to, for example, present information to the user such as images generated according to methods described herein.

The architecture of computer system 1000 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1000 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

The following example embodiments of the invention are also disclosed:

Embodiment 1

A method for performing blackstart of a plant from a shutdown mode, wherein the plant includes at least one microgrid for powering one or more customer loads or wherein the plant, when grid-tied, provides power to or receives the power from at least part of a grid that is operated by a utility, wherein the plant when islanded is disconnected from providing or receiving power to the at least part of the grid, the method comprising:

responsive to receiving an indication to perform the blackstart:

checking status of one or both of at least one islanding breaker that islands the plant from the grid or at least one isolation breaker that isolates the plant from the one or more customer loads;

checking capacity to at least meet load that is energized in performing the blackstart;

preparing one or more devices within the plant for grid-forming in preparation for the blackstart; and performing the blackstart of at least one of the at least one microgrid or the at least part of the grid.

Embodiment 2

The method of embodiment 1:

wherein performing the blackstart comprises:

performing a plant auxiliary blackstart in order to blackstart at least one or more feeders within the plant, thereby grid-forming an auxiliary feeder within the plant; and after performing the plant auxiliary blackstart, performing one or both of: a customer load blackstart in order to blackstart the at least one microgrid for powering the one or more customer loads, thereby grid-forming the at least one microgrid; or a utility blackstart in order to blackstart the at least part of the grid, thereby grid-forming the at least part of the grid.

Embodiment 3

The method of embodiments 1 or 2:

wherein prior to performing the plant auxiliary blackstart, analyzing power conversion systems (PCSs) available to determine whether there is capacity to perform the grid-forming of the auxiliary feeder within the plant;

wherein prior to performing the customer load blackstart, analyzing the PCSs available to determine whether there is capacity to perform the grid-forming of the at least one microgrid to power the one or more customer loads; and wherein prior to performing the utility blackstart, analyzing the PCSs available to determine whether there is capacity to perform the grid-forming of the at least part of the grid.

Embodiment 4

The method of any of embodiments 1-3:

wherein checking the status of one or both of at least one islanding breaker that islands the plant from the grid or at least one isolation breaker that isolates the plant from the one or more customer loads comprises:

in preparation for performing the plant auxiliary blackstart:

responsive to the status of the at least one islanding breaker being closed, causing the at least one islanding breaker to open so that the plant is islanded from the grid; and responsive to the status of the at least one isolation breaker being closed, causing the at least one isolation breaker to open so that the plant is disconnected from the at least one microgrid; and after performing the plant auxiliary blackstart and in preparation for performing the customer load blackstart or the utility blackstart:

causing one or both of the at least one islanding breaker to close so that the plant is grid-tied to the at least part of the grid or the at least one isolation breaker to close so that the plant is connected to the at least one microgrid.

Embodiment 5

The method of any of embodiments 1-4:

wherein after performing the plant auxiliary blackstart and in preparation for performing the customer load blackstart, causing the at least one isolation breaker to close so that the plant is connected to the at least one microgrid; and after performing the customer load blackstart and in preparation for performing the utility blackstart, causing the at least one islanding breaker to close so that the plant is grid-tied to the at least part of the grid.

Embodiment 6

The method of any of embodiments 1-5:

wherein, prior to performing the plant auxiliary blackstart, determining whether power from the plant meets or exceeds the grid-forming of the auxiliary feeder within the plant;

wherein, prior to performing the plant auxiliary blackstart, determining whether the power from the plant meets or exceeds the grid-forming of the at least one microgrid to power the one or more customer loads; and wherein, prior to performing the utility blackstart, determining whether the power from the plant meets or exceeds the grid-forming of the at least part of the grid.

Embodiment 7

The method of any of embodiments 1-6:

wherein the plant includes one or more batteries;

wherein state of charge of the one or more batteries is analyzed to determine:

whether the power from the plant meets or exceeds auxiliary load consumption within the plant;

whether the power from the plant meets or exceeds the grid-forming of the at least one microgrid to power the one or more customer loads; and whether the power from the plant meets or exceeds the grid-forming of the at least part of the grid.

Embodiment 8

The method of any of embodiments 1-7:

wherein performing the blackstart comprises performing one or both of:

at least partly simultaneously blackstarting one or more feeders within the plant and at least one electronic device electrically connected to the at least one microgrid, thereby grid-forming an auxiliary feeder within the plant at least partly while powering the at least one electronic device for powering the one or more customer loads using the at least one microgrid; or at least partly simultaneously blackstarting the one or more feeders within the plant and at least one electronic device for powering the at least part of the grid, thereby grid-forming the auxiliary feeder while powering the at least one electronic device for powering the at least part of the grid.

Embodiment 9

The method of any of embodiments 1-8:

wherein the at least one electronic device electrically connected to the at least one microgrid comprises a transformer electrically connected to the at least one microgrid and configured to provide voltage to the one or more customer loads;

wherein the at least one electronic device for powering the at least part of the grid comprises a transformer for powering the at least part of the grid;

wherein the at least partly simultaneously blackstarting the one or more feeders within the plant and the at least one electronic device for powering the at least one microgrid comprises at least partly simultaneously grid-forming the auxiliary feeder within the plant and ramping the voltage of the transformer for providing voltage to the one or more customer loads; and wherein the at least partly simultaneously blackstarting the one or more feeders within the plant and the at least one electronic device for powering the at least part of the grid comprises at least partly simultaneously grid-forming the auxiliary feeder within the plant and ramping up the voltage of the transformer for powering the at least part of the grid.

Embodiment 10

The method of any of embodiments 1-9:

wherein the plant includes at least one step-up transformer;

wherein the transformer electrically connected to the at least one microgrid comprises a step-down transformer included in or associated with the one or more customer loads; and wherein the at least partly simultaneously blackstarting the one or more feeders within the plant and the at least one electronic device for powering the at least one microgrid comprises at least partly simultaneously ramping the voltage of the step-up transformer within the plant and ramping the voltage of the step-down transformer that provides the voltage to the one or more customer loads.

Embodiment 11

The method of any of embodiments 1-10:

wherein the plant includes at least one step-up transformer;

wherein the transformer for powering the at least the part of the grid comprises a generator step-up (GSU) transformer; and wherein the at least partly simultaneously blackstarting the one or more feeders within the plant and the at least one electronic device for powering the at least the part of the grid comprises at least partly simultaneously ramping the voltage of the step-up transformer within the plant and ramping the voltage of the GSU transformer.

Embodiment 12

The method of any of embodiments 1-11:
    wherein at least one isolation breaker is between the auxiliary feeder and the at least one microgrid;
    wherein the transformer for powering the at least one microgrid is between the at least one isolation breaker and the at least one microgrid;
    wherein one or more switches are between the at least one microgrid and the one or more customer loads;
    wherein, in preparation for at least partly simultaneously blackstarting the one or more feeders within the plant and the transformer for powering the at least one microgrid, the at least one isolation breaker is caused to be closed and the one or more switches between the at least one microgrid and the one or more customer loads are caused to be opened so that the voltage of the transformer for powering the at least one microgrid is ramped up while not providing power to the one or more customer loads; and
    after ramping up the transformer for powering the at least one microgrid, closing the one or more switches between the at least one microgrid and the one or more customer loads in order to power the one or more customer loads.

Embodiment 13

The method of any of embodiments 1-12:
    wherein at least one islanding breaker islands the plant from the grid;
    wherein the transformer for powering the at least the part of the grid is between the at least one islanding breaker and one or more switches in the at least the part of the grid;
    wherein, in preparation for at least partly simultaneously blackstarting the one or more feeders within the plant and the transformer for powering the at least the part of the grid, the at least one islanding breaker is caused to be closed and the one or more switches are caused to be opened so that the voltage of the transformer for powering the at least the part of the grid is ramped up while not providing power to a remaining portion of the at least the part of the grid; and
    after ramping up the transformer for powering the at least the part of the grid, closing the one or more switches in order to power the remaining portion of the at least the part of the grid.

Embodiment 14

A plant configured to perform blackstart from a shutdown mode, the plant comprising:
    at least one microgrid configured to supply power to one or more customer loads; communication functionality configured to communicate with a utility; and
    at least one controller configured to:
        responsive to receiving an indication to perform the blackstart:
            check status of one or both of at least one islanding breaker that islands the plant from at least part of a grid that is operated by the utility or at least one isolation breaker that isolates the plant from the one or more customer loads, wherein the plant, when grid-tied, is configured to provide power to or receive the power from the at least part of the grid, wherein the plant when islanded is disconnected from providing or receiving power to the at least part of the grid;
        check capacity to at least meet load that is energized in performing the blackstart;
        prepare one or more devices within the plant for grid-forming in preparation for the blackstart; and
        perform the blackstart of at least one of the at least one microgrid or the at least part of the grid.

Embodiment 15

The method of embodiment 14
    wherein the at least one controller is configured to perform the blackstart by:
    performing a plant auxiliary blackstart in order to blackstart at least one or more feeders within the plant, thereby grid-forming an auxiliary feeder within the plant; and
    after performing the plant auxiliary blackstart, performing one or both of: a customer load blackstart in order to blackstart the at least one microgrid for powering the one or more customer loads, thereby grid-forming the at least one microgrid; or a utility blackstart in order to blackstart the at least part of the grid, thereby grid-forming the at least part of the grid.

Embodiment 16

The method of embodiments 14 or 15:
    wherein prior to performing the plant auxiliary blackstart, the at least one controller is configured to analyze power conversion systems (PCSs) available to determine whether there is capacity to perform the grid-forming of the auxiliary feeder within the plant;
    wherein prior to performing the customer load blackstart, the at least one controller is configured to analyze the PCSs available to determine whether there is capacity to perform the grid-forming of the at least one microgrid to power the one or more customer loads; and
    wherein prior to performing the utility blackstart, the at least one controller is configured to analyze the PCSs available to determine whether there is capacity to perform the grid-forming of the at least part of the grid.

Embodiment 17

The method of any of embodiments 14-16:
    wherein the at least one controller is configured to perform the blackstart by performing one or both of:
    at least partly simultaneously blackstarting one or more feeders within the plant and at least one electronic device electrically connected to the at least one microgrid, thereby grid-forming an auxiliary feeder within the plant at least partly while powering the at least one electronic device for powering the one or more customer loads using the at least one microgrid; or
    at least partly simultaneously blackstarting the one or more feeders within the plant and at least one electronic device for powering the at least part of the grid, thereby grid-forming the auxiliary feeder while powering the at least one electronic device for powering the at least part of the grid.

Embodiment 18

The method of any of embodiments 14-17:

wherein the at least one electronic device electrically connected to the at least one microgrid comprises a transformer electrically connected to the at least one microgrid and configured to provide voltage to the one or more customer loads;

wherein the at least one electronic device for powering the at least part of the grid comprises a transformer for powering the at least part of the grid;

wherein the at least one controller is configured to at least partly simultaneously blackstart the one or more feeders within the plant and the at least one electronic device for powering the at least one microgrid by at least partly simultaneously grid-forming the auxiliary feeder within the plant and ramping the voltage of the transformer for providing voltage to the one or more customer loads; and wherein the at least one controller is configured to at least partly simultaneously blackstart the one or more feeders within the plant and the at least one electronic device for powering the at least part of the grid by at least partly simultaneously grid-forming the auxiliary feeder within the plant and ramping up the voltage of the transformer for powering the at least part of the grid.

Embodiment 19

The method of any of embodiments 14-18 further comprising at least one step-up transformer;

wherein the transformer electrically connected to the at least one microgrid comprises a step-down transformer included in or associated with the one or more customer loads; and wherein the at least one controller is configured to at least partly simultaneously blackstart the one or more feeders within the plant and the at least one electronic device for powering the at least one microgrid by at least partly simultaneously ramping the voltage of the step-up transformer within the plant and ramping the voltage of the step-down transformer that provides the voltage to the one or more customer loads.

Embodiment 20

The method of any of embodiments 14-19:

further comprising at least one step-up transformer;

wherein the transformer for powering the at least the part of the grid comprises a generator step-up (GSU) transformer; and wherein the at least one controller is configured to at least partly simultaneously blackstart the one or more feeders within the plant and the at least one electronic device for powering the at least the part of the grid by at least partly simultaneously ramping the voltage of the step-up transformer within the plant and ramping the voltage of the GSU transformer.

Embodiment 21

A system comprising:

a processor; and a non-transitory machine-readable medium comprising instructions that, when executed by the processor, cause a computing system to perform a method according to embodiments 1-13.

Embodiment 22 a non-transitory machine-readable medium comprising instructions that, when executed by the processor, cause a computing system to perform a method according to embodiments 1-13.

What is claimed is:

1. A method for performing blackstarts of a plant from a shutdown mode, wherein the plant includes at least one microgrid for powering one or more customer loads and wherein the plant, when grid-tied, provides power to or receives the power from at least part of a grid that is operated by a utility, wherein the plant when islanded is disconnected from providing or receiving power to the at least part of the grid, and wherein the blackstart for the at least one microgrid or the at least the part of the grid comprise a soft blackstart and a hard blackstart, wherein the soft blackstart at least partly precharges at least one transformer prior to grid-forming and wherein the hard blackstart does not precharge the at least one transformer prior to grid-forming, the method comprising:

responsive to receiving an indication to perform at least one blackstart:

checking status of one or both of at least one islanding breaker that islands the plant from the grid or at least one isolation breaker that isolates the plant from the one or more customer loads;

checking capacity to at least meet load that is energized in performing a customer load blackstart or a utility blackstart;

performing a plant auxiliary blackstart in order to blackstart one or more feeders within the plant, thereby grid-forming an auxiliary feeder within the plant;

dynamically determining a blackstart sequence of performing, after performing the plant auxiliary blackstart, the customer load blackstart and thereafter the utility blackstart or performing the utility blackstart and thereafter the customer load blackstart, wherein the customer load blackstart blackstarts the at least one microgrid for powering the one or more customer loads, thereby grid-forming the at least one microgrid, wherein the utility blackstart blackstarts the at least part of the grid, thereby grid-forming the at least part of the grid;

determining, for the customer load blackstart and for the utility blackstart, whether to perform the soft blackstart or the hard blackstart; and performing the blackstart sequence, using the soft blackstart or the hard blackstart as determined, for the customer load blackstart of the at least one microgrid and for the utility blackstart of the at least part of the grid.

2. The method of claim 1, wherein checking the status of one or both of the at least one islanding breaker that islands the plant from the grid or the at least one isolation breaker that isolates the plant from the one or more customer loads comprises:

in preparation for performing the plant auxiliary black-
start:

responsive to the status of the at least one islanding
breaker being closed, causing the at least one island-
ing breaker to open so that the plant is islanded from
the grid; and responsive to the status of the at least one isolation
breaker being closed, causing the at least one isola-
tion breaker to open so that the plant is disconnected
from the at least one microgrid; and after performing the plant auxiliary blackstart and in
preparation for performing the customer load blackstart
or the utility blackstart:

causing one or both of the at least one islanding breaker
to close so that the plant is grid-tied to the at least
part of the grid or the at least one isolation breaker
to close so that the plant is connected to the at least
one microgrid.

3. The method of claim 2, wherein after performing the
plant auxiliary blackstart and in preparation for performing
the customer load blackstart, causing the at least one isola-
tion breaker to close so that the plant is connected to the at
least one microgrid; and after performing the customer load blackstart and in
preparation for performing the utility blackstart, caus-
ing the at least one islanding breaker to close so that the
plant is grid-tied to the at least part of the grid.

4. The method of claim 1, wherein, prior to performing the
plant auxiliary blackstart, determining whether power from
the plant meets or exceeds the grid-forming of the auxiliary
feeder within the plant;

wherein, prior to performing the plant auxiliary blackstart,
determining whether the power from the plant meets or
exceeds the grid-forming of the at least one microgrid
to power the one or more customer loads; and wherein, prior to performing the utility blackstart, deter-
mining whether the power from the plant meets or
exceeds the grid-forming of the at least part of the grid.

5. The method of claim 1, wherein the soft blackstart for
the customer load microgrid blackstart is performed at least
partly while performing the plant auxiliary blackstart.

6. The method of claim 1, wherein the soft blackstart for
the utility blackstart is performed at least partly while
performing the plant auxiliary blackstart.

7. The method of claim 1, wherein the at least one
isolation breaker and the at least one islanding breaker are
controlled in order to perform the soft blackstart to at least
partly precharge the at least one transformer prior to closing
the at least one islanding breaker.

8. The method of claim 1, wherein checking the capacity
to at least meet load that is energized in performing the
customer load blackstart or the utility blackstart is different
based on whether the soft blackstart or the hard blackstart is
performed.

9. The method of claim 1, further comprising receiving a
command; and wherein dynamically determining the blackstart sequence
is based on the command.

10. The method of claim 1, wherein performing the plant
auxiliary blackstart comprises:

powering one or both of temperature or humidity control
electronics of the plant with one or more universal
power supplies, the temperature or humidity control
electronics controlling one or both of temperature or
humidity of batteries;

after powering the one or both of temperature or humidity
control electronics of the plant, using the batteries in
order to perform the plant auxiliary blackstart.

11. A plant configured to perform blackstarts from a
shutdown mode, the plant comprising:

at least one microgrid configured to supply power to one
or more customer loads;

communication functionality configured to communicate
with a utility; and at least one controller configured to:

responsive to receiving an indication to perform at least
one blackstart:

check status of one or both of at least one islanding
breaker that islands the plant from at least part of
a grid that is operated by the utility or at least one
isolation breaker that isolates the plant from the
one or more customer loads, wherein the plant,
when grid-tied, is configured to provide power to
or receive the power from the at least part of the
grid, wherein the plant when islanded is discon-
nected from providing or receiving power to the at
least part of the grid;

perform a plant auxiliary blackstart in order to black-
start one or more feeders within the plant, thereby
grid-forming an auxiliary feeder within the plant;

check capacity to at least meet load that is energized
in performing a customer load blackstart or a
utility blackstart;

dynamically determine a blackstart sequence, after
performing the plant auxiliary blackstart, of per-
forming the customer load blackstart and thereaf-
ter the utility blackstart or performing the utility
blackstart and thereafter the customer load black-
start, wherein the customer load blackstart black-
starts the at least one microgrid for powering the
one or more customer loads, thereby grid-forming
the at least one microgrid, wherein the utility
blackstart blackstarts the at least part of the grid,
thereby grid-forming the at least part of the grid;

determine, for the customer load blackstart and for
the utility blackstart, whether to perform a soft
blackstart or a hard blackstart, wherein the soft
blackstart at least partly precharges at least one
transformer prior to grid-forming and wherein the
hard blackstart does not precharge the at least one
transformer prior to grid-forming; and perform the blackstart sequence, using the soft
blackstart or the hard blackstart as determined, for
the customer load blackstart of the at least one
microgrid and for the utility blackstart of the at
least part of the grid.

12. The plant of claim 11, wherein prior to performing the
plant auxiliary blackstart, the at least one controller is
configured to analyze power conversion systems (PCSs)
available to determine whether there is capacity to perform
the grid-forming of the auxiliary feeder within the plant;

wherein prior to performing the customer load blackstart,
the at least one controller is configured to analyze the
PCSs available to determine whether there is capacity
to perform the grid-forming of the at least one micro-
grid to power the one or more customer loads; and wherein prior to performing the utility blackstart, the at
least one controller is configured to analyze the PCSs
available to determine whether there is capacity to
perform the grid-forming of the at least part of the grid.

13. The plant of claim 11, wherein the at least one controller is configured to perform the customer load blackstart or the utility blackstart by performing one or both of:

at least partly simultaneously blackstarting one or more feeders within the plant and at least one electronic device electrically connected to the at least one microgrid, thereby grid-forming an auxiliary feeder within the plant at least partly while powering the at least one electronic device for powering the one or more customer loads using the at least one microgrid; or at least partly simultaneously blackstarting the one or more feeders within the plant and at least one electronic device for powering the at least part of the grid, thereby grid-forming the auxiliary feeder while powering the at least one electronic device for powering the at least part of the grid.

14. The plant of claim 11, wherein the soft blackstart for the customer load microgrid blackstart is performed at least partly while performing the plant auxiliary blackstart.

15. The plant of claim 11, wherein the soft blackstart for the utility blackstart is performed at least partly while performing the plant auxiliary blackstart.

16. The plant of claim 11, wherein the at least one isolation breaker and the at least one islanding breaker are controlled in order to perform the soft blackstart to at least partly precharge the at least one transformer prior to closing the at least one islanding breaker.

17. The plant of claim 11, wherein checking the capacity to at least meet load that is energized in performing the customer load blackstart or the utility blackstart is different based on whether the soft blackstart or the hard blackstart is performed.

18. The plant of claim 11, further comprising receiving a command; and wherein dynamically determining the blackstart sequence is based on the command.

19. The plant of claim 11, wherein performing the plant auxiliary blackstart comprises:

powering one or both of temperature or humidity control electronics of the plant with one or more universal power supplies, the temperature or humidity control electronics controlling one or both of temperature or humidity of batteries;

after powering the one or both of temperature or humidity control electronics of the plant, using the batteries in order to perform the plant auxiliary blackstart.

\* \* \* \* \*